US011187857B2

(12) United States Patent
Chang et al.

(10) Patent No.: US 11,187,857 B2
(45) Date of Patent: Nov. 30, 2021

(54) ULTRA-SMALL FORM FACTOR OPTICAL CONNECTOR AND ADAPTER

(71) Applicant: Senko Advanced Components Inc, Marlborough, MA (US)

(72) Inventors: Jimmy Jun Fu Chang, Worcester, MA (US); Kazuyoshi Takano, Toyko (JP)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/559,601

(22) Filed: Sep. 3, 2019

(65) Prior Publication Data

US 2020/0166716 A1    May 28, 2020

Related U.S. Application Data

(63) Continuation of application No. PCT/US2019/013861, filed on Jan. 16, 2019, and a continuation-in-part of application No. 16/194,325, filed on Nov. 17, 2018, now Pat. No. 10,838,152, and a continuation-in-part of application No. 16/103,555,
(Continued)

(51) Int. Cl.
*G02B 6/38* (2006.01)
(52) U.S. Cl.
CPC ......... *G02B 6/3879* (2013.01); *G02B 6/3825* (2013.01); *G02B 6/3831* (2013.01); *G02B 6/3853* (2013.01)

(58) Field of Classification Search
None
See application file for complete search history.

(56) References Cited

U.S. PATENT DOCUMENTS

| 3,721,945 A | 3/1973 | Hults |
| 4,150,790 A | 4/1979 | Potter |

(Continued)

FOREIGN PATENT DOCUMENTS

| CA | 2495693 A1 | 4/2004 |
| CN | 2836038 Y | 11/2006 |

(Continued)

OTHER PUBLICATIONS

International Search Report and Written Opinion; Application No. PCT/US2018/042202, dated Dec. 7, 2018, pp. 17.

(Continued)

*Primary Examiner* — Tina M Wong

(57) ABSTRACT

An optical connector holding two or more LC-type optical ferrules is provided. The optical connector includes an outer body, an inner front body accommodating the two or more LC-type optical ferrules, ferrule springs for urging the optical ferrules towards a mating receptacle, and a back body for supporting the ferrule springs. The outer body and the inner front body are configured such that four LC-type optical ferrules are accommodated in a small form-factor pluggable (SFP) transceiver footprint or eight LC-type optical ferrules are accommodated in a quad small form-factor pluggable (QSFP) transceiver footprint. A mating receptacle (transceiver or adapter) includes internal alignment slots configured to accept a corresponding alignment key on connector outer housing to ensure alignment and orientation for maximum signal transfer between opposing ferrule end faces.

26 Claims, 98 Drawing Sheets

Related U.S. Application Data filed on Aug. 14, 2018, now Pat. No. 10,718,911, and a continuation-in-part of application No. 16/035,691, filed on Jul. 15, 2018, now Pat. No. 10,281,668.

(56) References Cited

U.S. PATENT DOCUMENTS

| | | |
|---|---|---|
| 4,327,964 A | 5/1982 | Haesley et al. |
| 4,478,473 A | 10/1984 | Frear |
| 4,762,388 A | 8/1988 | Tanaka et al. |
| 4,764,129 A | 8/1988 | Jones et al. |
| 4,840,451 A | 6/1989 | Sampson et al. |
| 4,872,736 A | 10/1989 | Myers et al. |
| 4,979,792 A | 12/1990 | Weber |
| 5,026,138 A | 6/1991 | Boudreau |
| 5,031,981 A | 7/1991 | Peterson |
| 5,011,025 A | 8/1991 | Haitmanek |
| 5,073,045 A | 12/1991 | Abendschein |
| D323,143 S | 1/1992 | Ohkura et al. |
| 5,146,813 A | 9/1992 | Stanfill, Jr. |
| 5,212,752 A | 5/1993 | Stephenson et al. |
| 5,265,181 A | 11/1993 | Chang |
| 5,289,554 A | 2/1994 | Cubukciyan et al. |
| 5,317,663 A | 5/1994 | Beard et al. |
| 5,321,784 A | 6/1994 | Cubukciyan et al. |
| 5,335,301 A | 8/1994 | Newman et al. |
| 5,348,487 A | 9/1994 | Marazzi et al. |
| 5,444,806 A | 8/1995 | de Marchi et al. |
| 5,481,634 A | 4/1996 | Anderson et al. |
| 5,506,922 A | 4/1996 | Grois et al. |
| 5,521,997 A | 5/1996 | Rovenolt et al. |
| 5,570,445 A | 10/1996 | Chou et al. |
| 5,588,079 A | 12/1996 | Tanabe et al. |
| 5,602,951 A | 2/1997 | Shiota |
| 5,684,903 A | 11/1997 | Kyomasu et al. |
| 5,687,268 A | 11/1997 | Stephenson et al. |
| 5,781,681 A | 7/1998 | Manning |
| 5,845,036 A | 12/1998 | De Marchi |
| 5,915,987 A | 6/1999 | Reed |
| 5,937,130 A | 8/1999 | Amberg et al. |
| 5,956,444 A | 9/1999 | Duda et al. |
| 5,971,626 A | 10/1999 | Knodell et al. |
| 6,041,155 A | 3/2000 | Anderson et al. |
| 6,049,040 A | 4/2000 | Biles et al. |
| 6,134,370 A | 10/2000 | Childers et al. |
| 6,178,283 B1 | 1/2001 | Weigel |
| RE37,080 E | 3/2001 | Stephenson et al. |
| 6,206,577 B1 | 3/2001 | Hall, III et al. |
| 6,206,581 B1 | 3/2001 | Driscoll et al. |
| 6,227,717 B1 | 5/2001 | Ott et al. |
| 6,238,104 B1 | 5/2001 | Yamakawa et al. |
| 6,247,849 B1 | 6/2001 | Liu |
| 6,250,817 B1 | 6/2001 | Lampert et al. |
| 6,276,840 B1 | 8/2001 | Weiss |
| 6,364,537 B1 | 4/2002 | Maynard |
| 6,379,052 B1 | 4/2002 | de Jong |
| 6,422,759 B1 | 7/2002 | Kevern |
| 6,461,054 B1 | 10/2002 | Iwase |
| 6,471,412 B1 | 10/2002 | Belenkiy et al. |
| 6,478,472 B1 | 11/2002 | Anderson et al. |
| 6,485,194 B1 | 11/2002 | Shirakawa |
| 6,530,696 B1 | 3/2003 | Ueda |
| 6,551,117 B2 | 4/2003 | Poplawski et al. |
| 6,565,262 B2 | 5/2003 | Childers |
| 6,572,276 B1 | 6/2003 | Theis et al. |
| 6,579,014 B2 | 6/2003 | Melton et al. |
| 6,585,194 B1 | 7/2003 | Brushwood |
| 6,634,796 B2 | 10/2003 | de Jong |
| 6,634,801 B1 | 10/2003 | Waldron et al. |
| 6,648,520 B2 | 11/2003 | McDonald et al. |
| 6,668,113 B2 | 12/2003 | Togami |
| 6,682,228 B2 | 1/2004 | Ralhnam et al. |
| 6,685,362 B2 | 2/2004 | Burkholder et al. |
| 6,695,486 B1 | 2/2004 | Falkenberg |
| 6,811,321 B1 | 11/2004 | Schmalzigaug et al. |
| 6,817,272 B2 | 11/2004 | Holland |
| 6,854,894 B1 | 2/2005 | Yunker et al. |
| 6,869,227 B2 | 3/2005 | Del Grosso |
| 6,872,039 B2 | 3/2005 | Baus et al. |
| 6,935,789 B2 | 8/2005 | Gross, III et al. |
| 7,036,993 B2 | 5/2006 | Luther |
| 7,052,186 B1 * | 5/2006 | Bates ............... G02B 6/3879 385/139 |
| 7,077,576 B2 | 7/2006 | Luther |
| 7,090,407 B2 | 8/2006 | Melton et al. |
| 7,091,421 B2 | 8/2006 | Kukita et al. |
| 7,111,990 B2 | 9/2006 | Melton et al. |
| 7,113,679 B2 | 9/2006 | Melton et al. |
| D533,504 S | 12/2006 | Lee |
| D534,124 S | 12/2006 | Taguchi |
| 7,150,567 B1 | 12/2006 | Luther et al. |
| 7,153,041 B2 | 12/2006 | Mine et al. |
| 7,198,409 B2 | 4/2007 | Smith et al. |
| 7,207,724 B2 | 4/2007 | Gurreri |
| D543,146 S | 5/2007 | Chen et al. |
| 7,258,493 B2 | 8/2007 | Milette |
| 7,264,402 B2 | 9/2007 | Theuerkorn |
| 7,281,859 B2 | 10/2007 | Mudd et al. |
| D558,675 S | 1/2008 | Chien et al. |
| 7,315,682 B1 | 1/2008 | En Lin et al. |
| 7,325,976 B2 | 2/2008 | Gurreri et al. |
| 7,325,980 B2 | 2/2008 | Pepe |
| 7,329,137 B2 | 2/2008 | Martin et al. |
| 7,354,291 B2 | 4/2008 | Caveney et al. |
| 7,331,718 B2 | 5/2008 | Yazaki et al. |
| 7,371,082 B2 | 5/2008 | Zimmell et al. |
| 7,387,447 B2 | 6/2008 | Mudd et al. |
| 7,390,203 B2 | 6/2008 | Murano et al. |
| D572,661 S | 7/2008 | En Lin et al. |
| 7,431,604 B2 | 10/2008 | Waters et al. |
| 7,463,803 B2 | 12/2008 | Cody et al. |
| 7,465,180 B2 | 12/2008 | Kusuda et al. |
| 7,473,124 B1 | 1/2009 | Briant |
| 7,510,335 B1 | 3/2009 | Su et al. |
| 7,513,695 B1 | 4/2009 | Lin et al. |
| 7,534,128 B2 | 5/2009 | Caveney et al. |
| 7,540,666 B2 | 6/2009 | Luther |
| 7,561,775 B2 | 7/2009 | Lin et al. |
| 7,588,373 B1 | 9/2009 | Sato |
| 7,591,595 B2 | 9/2009 | Lue et al. |
| 7,594,766 B1 | 9/2009 | Sasser et al. |
| 7,641,398 B2 | 1/2010 | O'Riorden et al. |
| 7,695,199 B2 | 4/2010 | Teo et al. |
| 7,699,533 B2 | 4/2010 | Milette |
| 7,712,970 B1 | 5/2010 | Lee |
| 7,824,113 B2 | 11/2010 | Wong et al. |
| 7,837,395 B2 | 11/2010 | Lin et al. |
| D641,708 S | 7/2011 | Tammauchi |
| 8,083,450 B1 | 12/2011 | Smith et al. |
| 8,152,385 B2 | 4/2012 | de Jong |
| 8,186,890 B2 | 5/2012 | Lu |
| 8,192,091 B2 | 6/2012 | Hsu et al. |
| 8,202,009 B2 | 6/2012 | Lin et al. |
| 8,221,007 B2 | 7/2012 | Peterhans |
| 8,251,733 B2 | 8/2012 | Wu |
| 8,267,595 B2 | 9/2012 | Lin et al. |
| 8,270,796 B2 | 9/2012 | Nhep |
| 8,408,815 B2 | 4/2013 | Lin et al. |
| 8,465,317 B2 | 6/2013 | Gniadek et al. |
| 8,534,928 B2 | 9/2013 | Cooke |
| 8,556,645 B2 | 10/2013 | Crain |
| 8,559,781 B2 | 10/2013 | Childers |
| 8,622,634 B2 | 1/2014 | Arnold |
| 8,636,424 B2 | 1/2014 | Kuffel et al. |
| 8,651,749 B2 | 2/2014 | Clovis et al. |
| 8,676,022 B2 | 3/2014 | Jones |
| 8,678,670 B2 | 3/2014 | Takahashi |
| 8,727,638 B2 | 5/2014 | Lee |
| 8,770,863 B2 | 7/2014 | Cooke et al. |
| 8,869,661 B2 | 10/2014 | Opstad |
| 9,052,474 B2 | 6/2015 | Jiang |
| 9,250,402 B2 | 2/2016 | Ishii et al. |
| 9,310,569 B2 | 4/2016 | Lee |
| 9,366,829 B2 | 6/2016 | Czosnowski |
| 9,411,110 B2 | 8/2016 | Barnette, Jr. et al. |

(56) References Cited

U.S. PATENT DOCUMENTS

| | | | |
|---|---|---|---|
| 9,448,370 B2 | 9/2016 | Xue et al. | |
| 9,465,172 B2 | 10/2016 | Shih | |
| 9,494,744 B2 | 11/2016 | de Jong | |
| 9,548,557 B2 | 1/2017 | Liu | |
| 9,551,842 B2 | 1/2017 | Theuerkorn | |
| 9,557,495 B2 | 1/2017 | Raven et al. | |
| 9,568,686 B2 | 2/2017 | Fewkes et al. | |
| 9,581,768 B1 | 2/2017 | Baca et al. | |
| 9,599,778 B2 | 3/2017 | Wong et al. | |
| 9,658,409 B2 | 5/2017 | Gniadek | |
| 9,678,283 B1 | 6/2017 | Chang et al. | |
| 9,684,130 B2 | 6/2017 | Veatch et al. | |
| 9,684,136 B2 | 6/2017 | Cline et al. | |
| 9,684,313 B2 | 6/2017 | Chajec | |
| 9,709,753 B1 | 7/2017 | Chang et al. | |
| 9,778,425 B2 | 10/2017 | Nguyen | |
| 9,829,644 B2 | 11/2017 | Nguyen | |
| 9,829,645 B2 | 11/2017 | Good | |
| 9,869,825 B2 | 1/2018 | Bailey et al. | |
| 9,880,361 B2 | 1/2018 | Childers | |
| 9,946,035 B2 | 4/2018 | Gustafson | |
| 9,971,103 B2 | 5/2018 | de Jong et al. | |
| 9,989,711 B2 | 6/2018 | Ott et al. | |
| 10,031,296 B2 | 7/2018 | Good | |
| 10,107,972 B1 | 10/2018 | Gniadek et al. | |
| 10,146,011 B2 | 12/2018 | Nhep | |
| 10,281,668 B2 | 5/2019 | Takano et al. | |
| 10,281,669 B2 | 5/2019 | Takano et al. | |
| 2002/0168148 A1 | 11/2002 | Gilliland | |
| 2002/0172467 A1 | 11/2002 | Anderson et al. | |
| 2002/0191919 A1 | 12/2002 | Nolan | |
| 2003/0053787 A1 | 3/2003 | Lee | |
| 2003/0063862 A1* | 4/2003 | Fillion | G02B 6/3825 385/53 |
| 2003/0157825 A1 | 8/2003 | Kane | |
| 2004/0052473 A1 | 3/2004 | Seo | |
| 2004/0109646 A1 | 6/2004 | Anderson | |
| 2004/0161958 A1 | 6/2004 | Togami et al. | |
| 2004/0136657 A1 | 7/2004 | Ngo | |
| 2004/0141693 A1 | 7/2004 | Szilagyi et al. | |
| 2004/0234209 A1 | 11/2004 | Cox et al. | |
| 2004/0247252 A1 | 12/2004 | Ehrenreich | |
| 2005/0036744 A1 | 2/2005 | Caveney et al. | |
| 2005/0111796 A1 | 5/2005 | Matasek et al. | |
| 2005/0141817 A1 | 6/2005 | Yazaki et al. | |
| 2006/0013539 A1 | 1/2006 | Thaler | |
| 2006/0089049 A1 | 4/2006 | Sedor | |
| 2006/0127025 A1 | 6/2006 | Haberman | |
| 2006/0160429 A1 | 7/2006 | Dawiedczyk et al. | |
| 2006/0269194 A1 | 11/2006 | Luther et al. | |
| 2006/0274411 A1 | 12/2006 | Yamauchi | |
| 2007/0025665 A1 | 2/2007 | Dean | |
| 2007/0028409 A1 | 2/2007 | Yamada | |
| 2007/0079854 A1 | 4/2007 | You | |
| 2007/0098329 A1 | 6/2007 | Shimoji et al. | |
| 2007/0149028 A1 | 6/2007 | Yu et al. | |
| 2007/0149062 A1 | 6/2007 | Long et al. | |
| 2007/0230874 A1 | 10/2007 | Lin | |
| 2007/0232115 A1 | 10/2007 | Burke et al. | |
| 2007/0243749 A1 | 10/2007 | Wu | |
| 2008/0008430 A1 | 1/2008 | Kewitsch | |
| 2008/0044137 A1 | 2/2008 | Luther et al. | |
| 2008/0056647 A1 | 3/2008 | Margolin et al. | |
| 2008/0069501 A1 | 3/2008 | Mudd et al. | |
| 2008/0101757 A1 | 5/2008 | Lin et al. | |
| 2008/0226237 A1 | 9/2008 | O'Rioreden et al. | |
| 2008/0267566 A1 | 10/2008 | En Lin | |
| 2009/0028507 A1 | 1/2009 | Jones et al. | |
| 2009/0222457 A1 | 1/2009 | de Jong et al. | |
| 2009/0047818 A1 | 2/2009 | Irwin et al. | |
| 2009/0092360 A1 | 4/2009 | Lin et al. | |
| 2009/0176401 A1 | 7/2009 | Gu | |
| 2009/0196555 A1 | 8/2009 | Lin et al. | |
| 2009/0214162 A1 | 8/2009 | O'Riorden et al. | |
| 2009/0220197 A1 | 9/2009 | Gniadek | |
| 2009/0220200 A1 | 9/2009 | Wong et al. | |
| 2009/0290839 A1 | 11/2009 | Lin | |
| 2009/0290938 A1 | 11/2009 | Asaoka | |
| 2010/0034502 A1 | 2/2010 | Lu et al. | |
| 2010/0092136 A1 | 4/2010 | Nhep | |
| 2010/0220961 A1 | 9/2010 | de Jong et al. | |
| 2010/0247041 A1 | 9/2010 | Szilagyi | |
| 2010/0284656 A1 | 11/2010 | Morra | |
| 2010/0322561 A1 | 12/2010 | Lin et al. | |
| 2011/0044588 A1 | 2/2011 | Larson et al. | |
| 2011/0131801 A1 | 6/2011 | Nelson et al. | |
| 2011/0155810 A1 | 6/2011 | Taniguichi | |
| 2011/0177710 A1* | 7/2011 | Tobey | H01R 13/518 439/345 |
| 2011/0239220 A1 | 9/2011 | Gibson | |
| 2012/0099822 A1 | 4/2012 | Kuffel et al. | |
| 2012/0155810 A1* | 6/2012 | Nakagawa | G02B 6/3879 385/78 |
| 2012/0189260 A1 | 7/2012 | Kowalczyk et al. | |
| 2012/0237177 A1 | 9/2012 | Minota | |
| 2012/0269485 A1 | 10/2012 | Haley et al. | |
| 2012/0301080 A1 | 11/2012 | Gniadek | |
| 2013/0019423 A1 | 1/2013 | Srutkowski | |
| 2013/0071067 A1 | 3/2013 | Lin | |
| 2013/0089995 A1 | 4/2013 | Gniadek et al. | |
| 2013/0094816 A1 | 4/2013 | Lin et al. | |
| 2013/0121653 A1 | 5/2013 | Shitama et al. | |
| 2013/0170797 A1 | 7/2013 | Ott | |
| 2013/0183012 A1 | 7/2013 | Lopez et al. | |
| 2013/0216185 A1 | 8/2013 | Klavuhn | |
| 2013/0259429 A1 | 10/2013 | Czosnowski et al. | |
| 2013/0308915 A1 | 11/2013 | Buff | |
| 2013/0322825 A1 | 12/2013 | Cooke et al. | |
| 2014/0016901 A1 | 1/2014 | Lambourn et al. | |
| 2014/0023322 A1 | 1/2014 | Gniadek | |
| 2014/0050446 A1 | 2/2014 | Chang | |
| 2014/0056562 A1 | 2/2014 | Limbert | |
| 2014/0133808 A1 | 5/2014 | Hill et al. | |
| 2014/0169727 A1 | 6/2014 | Veatch et al. | |
| 2014/0219621 A1 | 8/2014 | Barnette, Jr. et al. | |
| 2014/0226946 A1 | 8/2014 | Cooke et al. | |
| 2014/0241644 A1 | 8/2014 | Kang | |
| 2014/0241678 A1 | 8/2014 | Bringuier et al. | |
| 2014/0241688 A1 | 8/2014 | Isenhour et al. | |
| 2014/0334780 A1 | 11/2014 | Nguyen et al. | |
| 2014/0348477 A1 | 11/2014 | Chang | |
| 2015/0003788 A1 | 1/2015 | Chen | |
| 2015/0111417 A1 | 4/2015 | Vanderwoud | |
| 2015/0212282 A1 | 7/2015 | Lin | |
| 2015/0241644 A1 | 8/2015 | Lee | |
| 2015/0301294 A1 | 10/2015 | Chang et al. | |
| 2015/0331201 A1 | 11/2015 | Takano et al. | |
| 2015/0355417 A1 | 12/2015 | Takano et al. | |
| 2015/0370021 A1 | 12/2015 | Chan | |
| 2015/0378113 A1 | 12/2015 | Good et al. | |
| 2016/0131849 A1 | 5/2016 | Takano et al. | |
| 2016/0139343 A1 | 5/2016 | Dean, Jr. et al. | |
| 2016/0154190 A1* | 6/2016 | Lin | G02B 6/3879 385/76 |
| 2016/0161681 A1 | 6/2016 | Banal, Jr. et al. | |
| 2016/0195682 A1 | 6/2016 | Takano | |
| 2016/0291262 A1 | 6/2016 | Chang et al. | |
| 2016/0231512 A1 | 8/2016 | Seki | |
| 2016/0259135 A1 | 9/2016 | Gniadek et al. | |
| 2016/0266326 A1 | 9/2016 | Gniadek | |
| 2016/0349458 A1 | 12/2016 | Murray | |
| 2016/0370545 A1 | 12/2016 | Jiang | |
| 2017/0003458 A1 | 1/2017 | Gniadek | |
| 2017/0205587 A1 | 7/2017 | Chang et al. | |
| 2017/0205591 A1 | 7/2017 | Takano et al. | |
| 2017/0254961 A1 | 9/2017 | Kamada et al. | |
| 2017/0276275 A1 | 9/2017 | Beemer et al. | |
| 2017/0277059 A1 | 9/2017 | Miura et al. | |
| 2017/0343740 A1 | 11/2017 | Nguyen | |
| 2018/0156988 A1 | 6/2018 | Gniadek | |
| 2018/0172923 A1 | 6/2018 | Bauco | |

(56) References Cited

U.S. PATENT DOCUMENTS

| | | |
|---|---|---|
| 2019/0064447 A1 | 2/2019 | Chang et al. |
| 2019/0204513 A1* | 7/2019 | Davidson ............ G02B 6/3887 |

FOREIGN PATENT DOCUMENTS

| | | |
|---|---|---|
| CN | 201383588 Y | 1/2010 |
| CN | 2026500189 U | 12/2013 |
| DE | 202006011910 U1 | 3/2007 |
| DE | 102006019335 U1 | 10/2007 |
| EP | 1074868 A1 | 7/2001 |
| EP | 1211537 A2 | 6/2002 |
| EP | 1245980 A1 | 10/2002 |
| EP | 1566674 A2 | 8/2005 |
| GB | 2111240 A | 6/1983 |
| JP | 2000089059 | 3/2000 |
| JP | 2009229545 A | 10/2009 |
| JP | 2009276493 A | 11/2009 |
| TW | 200821653 A | 5/2008 |
| WO | 200179904 A2 | 10/2001 |
| WO | 2004027485 A1 | 4/2004 |
| WO | 2008112986 A1 | 9/2008 |
| WO | 2009135787 A1 | 11/2009 |
| WO | 2010024851 A2 | 3/2010 |
| WO | 2012136702 A1 | 10/2012 |
| WO | 2012162385 A1 | 11/2012 |
| WO | 2014028527 A1 | 2/2014 |
| WO | 2014182351 A1 | 11/2014 |
| WO | 2015191024 A1 | 12/2015 |
| WO | 2016019993 A1 | 2/2016 |
| WO | 2016148741 A1 | 9/2016 |

OTHER PUBLICATIONS

International Search Report and Written Opinion, Application No. PCT/US2019/013861, dated Apr. 8, 2019, pp. 15.

Fiber Optic Connectors Tutorial, 2018, pp. 20.

Fiber Optic Glossary, Feb. 29, 2016, pp. 93.

"Fiber Optic Interconnect Solutions, Tactical Fiber Optical Connectors, Cables and Termini" 2006, Glenair, Inc., Glendale, California, www.mps-electronics.de, pp. 232.

"Fiber Optic Products Catalog" Nov. 2007, Tyco Electronics Corporation, Harrisburg, Pennsylvania, www.ampnetconnect.com, pp. 204.

"Fiber Optic Connectors and Assemblies Catalog" 2009, Huber & Suhner Fiver Optics, Herisau, Switzerland, www.hubersuhner.com, pp. 104.

Extended European Search Report and Written Opinion, Application No. 1832246.5, dated Mar. 15, 2021, pp. 6.

\* cited by examiner

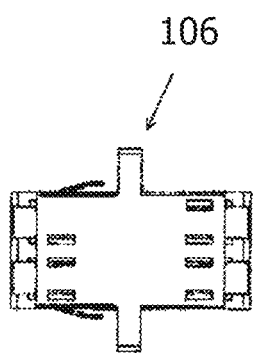 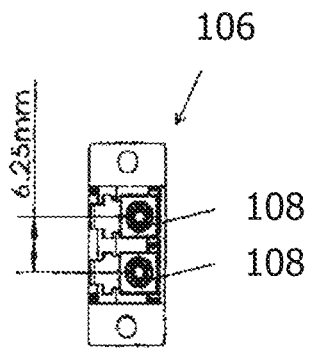
FIG. 1C (Prior Art)  FIG. 1D (Prior Art)

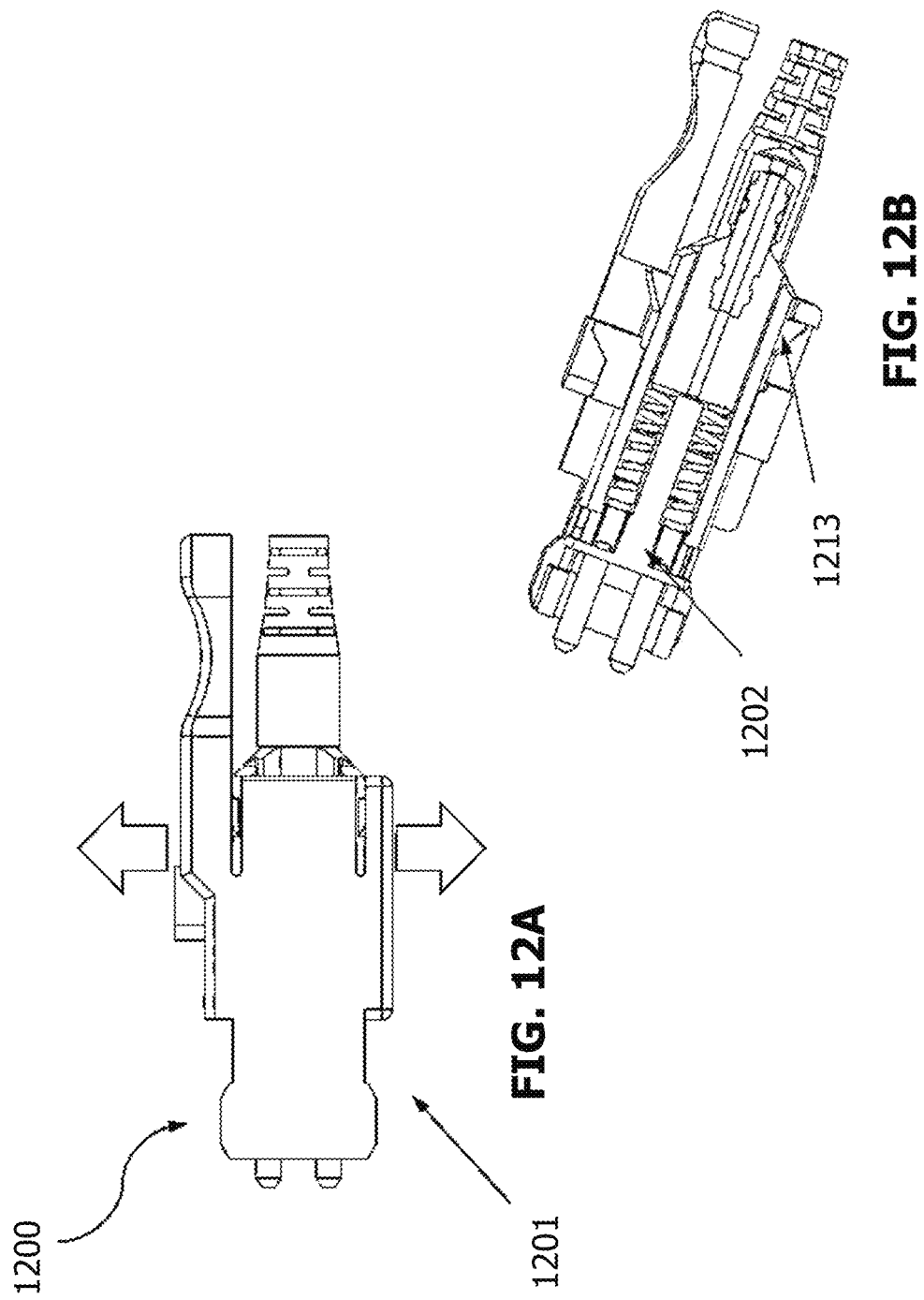

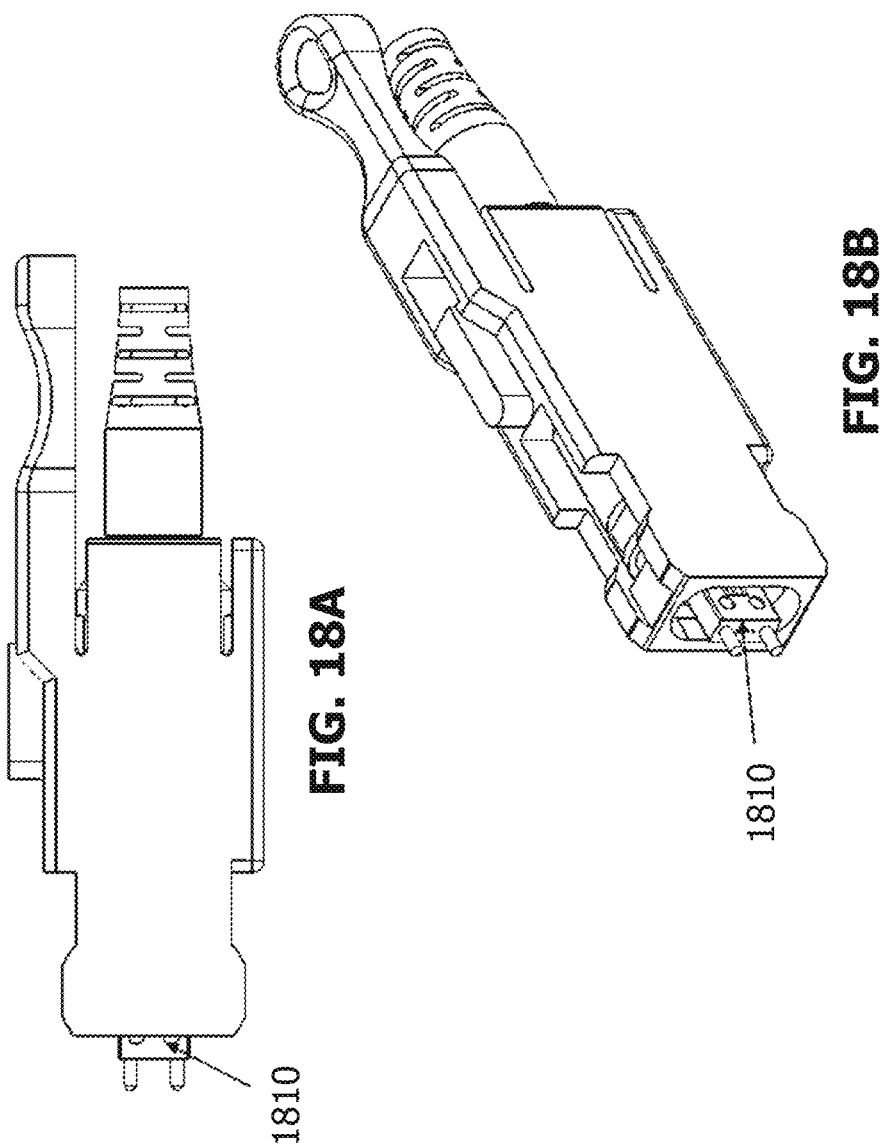

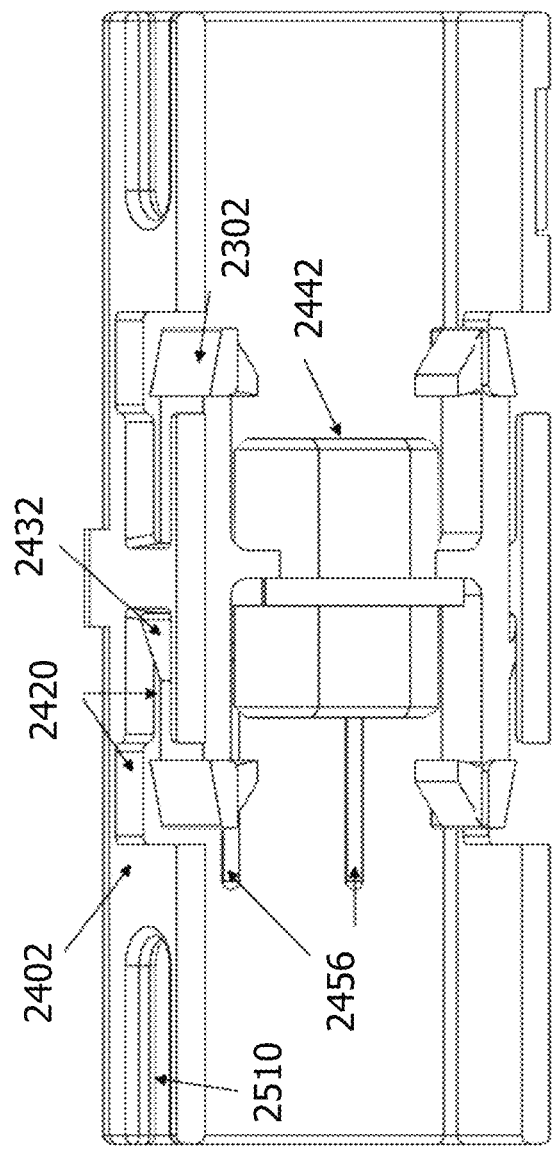

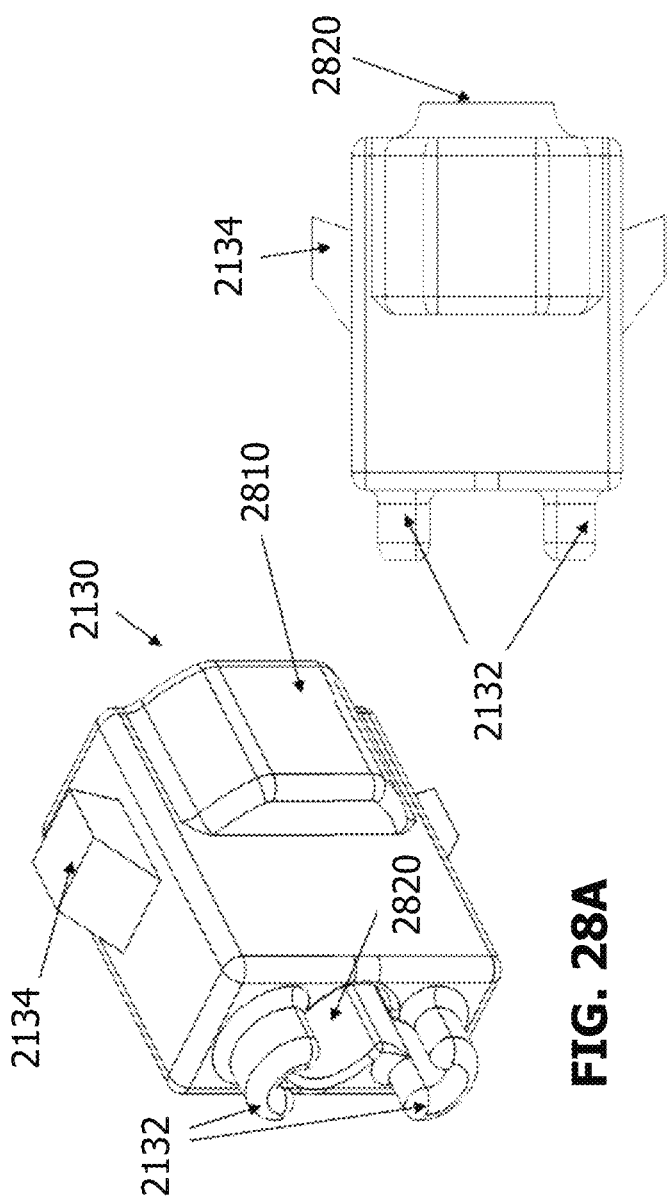

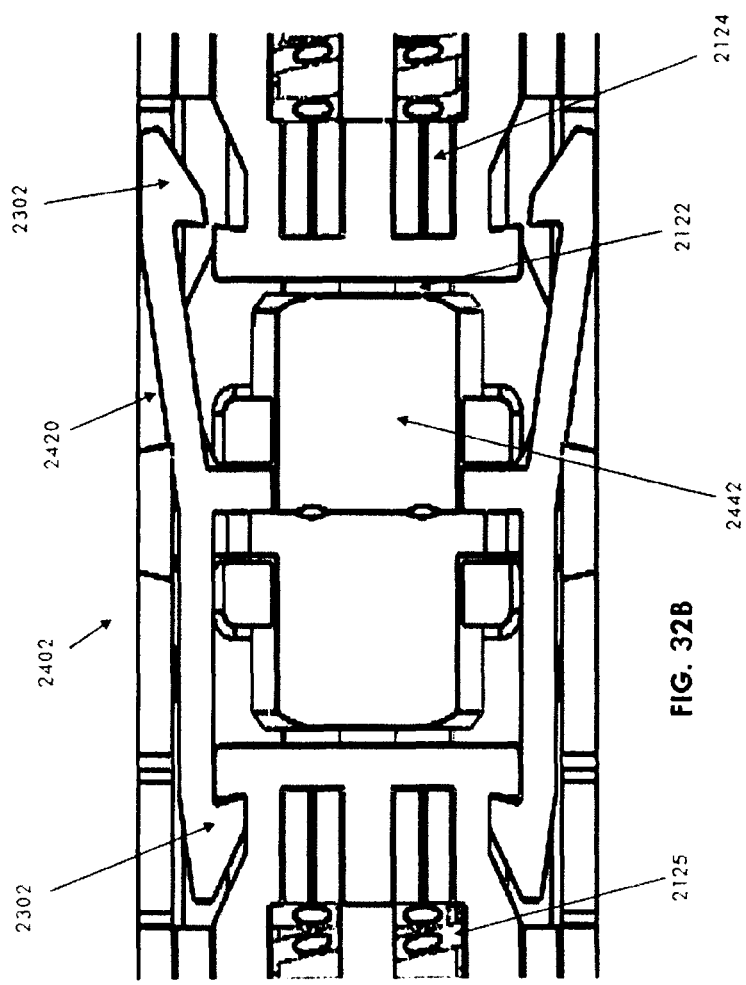

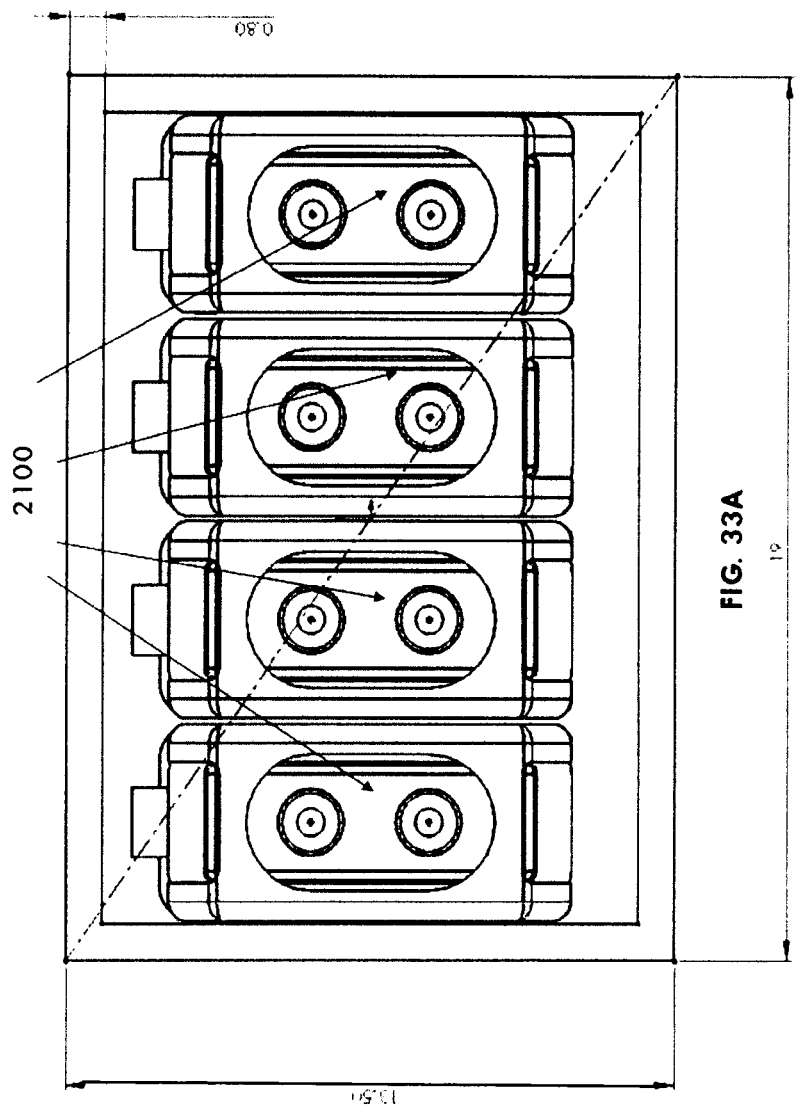

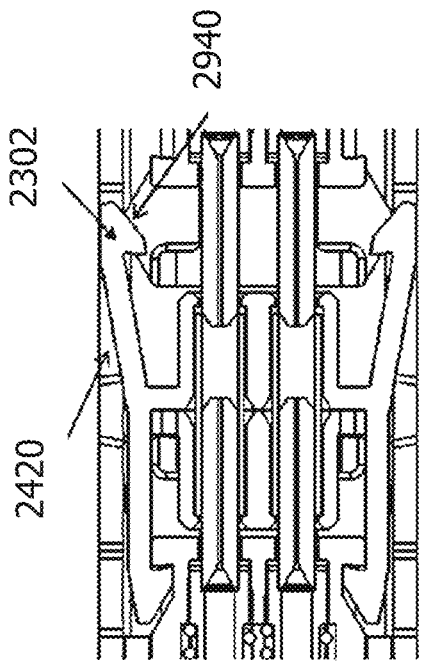
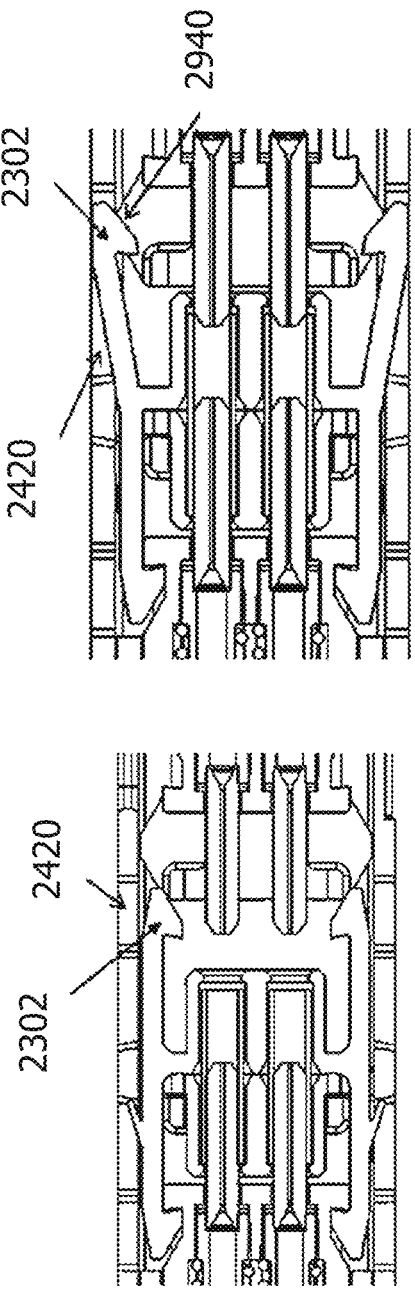
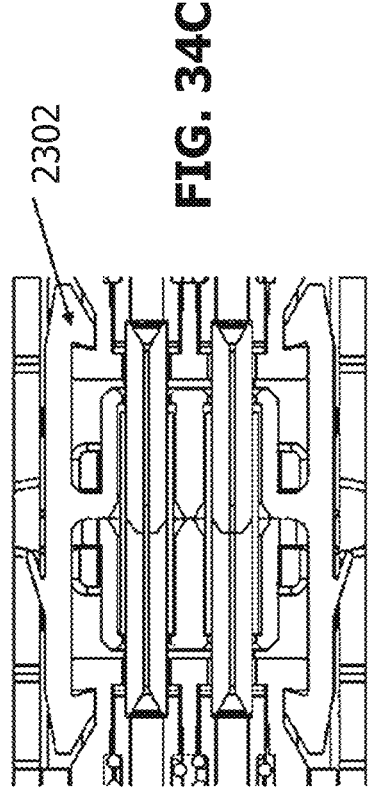
FIG. 34A
FIG. 34B
FIG. 34C

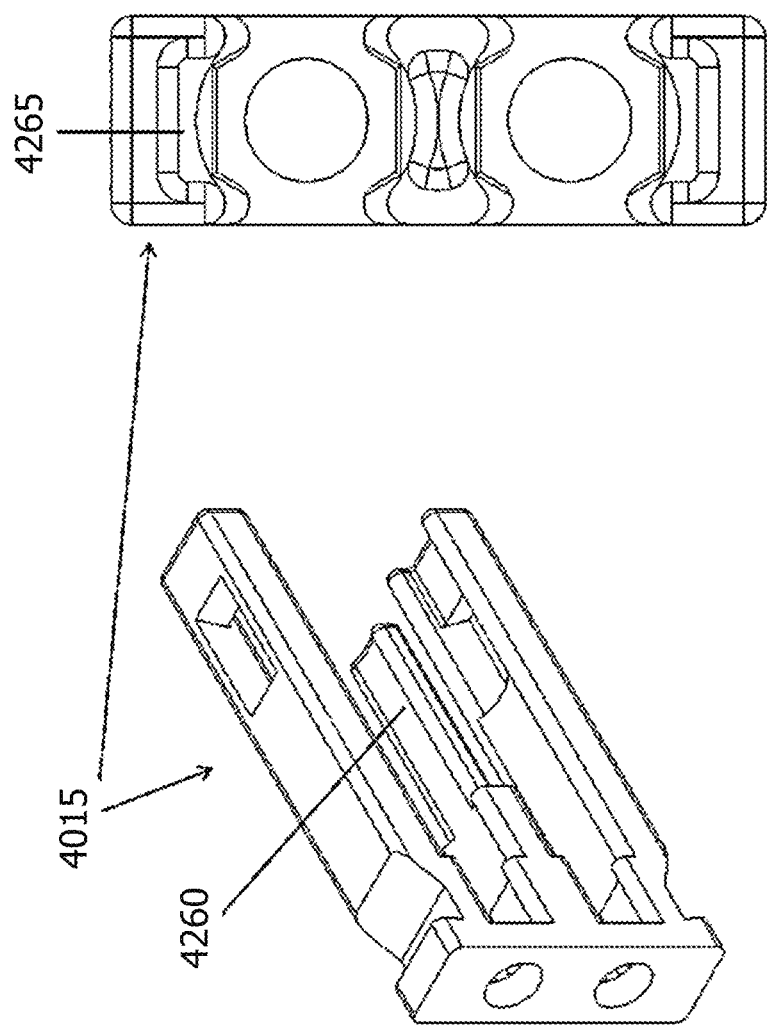

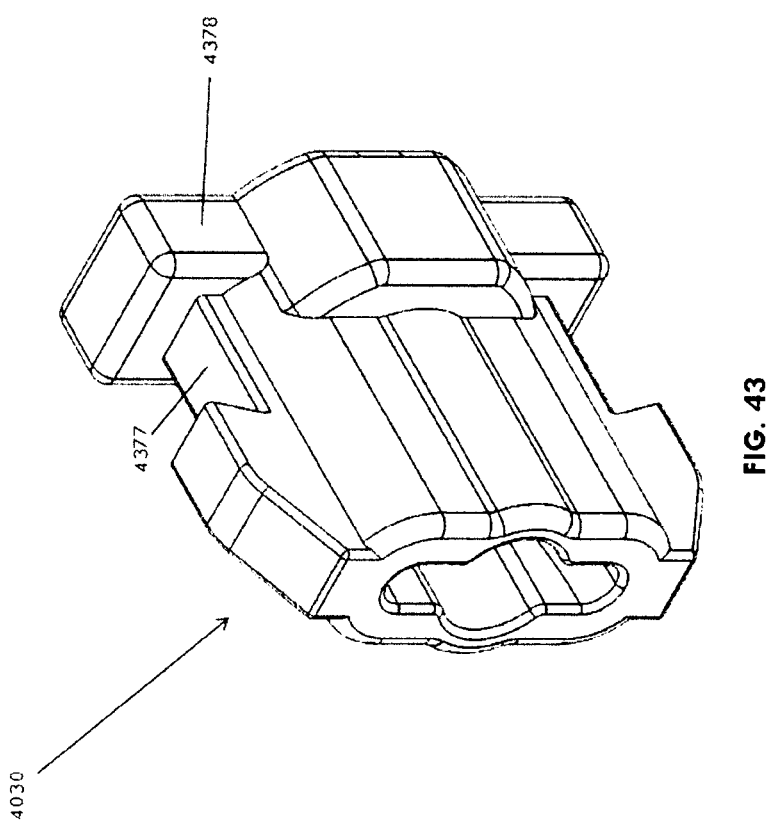

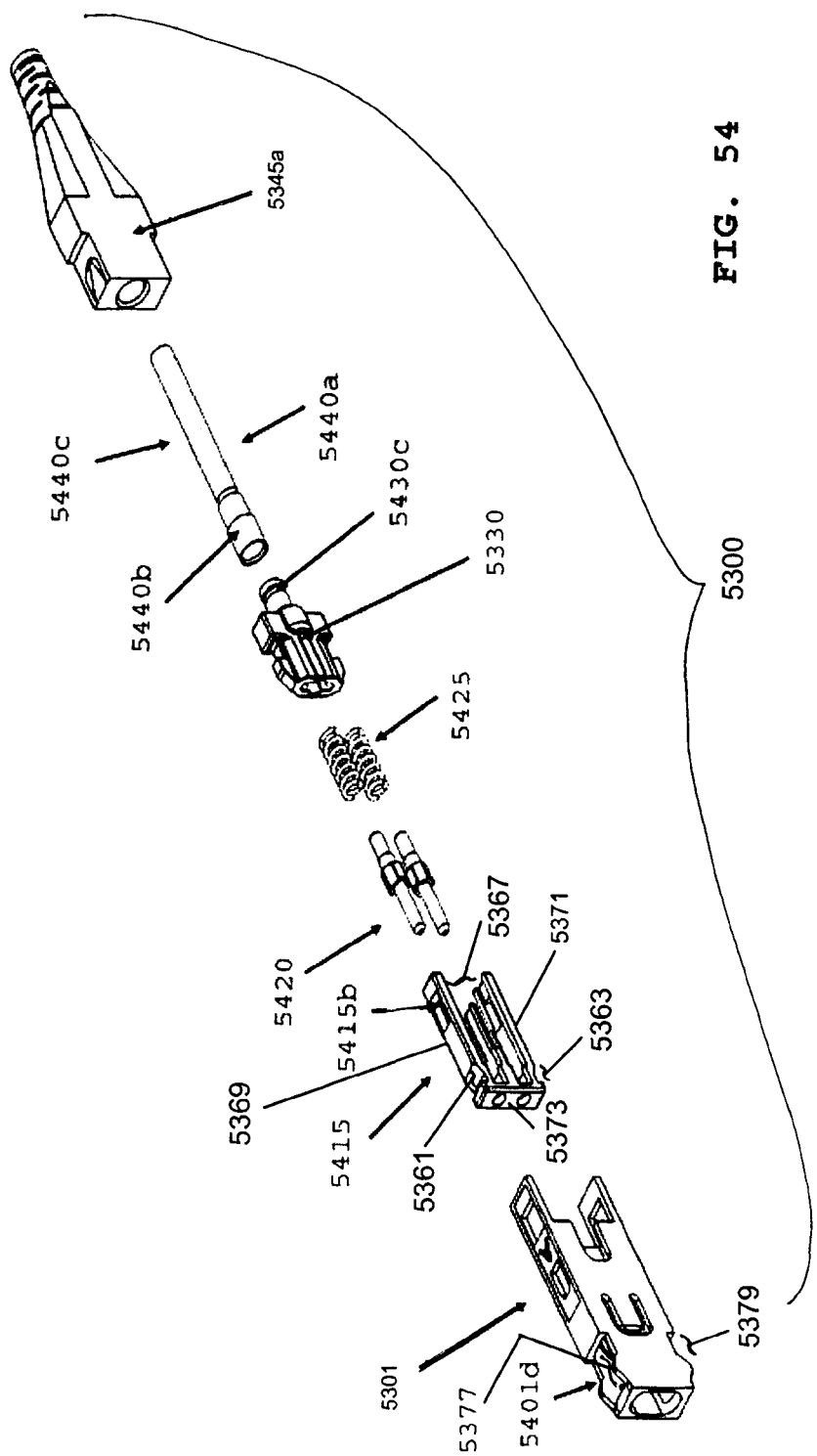

ULTRA-SMALL FORM FACTOR OPTICAL CONNECTOR AND ADAPTER

CROSS-REFERENCE TO RELATED APPLICATIONS

This application is a continuation of PCTUS1913861 filed Jan. 16, 2019, which is a continuation-in-part of U.S. patent application Ser. No. 16/194,325, entitled ULTRA-SMALL FORM FACTOR OPTICAL CONNECTOR HAVING DUAL ALIGNMENT KEYS and filed on Nov. 17, 2018, and U.S. patent application Ser. No. 16/103,555, entitled ULTRA-SMALL FORM FACTOR OPTICAL CONNECTORS USING A PUSH-PULL BOOT RECEPTACLE RELEASE and filed on Aug. 14, 2018, each of which is a continuation-in-part of U.S. patent application Ser. No. 16/035,691, entitled ULTRA-SMALL FORM FACTOR OPTICAL CONNECTORS and filed on Jul. 15, 2018, which claims priority to U.S. Provisional Patent Application No. 62/588,276, entitled Micro Optical Connectors and filed on Nov. 17, 2017, U.S. Provisional Patent Application No. 62/549,655, entitled Grouped Mini Fiber Optic Connectors and filed on Aug. 24, 2017, and U.S. Provisional Patent Application No. 62/532,710, entitled Grouped Mini CS Fiber Optic Connectors and filed on Jul. 14, 2017, each of which is hereby expressly incorporated by reference in its entirety.

FIELD

The present disclosure relates generally to ultra-small form factor optical connectors and adapters.

BACKGROUND

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, room for improvement in the area of data centers, specifically as it relates to fiber optic connections, still exists. For example, manufacturers of connectors and adapters are always looking to reduce the size of the devices, while increasing ease of deployment, robustness, and modifiability after deployment. In particular, more optical connectors may need to be accommodated in the same footprint previously used for a smaller number of connectors in order to provide backward compatibility with existing data center equipment. For example, one current footprint is known as the small form-factor pluggable transceiver footprint (SFP). This footprint currently accommodates two LC-type ferrule optical connections. However, it may be desirable to accommodate four optical connections (two duplex connections of transmit/receive) within the same footprint. Another current footprint is the quad small form-factor pluggable (QSFP) transceiver footprint. This footprint currently accommodates four LC-type ferrule optical connections. However, it may be desirable to accommodate eight optical connections of LC-type ferrules (four duplex connections of transmit/receive) within the same footprint.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to the individual release mechanisms. Such physical obstructions may impede the ability of an operator to minimize the stresses applied to the cables and the connectors. For example, these stresses may be applied when the user reaches into a dense group of connectors and pushes aside surrounding optical fibers and connectors to access an individual connector release mechanism with his/her thumb and forefinger. Overstressing the cables and connectors may produce latent defects, compromise the integrity and/or reliability of the terminations, and potentially cause serious disruptions to network performance.

While an operator may attempt to use a tool, such as a screwdriver, to reach into a dense group of connectors and activate a release mechanism, adjacent cables and connectors may obstruct the operator's line of sight, making it difficult to guide the tool to the release mechanism without pushing aside the adjacent cables. Moreover, even when the operator has a clear line of sight, guiding the tool to the release mechanism may be a time-consuming process. Thus, using a tool may not be effective at reducing support time and increasing the quality of service.

SUMMARY OF THE INVENTION

An optical connector holding two or more LC-type optical ferrules is provided. The optical connector includes an outer body, an inner front body accommodating the two or more LC-type optical ferrules, ferrule springs for urging the optical ferrules towards a mating receptacle, and a back body for supporting the ferrule springs. The outer body and the inner front body are configured such that four LC-type optical ferrules are accommodated in a small form-factor pluggable (SFP) transceiver footprint or eight LC-type optical ferrules are accommodated in a quad small form-factor pluggable (QSFP) transceiver footprint. A mating receptacle (transceiver or adapter) includes a receptacle hook and a housing with an opening that accommodates the receptacle hook in a flexed position as the optical connector makes connection with the mating receptacle by introducing the receptacle hook into an optical receptacle hook recess.

BRIEF DESCRIPTION OF THE DRAWINGS

FIG. 1C is a top view of the prior art adapter of FIG. 1B;

FIG. 1D is a front view of the prior art adapter of FIG. 1B, showing the 6.25 mm pitch;

FIG. 12A is a side view of the outer housing of a connector being removed;

FIG. 12B is a perspective view of a transparent outer housing of a connector showing the front body;

FIGS. 18A-B are various views of one embodiment of an MT-type connector.

FIG. 18C is a perspective of a lens-type ferrule.

FIG. 25A is a cross-sectional view of the adapter of FIG. 24, assembled.

FIG. 28A is an isometric view of the back body of the micro optical connector of FIG. 21A.

FIG. 28B is a side view of the back body of FIG. 28A.

FIG. 32B is a cross-sectional view of the micro optical connector of FIG. 21B latched (left) and unlatched (right) within the adapter of FIG. 24, assembled.

FIG. 33A depicts the micro optical connector of FIG. 21B in a QSFP footprint, depicting dimensions in millimeters.

FIG. 34A-34C depicts adapter hooks interacting with the micro optical connectors of FIG. 21B before (FIG. 34A), during (FIG. 34B), and after (FIG. 34C) latching.

FIG. 42A is an isometric view of the front body of the micro optical connector of FIG. 41.

FIG. 42B is a side view of the front body of FIG. 42A.

FIG. 43 is an isometric view of the back body of the micro optical connector of FIG. 41.

FIG. 54 is an exploded view of FIG. 53 connector.

Corresponding reference characters indicate corresponding parts throughout the drawings.

DETAILED DESCRIPTION

Figures 1A, 1B:
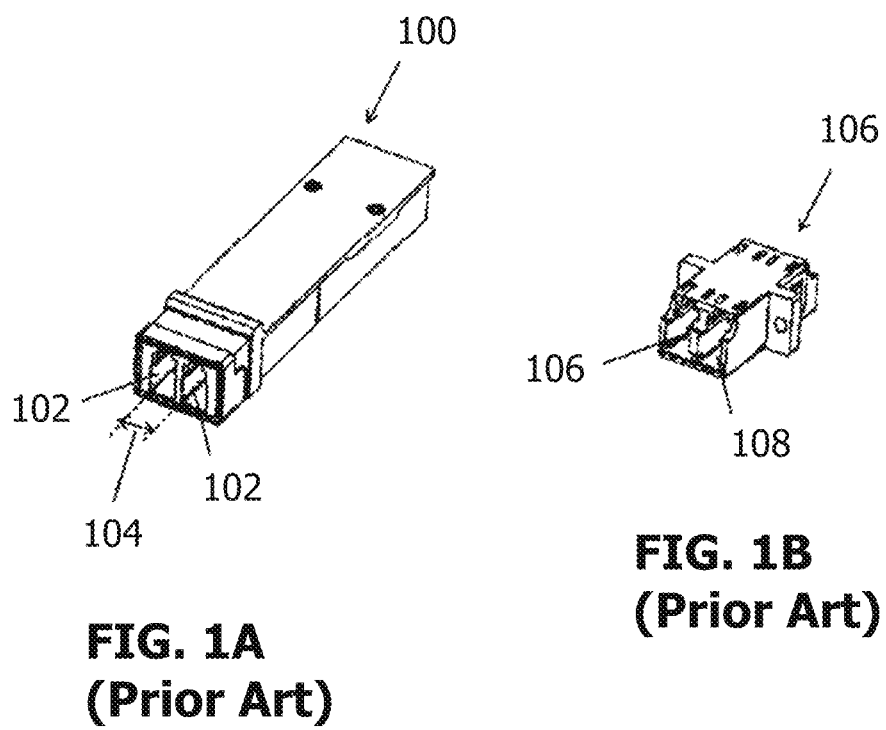
FIG. 1A is a perspective view of a prior art standard 6.25 mm pitch LC connector SFP.
FIG. 1B is a perspective view of a prior art standard 6.25 mm pitch LC adapter.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A connector, as used herein, refers to a device and/or components thereof that connects a first module or cable to a second module or cable. The connector may be configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, a CS connector, or a straight tip (ST) connector. The connector may generally be defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

An "adapter" as used herein refers to any device that defines a receptacle for receiving an optical connector at least at one end and that is configured to make an optical connection of the optical connector(s) received in the receptacle to an optical communication device (e.g., another optical connector, a bare or sheathed optical fiber, an optical device, an optoelectronic device, etc.) on the other end of the adapter. Hence, for purposes of this disclosure, "adapter" includes two-sided adapters that have mating receptacles for optical connectors at opposite ends of the adapter, as well as transceivers that define a single receptacle at one end to facilitate a connection of an optical connector in the receptacle to another type of optical communication device at the opposite end of the transceiver.

Various embodiments described herein generally provide a remote release mechanism such that a user can remove cable assembly connectors that are closely spaced together on a high density panel without damaging surrounding connectors, accidentally disconnecting surrounding connectors, disrupting transmissions through surrounding connectors, and/or the like. Various embodiments also provide narrow-pitch LC duplex connectors and narrow-width multi-fiber connectors, for use, for example, with future narrow-pitch LC SFPs and future narrow width SFPs. The remote release mechanisms allow use of the narrow-pitch LC duplex connectors and narrow-width multi-fiber connectors in dense arrays of narrow-pitch LC SFPs and narrow-width multi-fiber SFPs.

FIG. 1A shows a perspective view of a prior art standard 6.25 mm pitch LC connector SFP 100. The SFP 100 is configured to receive a duplex connector and provides two receptacles 102, each for receiving a respective LC connector. The pitch 104 is defined as the axis-to-axis distance between the central longitudinal axes of each of the two receptacles 102. FIG. 1B shows a perspective view of a prior art standard 6.25 mm pitch LC adapter 106. The adapter 106 is also configured to receive a duplex connector, and provides two receptacles 108, each for receiving a respective LC connector. FIG. 1C is a top view of the adapter 106 of FIG. 1B. The pitch of the adapter 106 is defined similarly to that of the SFP 100, as the axis-to-axis distance between the central longitudinal axes of each of the two receptacles 108, as illustrated in FIG. 1D, which shows a front view of the adapter 106.

Figures 2A, 2B:
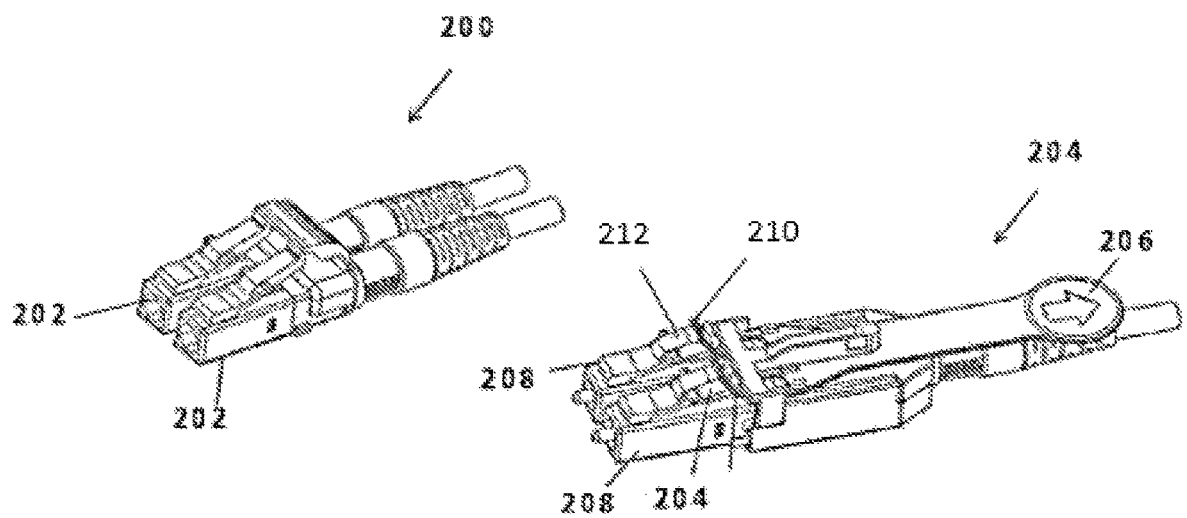
FIG. 2A is a perspective view of a prior art LC duplex connector.
FIG. 2B is a perspective view of a prior art LC duplex connector with a remote release pull tab.
Figures 2C, 2D:
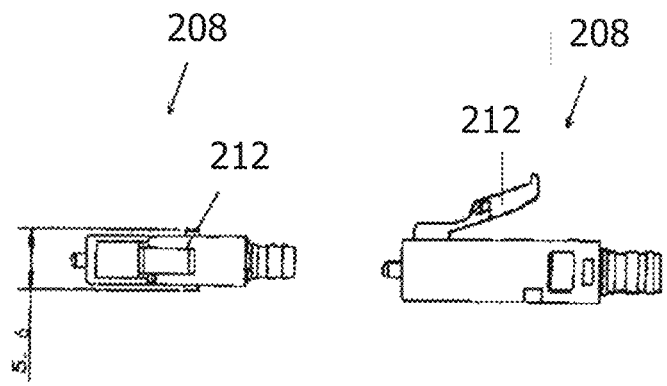
FIG. 2C is a top view of a prior art LC connector used in the embodiments shown in FIGS. 2A and 2B.
FIG. 2D is a side view of the prior art LC connector of FIG. 2C.

FIG. 2A shows a prior art LC duplex connector 200 that may be used with the conventional SFP 100 and the conventional adapter 106. The LC duplex connector 200 includes two conventional LC connectors 202. FIG. 2B shows another prior art LC duplex connector 204 having a remote release pull tab 206, and including two conventional LC connectors 208. As shown, the remote release pull tab includes two prongs 210, each configured to couple to the extending member 212 of a respective LC connector 208. FIGS. 2C and 2D show top and side views, respectively, of the conventional LC connector 208, having a width of 5.6 mm, and further showing the extending member 212.

As discussed herein, current connectors may be improved by various means, such as, for example, reducing the footprint, increasing the structural strength, enabling polarity changes, etc. Various embodiments disclosed herein offer improvements over the current state of the art, as will be further discussed below.

Figure 3:
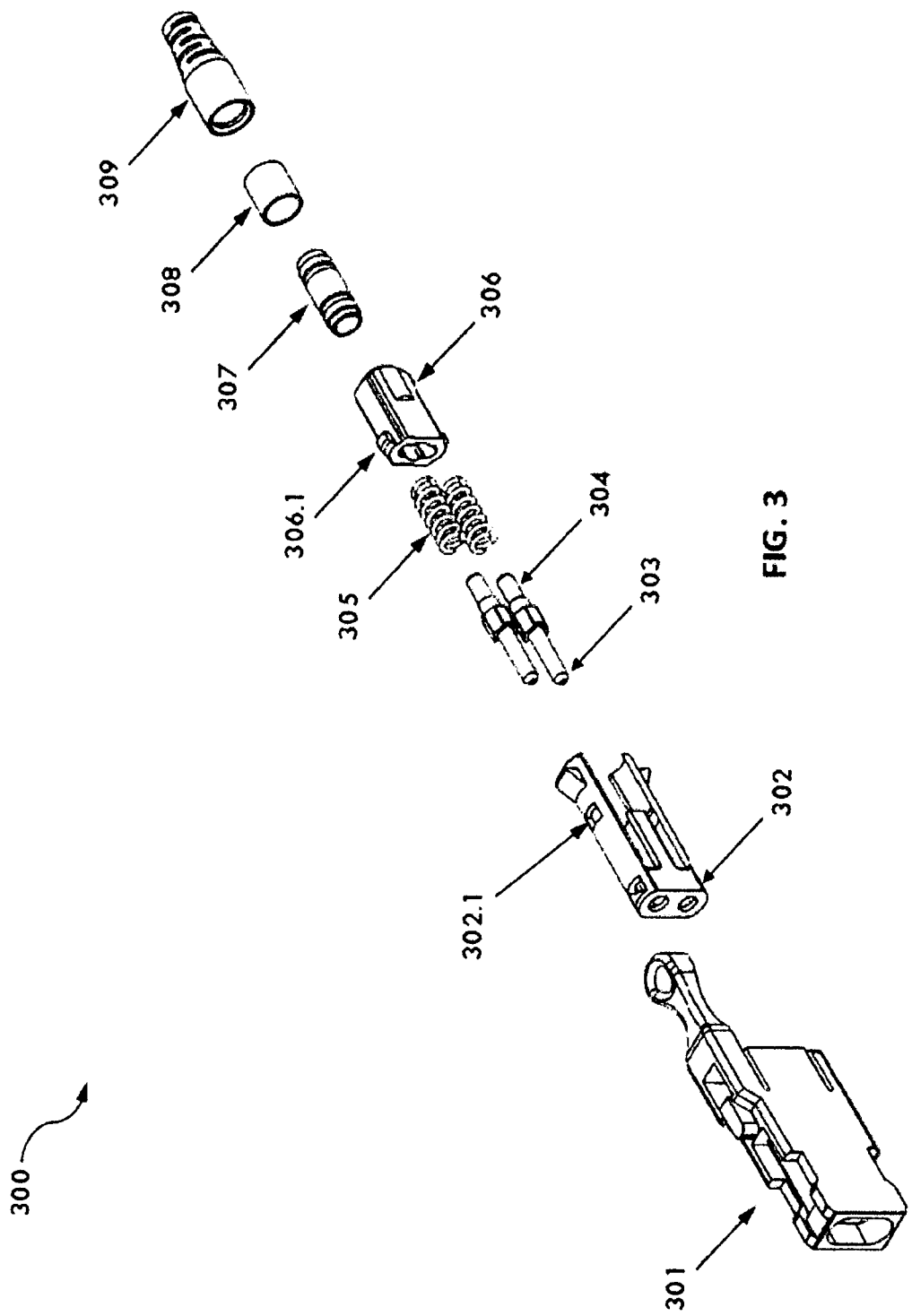
FIG. 3 is an exploded view of one embodiment of a connector.

In some embodiments, as shown in FIG. 3, a connector 300 may comprise various components. Referring to FIG. 3, an illustrative embodiment of a connector 300 is shown in an exploded view to display detail. In some embodiments, and as discussed further herein, a connector 300 may have an outer housing 301, a front body 302, one or more ferrules 303, one or more ferrule flanges 304, one or more springs 305, a back body 306, a back post 307, a crimp ring 308, and a boot 309. In some embodiments, the back body 306 may comprise one or more protrusions 306.1 which may interlock with a window/cutout 302.1 in the front body 302. This may allow for the back body 306 and the front body 302 to be securely fastened together around the ferrule(s) 303, ferrule flange(s) 304, and the spring(s) 305. The elements of FIG. 3 are configured such that two optical connectors having four LC-type optical ferrules may be accommodated in a small form-factor pluggable (SFP) transceiver footprint or at least two optical connectors having a total of eight LC-type optical ferrules may be accommodated in a quad small form-factor pluggable (QSFP) transceiver footprint.

Figure 4:
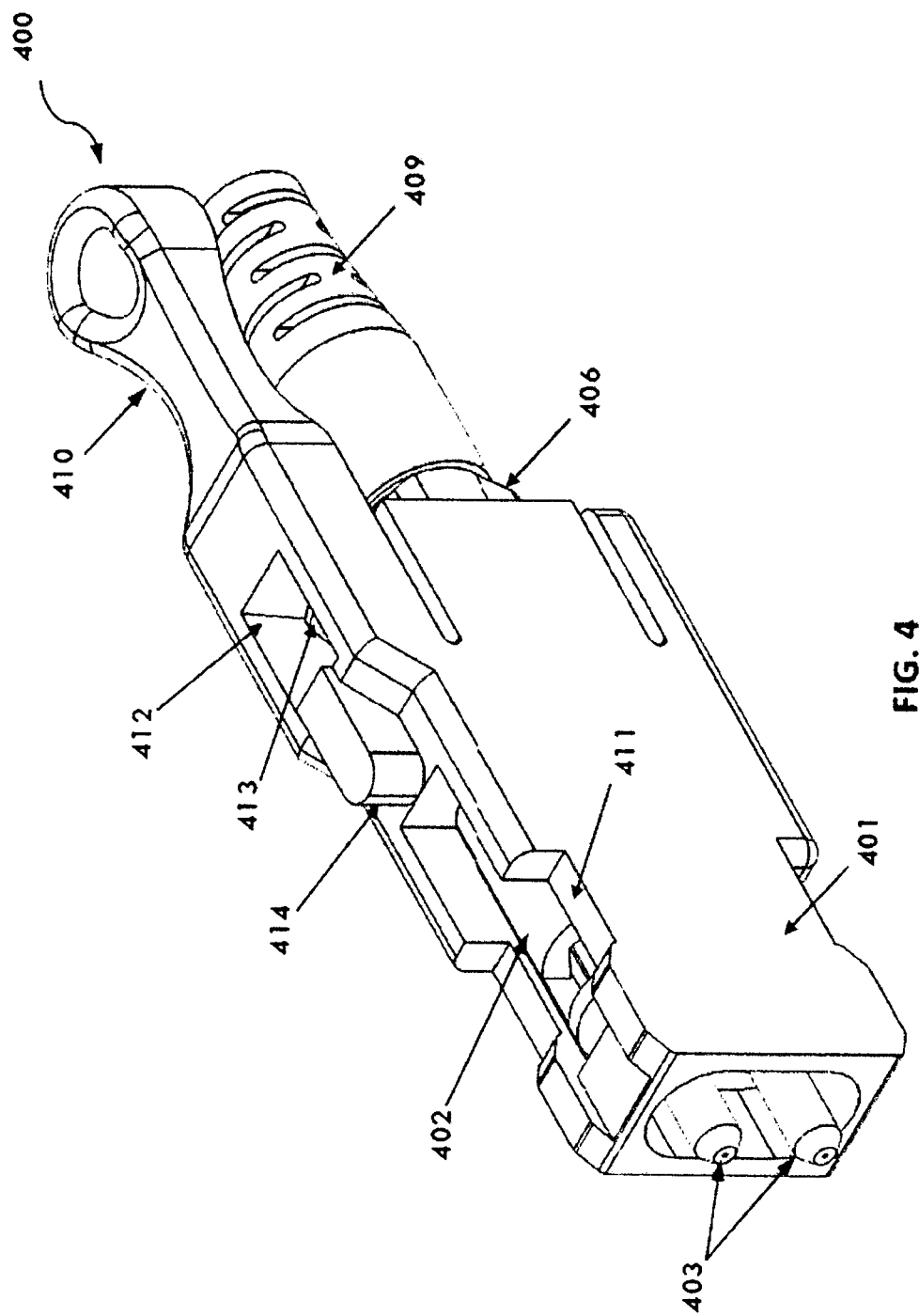
FIG. 4 is a perspective view of one embodiment of a connector.

Referring now to FIG. 4, an embodiment is shown wherein the connector 400 is assembled. In some embodiments, the assembled connector may have an outer housing 401, a front body 402 positioned within the outer housing, one or more ferrules 403, one or more ferrule flanges (not shown), one or more springs (not shown), a back body 406, a back post (not shown), a crimp ring (not shown), a boot 409, and a push-pull tab 410. In some embodiments, the connector may have one or more latching mechanisms made up of a window 412 on the outer housing 401 near the push-pull tab 410 and a protrusion 413 on the front body. The latching mechanism made up of the window 412 and protrusion 413 securely attaches the outer housing 401 to the front body 402. In a further embodiment, the outer housing 401 may have a recess 411 to receive a locking tab or locking mechanism from an adapter (depicted in FIG. 13, below). The recess 411 of the outer housing 401 is used to interlock with an adapter (depicted in FIG. 13, below) or transceiver receptacle to secure the connector into the adapter. As would be understood by one skilled in the art, the push-pull tab 410 enables removal of the connector from a receptacle without requiring additional tools. Alternatively, the push-pull tab may be eliminated and the connector removed manually. In one or more further embodiments, the outer housing 401 may also have a key 414. The key 414 may keep the connector in a given orientation when inserted into a receptacle such as an adapter or transceiver.

Figure 5:
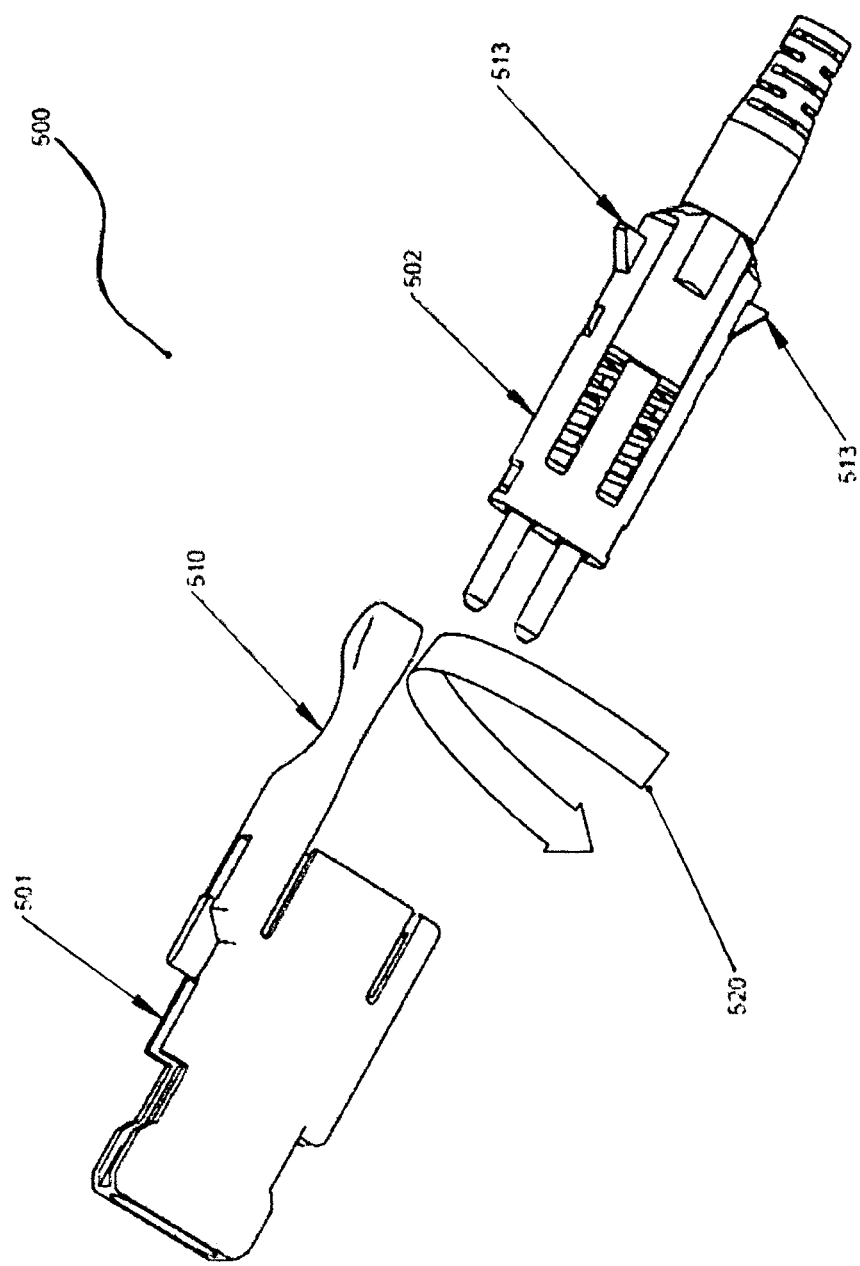
FIG. 5 is a perspective view of one embodiment of a connector with the outer housing removed from the front body.

FIG. 5 depicts a procedure for changing the polarity of the optical connectors of the present disclosure. As shown in FIG. 5, in some embodiments, the latching mechanism of the connector 500 may be made up of two main parts: a window (not visible) and one or more protrusions 513. As illustrated in FIG. 5, the outer housing 501 can slide on to or be removed from the front body 502 by disengaging the latching mechanisms formed by the protrusion 513 exiting through the window, whereby it contacts a rear wall of the window (refer to FIG. 4 for an illustrated example of the outer housing being attached to the front body via the latching mechanism). In some embodiments, the push-pull tab 510 may be permanently attached to the outer housing 501, as shown.

The front body 502 may be removed from the outer housing 501, rotated 180° as indicated by arrow 520, and re-inserted into the outer housing. This allows for a change in the polarity of the front body 502, as shown by the arrow diagram in FIG. 5, and therefore the ferrules can switch quickly and easily without unnecessarily risking the delicate fiber cables and ferrules.

Figure 6:
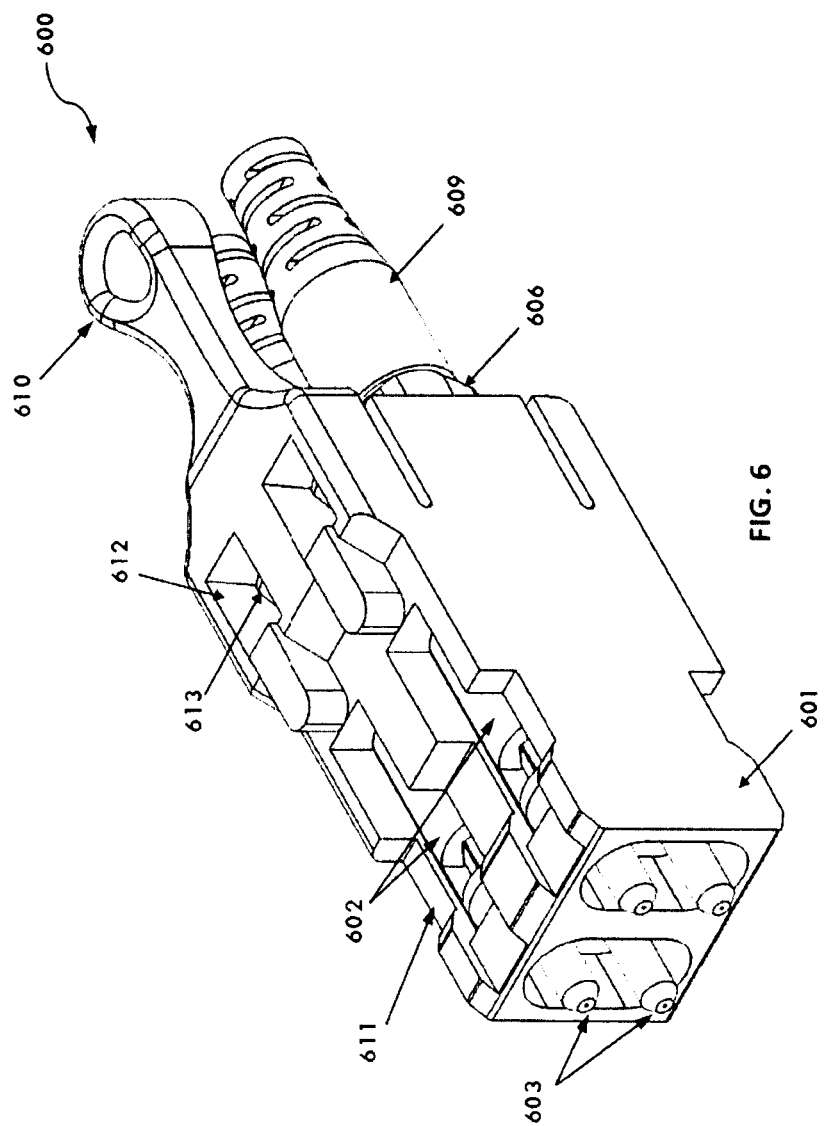
FIG. 6 is a perspective view of one embodiment of a duplex connector.

In some embodiments, it may be beneficial to connect two or more connectors together to increase structural integrity, reduce the overall footprint, and cut manufacturing costs. Accordingly, as shown in FIG. 6, a connector 600 may in some embodiments, utilize an outer housing 601 that is capable of holding two front bodies 602. Various other embodiments are disclosed herein, and it should be noted that the embodiments disclosed herein are all non-limiting examples shown for explanatory purposes only.

Accordingly, although the embodiment shown in FIG. 6 utilizes a duplex outer housing 601, additional or alternative embodiments may exist with more capacity, for example, six or eight optical connectors within a single outer housing. As shown in FIG. 6, in some embodiments, the outer housing 601 may accept two front bodies 602, each with two separate ferrules 603. As shown, the front body(s) 602 may securely fasten to the outer housing 601 via the latching mechanism 612 and 613. In additional embodiments, the push-pull tab 610 may be modified, as shown, such that a single tab can be used to free the two or more connectors from an adapter. As illustrated in FIG. 6, the uni-body push-pull tab 610 and the outer housing 601 may have two windows 612 with which to receive multiple protrusions 613 of the front body(s) 602. As discussed herein the recesses 611 of the outer housing 601 are used to secure the connectors to an adapter (depicted in FIG. 13 below). In one or more further embodiments, the connectors may have individual back bodies 606 and boots 609 (i.e., one back body/boot per front body) as shown.

Figure 7:
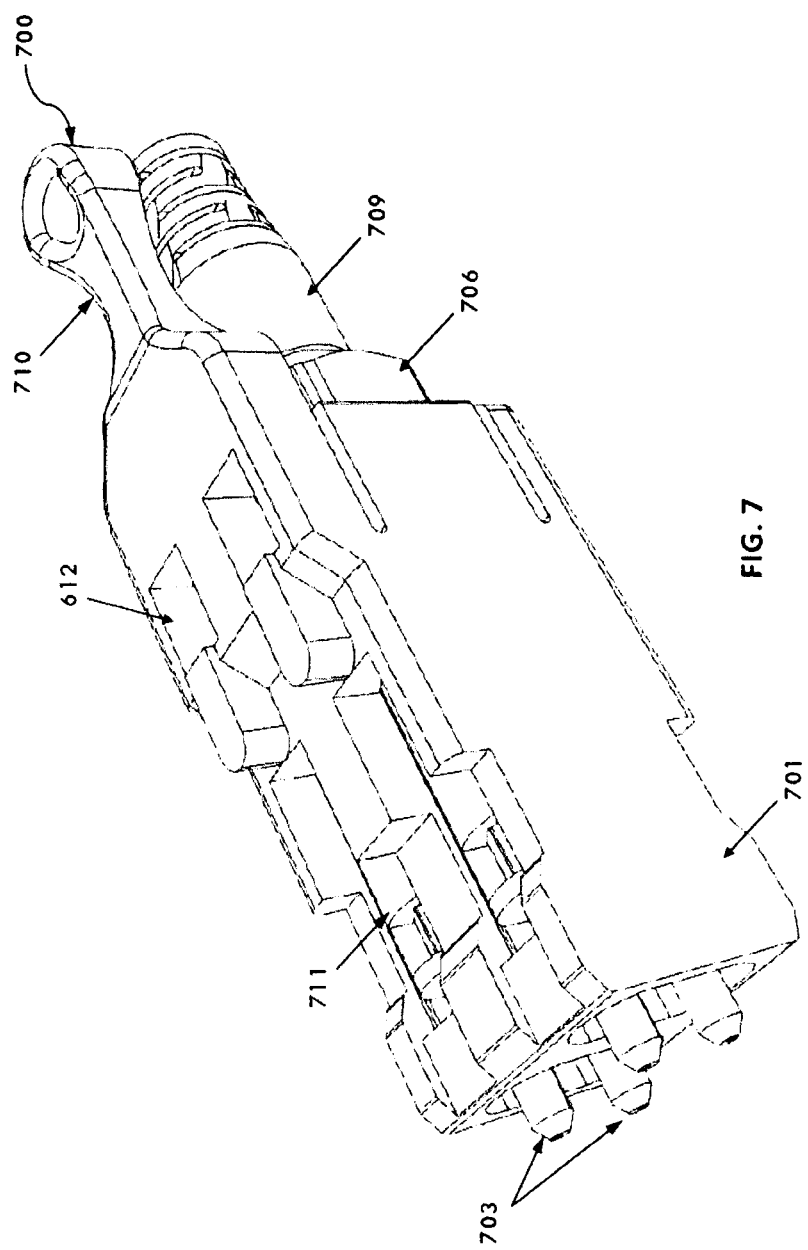
FIG. 7 is a perspective view of another embodiment of a duplex connector.

Alternatively, in some embodiments, such as that shown in FIG. 7, the connector 700 may have a single boot 709 and a duplex (i.e., uni-body) back body 706 instead of individual back bodies (e.g., such as shown in FIG. 6). In some embodiments, the duplex back body 706 may have different dimensions than that of the individual back bodies of FIG. 6, such as, for example, they may be longer to accommodate the need for routing the fiber after it exits the boot 709. As with other embodiments discussed herein, the connector shown in FIG. 7 may also include an outer housing (e.g., duplex outer housing) 701, one or more ferrules 703, at least one latching mechanism formed by the protrusion (not shown) exiting through one or more windows 712, and a push-pull tab 710.

As stated, it may be beneficial to connect two or more connectors together to increase structural integrity, reduce the overall footprint, and cut manufacturing costs. Accordingly, similar to FIG. 6, FIG. 8 shows a connector 800 that may, in some embodiments, utilize an outer housing 801 that is capable of holding multiple (e.g., four) front bodies 802.

Figure 8:
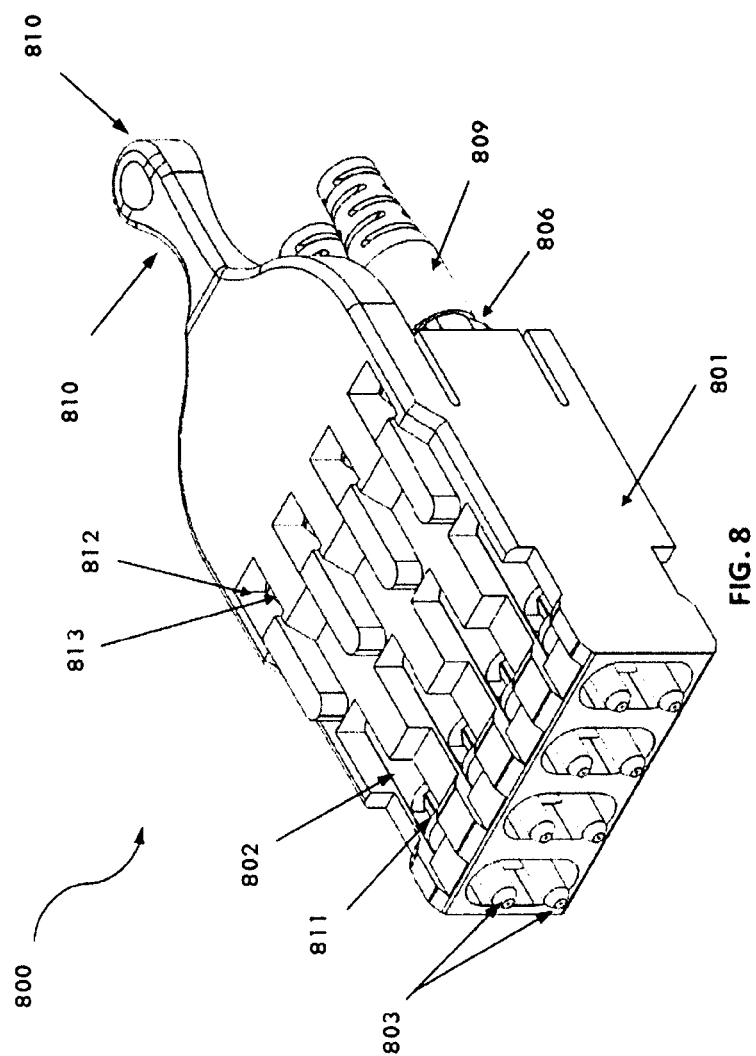
FIG. 8 is a perspective view of one embodiment of a quad connector.

As shown in FIG. 8, some embodiments may have an outer housing 801 able to accept up to four front bodies 802, each with one or more ferrules 803. As shown, each front body 802 may securely fasten to the outer housing 801 via the latching mechanism 812 and 813. In additional embodiments, the push-pull tab 810 may be modified such that a single tab can be used to remove the up to four connectors from an adapter. As illustrated in FIG. 8, the push-pull tab 810 may include four recesses 811, which as discussed herein are used to secure the connector to a receptacle such as an adapter (shown in FIG. 13, below) or the front receptacle portion of a transceiver. In one or more further embodiments, the connectors may have individual back bodies 806 and boots 809 (i.e., one back body/boot per front body) as shown.

Figure 9:
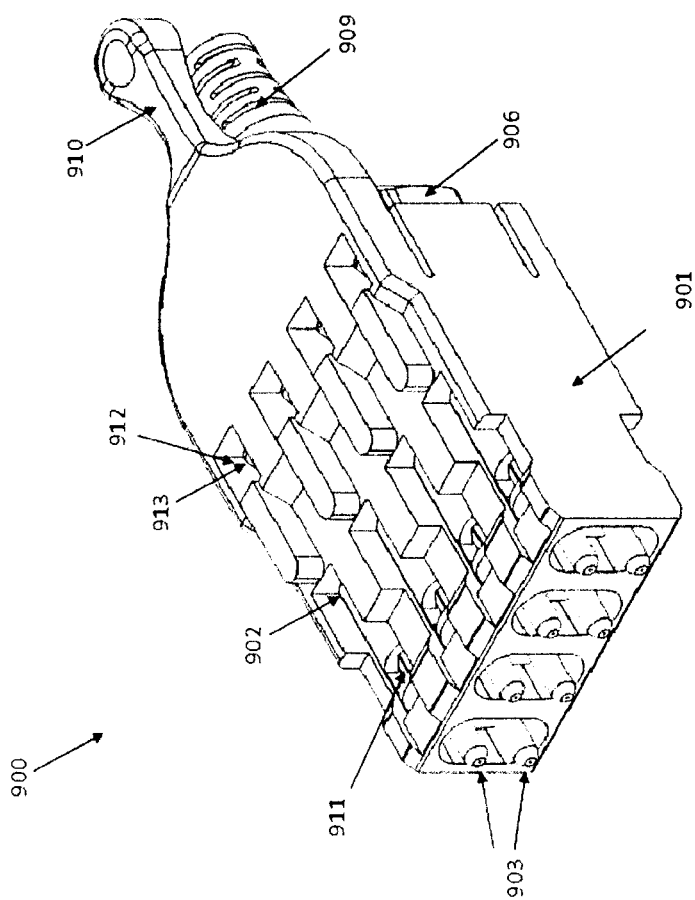
FIG. 9 is another perspective view of one embodiment of a quad connector.

Similar to FIG. 8, FIG. 9 shows an embodiment where the outer housing 901 is able to accept up to four front bodies 902, each with one or more ferrules 903. As shown, each front body 902 may securely fasten to the outer housing 901 via the latching mechanism 912 and 913. In additional embodiments, the push-pull tab 910 may be modified such that a single tab can be used to remove the up to four CS connectors from an adapter. As illustrated in FIG. 9, the push-pull tab 910 may include four recesses 911, which as discussed herein are used to secure the connector to an adapter (shown in FIG. 13, below) or the optical receptacle portion of a transceiver. The FIG. 9 embodiment may utilize a single back body 906 and a single boot 909. In one or more further embodiments, the connectors may have individual back bodies 906 and boots 909 (i.e., one back body/boot for all four front bodies) as shown.

In another aspect, the present disclosure provides method for reconfiguring optical cables in which the outer housings of the connectors may be removed and the remaining portion of the assembled connector is inserted into a housing having a larger or smaller capacity. For example, the outer housings of plural two-ferrule capacity housings may be removed and the connector inner body and associated components inserted into a second outer housing that has either a four-ferrule or eight-ferrule capacity. Alternatively, an outer housing with a four-ferrule capacity may be removed and the inner bodies and associated components are inserted into two second outer housings, each of the two second housings having a two-ferrule capacity. Similarly, an outer housing with an eight-ferrule capacity may be removed and replaced by two four-ferrule capacity housing or a four-ferrule capacity and two two-ferrule capacity housings. In this manner, cables may be flexibly reconfigured to match the capacity of a mating optical-electrical component such as a transceiver. This aspect of the present disclosure is demonstrated in connection with FIG. 10.

Figure 10:
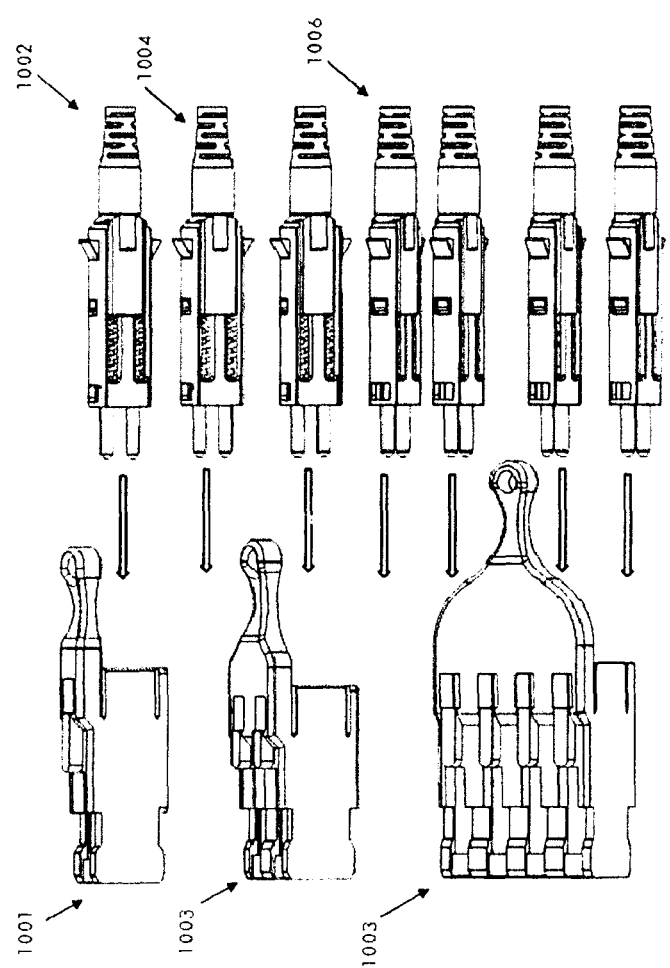
FIG. 10 shows various embodiments of adapter types.

Referring now to FIG. 10, various embodiments may exist such as a single housing 1001 which receives a single connector 1002. Additional embodiments may also exist, such as a duplex housing 1003 which receives two connectors 1004 and/or a quad housing 1005 which may receive up to four connectors 1006. It should be understood by one skilled in the art that various other embodiments may exist that are not explicitly shown. For example, a housing with the capacity for 5, 6, 7, 8, 9, 10 or more connectors may be utilized for various embodiments disclosed herein. As shown below, it is desirable to have flexible housing configurations so that connectors may be grouped and ungrouped between optical and optoelectronic components such as adapters and transceivers.

Alternatively, in some embodiments the connector may utilize one or more duplex back bodies with a single boot, similar to that shown in FIG. 7. Thus, similar to FIG. 7, an embodiment may allow for a further reduced footprint, less cabling, and easier maintenance of the connector. Accordingly, one or more embodiments may have an outer housing that may accept up to four front bodies, each with one or more ferrules. In some embodiments, each front body may securely fasten to the outer housing via a latching mechanism. In additional embodiments, the push-pull tab may be modified such that a single tab can be used to free the up to four front bodies from an adapter. The push-pull tab may include four openings with which to receive multiple locking tabs of the outer housing. As discussed herein the locking tabs of the outer housing are used to secure the connectors to an adapter (shown in FIG. 13) or the optical receptacle portion of a transceiver.

In further embodiments, the connector may utilize a single uni-body back body with a single boot (i.e., as shown in FIG. 9). Thus, an embodiment may allow for a further reduced foot print, less cabling, and easier maintenance of the connector. Accordingly, one or more embodiments may have an outer housing that may accept up to four front bodies, each with one or more ferrules. Each front body may securely fasten to the outer housing via the latching mechanism as discussed herein. In additional embodiments, the push-pull tab may be modified such that a single tab can be used to remove up to four connectors from an adapter. The push-pull tab may include four openings with which to receive multiple locking tabs of the outer housing. As discussed herein the locking tabs of the outer housing are used to secure the connectors to an adapter.

Figure 11A:
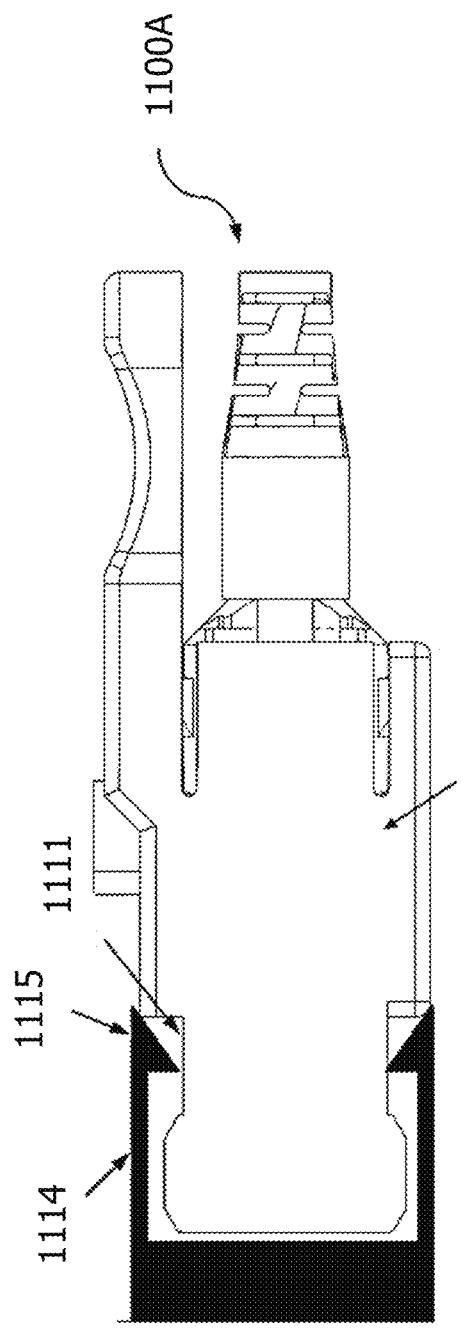
FIG. 11A is a side view of a connector connected to an adapter.

The optical connectors of the present disclosure are all configured to be received in a receptacle. As used herein, the term "receptacle" relates generically to a housing that receives an optical connector. A receptacle includes both optical adapters, that is, components that mate two or more optical connectors, and transceivers, which include an optical receptacle to hold connectors that are to communicate with an optoelectronic component (e.g., a component that converts optical signals to electrical signals). As shown in FIG. 11A, in one embodiment 1100A, the outer housing 1101 may comprise one or more recesses 1111. As discussed and shown herein, the one or more recesses may allow for a receptacle 1114 to securely connect to the connector 1100A. Accordingly, in some embodiments, the receptacle 1114 may have a receptacle hook 1115, which is flexible and can secure the connector 1100A into the receptacle via latching onto the wall of the recess 1111, as shown. This latching takes place when the outer housing 1101 is pushed forward into the receptacle. The sloped portions of the outer housing 1101 allow the receptacle hook 1115 to slide up and over the front of the outer housing thereby securing the connector 1100A into the receptacle.

Figure 11B:
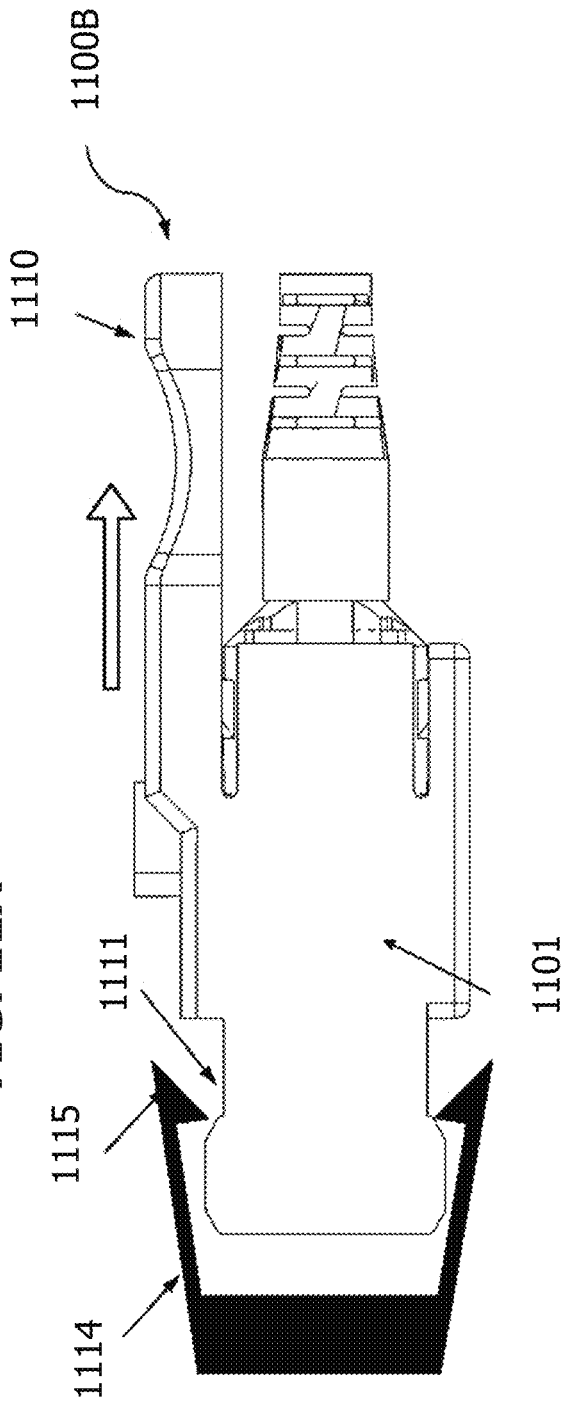
FIG. 11B is a side view of a connector being removed from an adapter.

Additionally or alternatively, in some embodiments, such as that shown in FIG. 11B, a connector 1100B may be removed from a receptacle 1114 by pulling the connector away from the adapter as indicated by the directional arrow. In some embodiments, the force may be applied by a user via the push-pull tab 1110. Alternatively, when a push-pull tab is not present, the connector may still be manually removed from a receptacle. As shown in FIG. 11B, as the connector 1100B is removed from the receptacle 1114, the flexible receptacle hooks 1115 separate and slide up the slope of the end of the connector and allow for removal of the connector from the receptacle.

Referring now to FIGS. 12A and 12B, as discussed herein and previously shown in FIG. 5, the front body 1202 can be removed from the outer housing 1201. In some embodiments, a portion of the outer body 1201 can be flexibly extended away from the front body 1202 as shown by the arrows in FIG. 12A. As discussed herein, in some embodiments, the front body 1202 may comprise a protrusion 1213 which interlocks with a window (not shown) on the outer housing 1201. Accordingly, when force is applied to the outer housing 1201 in a manner that removes the one or more protrusions 1213 from the one or more windows (not shown, see FIG. 4), the front body 1202 may be removed from the outer housing.

Figure 13:
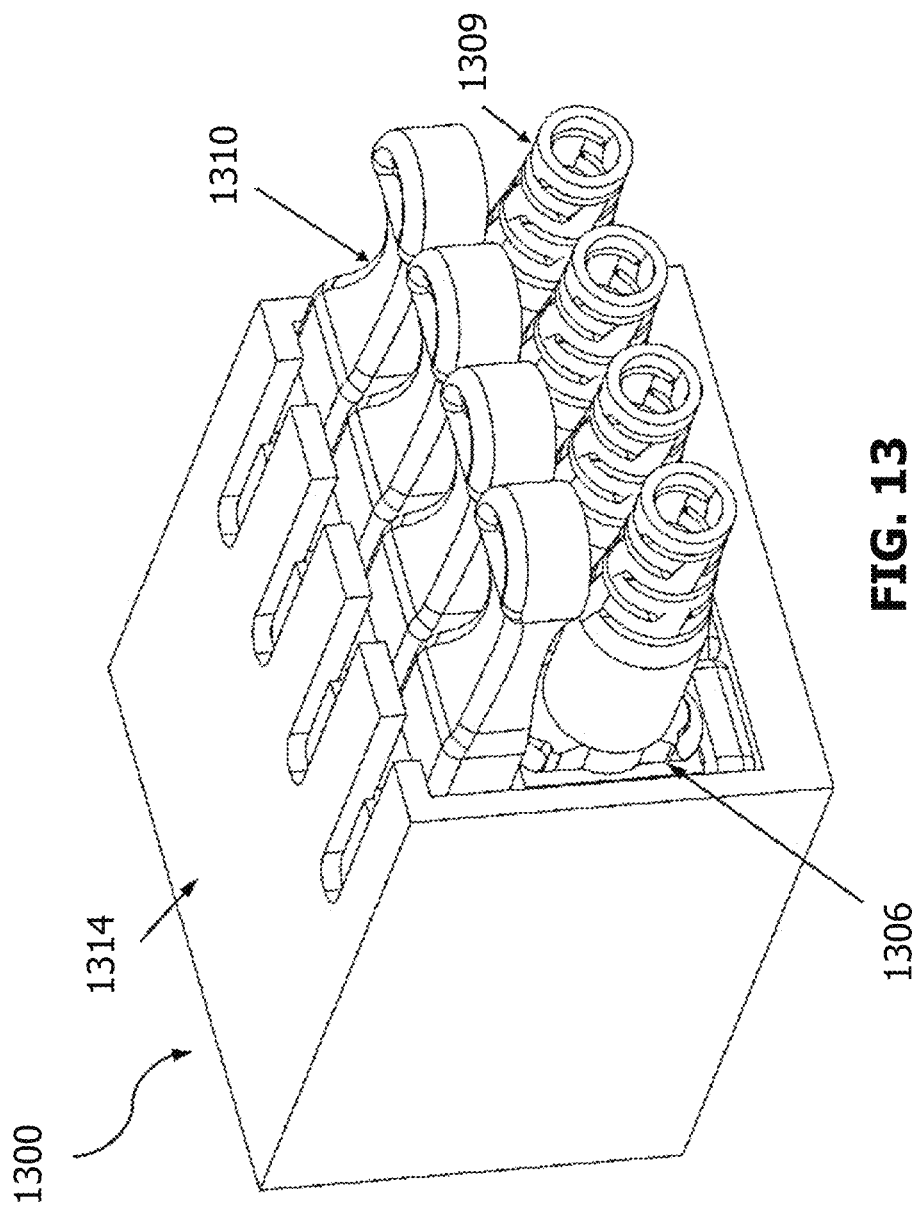
FIG. 13 is a perspective view of one embodiment of a quad connector inserted into a corresponding adapter.

Referring now to FIG. 13, an embodiment 1300 is shown in which the connector (not shown in its entirety) is inserted into a receptacle such as adapter 1314. In this specific non-limiting example, the connector is similar to that shown in FIG. 8 (i.e., comprising four front bodies each with their own back body 1306 and boot 1309). However, unlike FIG. 8, the embodiment shown here utilizes four individual push-pull tabs 1310 instead of a duplex push-pull tab system which manipulates two latching tabs per push-pull tab to allow the connector to be removed from the adapter 1314.

Figure 14:
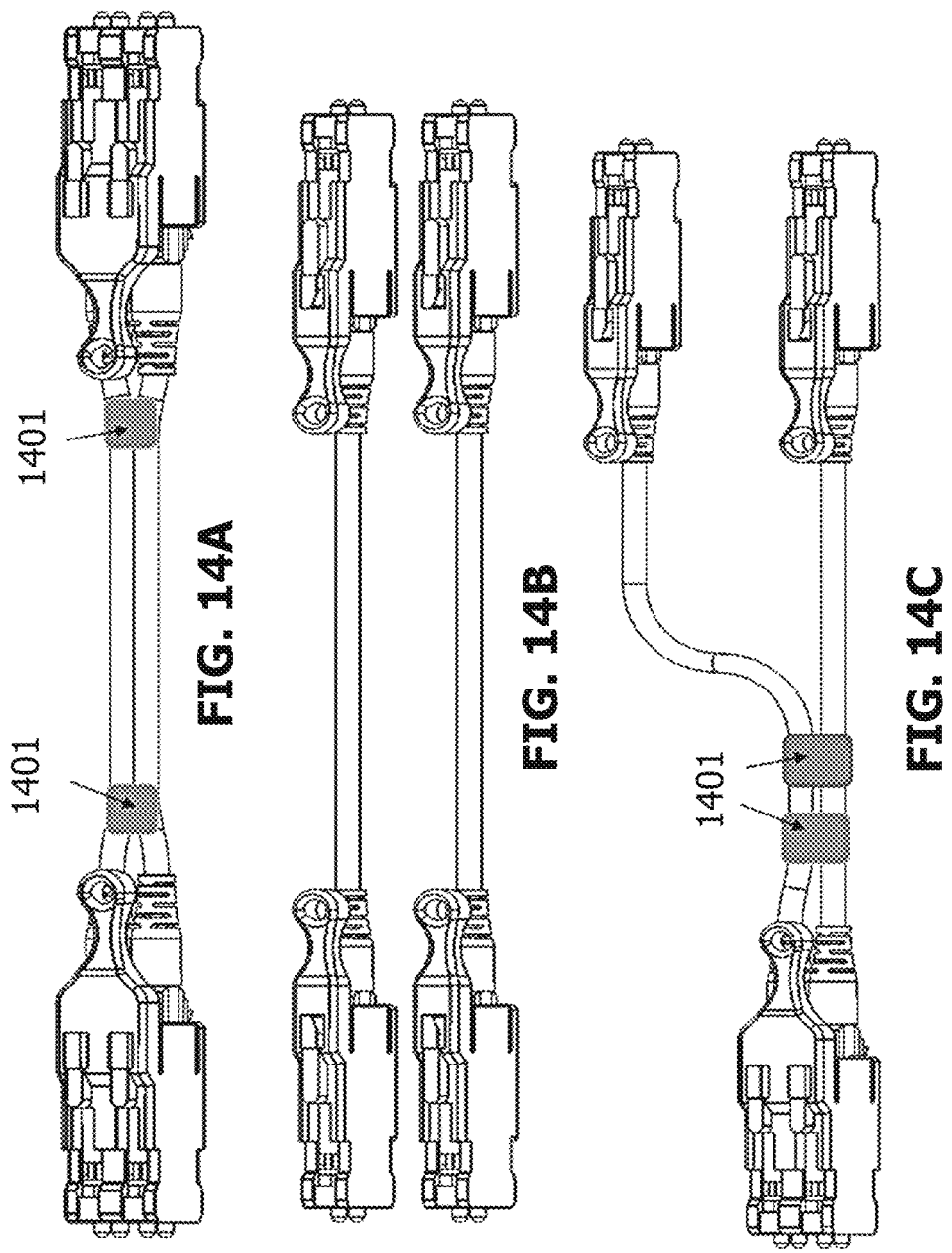
FIGS. 14A-C are illustrative examples of cable management using various embodiments of connectors.

Various benefits and details have been discussed herein with regard to the connectors and their modular ability (e.g., to include multiple connectors into a single housing). In addition to the reduced footprint, structural improvements, and cost reduction, various embodiments herein may also be beneficial with regard to reducing the burden of cabling in a data center environment. Illustrative embodiments shown in FIGS. 14A through 14C depict cable configurations that may be used to reduce the complexity of optical cables in a compact environment. Note that any of the optical connectors described in this disclosure may be used in these embodiments, including the optical connectors of FIGS. 21B, 37, and 41, to be discussed in detail below. FIG. 14A shows two duplex cables similar to the cable shown in FIG. 6. In some embodiments, one or more detachable clips 1401 may be attached to two or more zip cables to prevent the zip cables from detaching. This allows for two or more cables to be bundled and reduce the risk of entanglement with additional cables. FIG. 14B is an illustrative example of how easily an embodiment can separate into two individual connectors by unbinding the cables and thus quickly and easily creating two independent fiber optic channels that can move and be connected independently. FIG. 14C shows an embodiment in which a duplex connector like that of FIGS. 6 and 14A is connected to two separate individual connectors. Through the variable housing configurations depicted above in FIG. 10, the cable of FIG. 14A can be reconfigured as the cables of either 14B or FIG. 14C.

Figure 15:
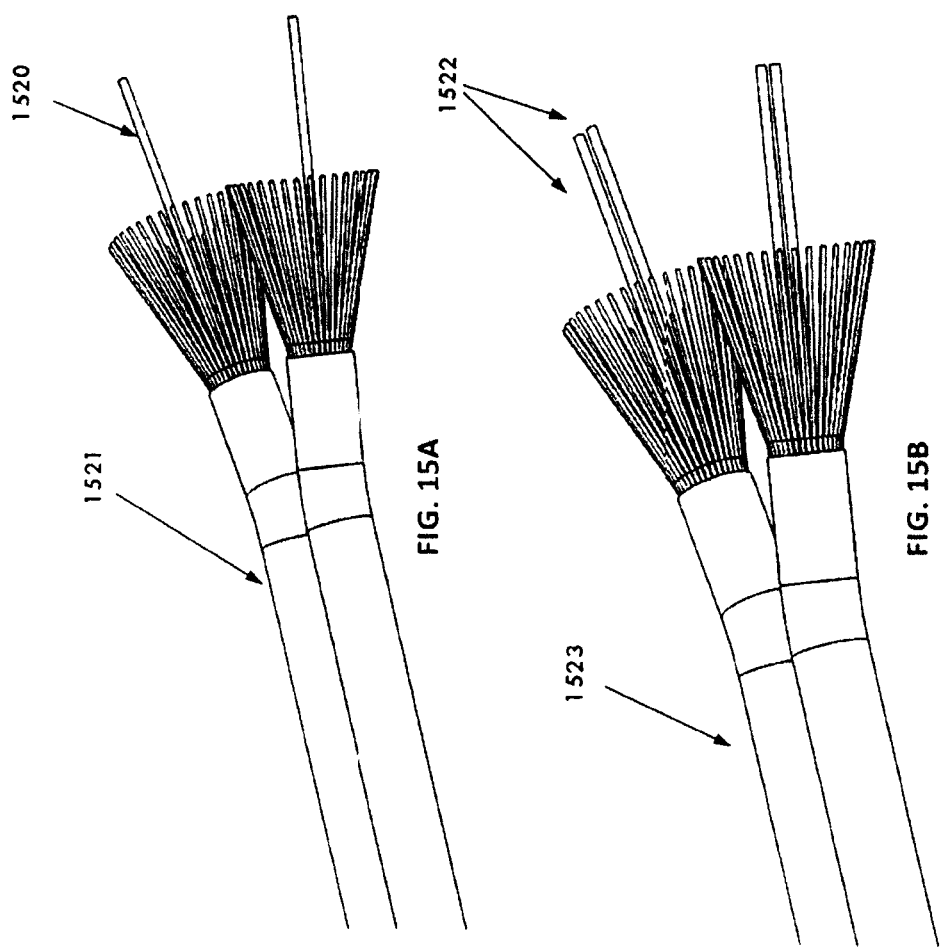
FIG. 15A-B are illustrative examples of cable management using multiple fiber strands per jacket.

In addition to binding existing fiber cables, some embodiments herein may utilize a new four fiber zip cable. Referring now to FIG. 15A, a conventional zip cable (i.e., one with a single fiber strand 1520 per jacket 1521) is shown in comparison with an embodiment in which two fibers 1522 per jacket 1523 are utilized. It should be understood that this is merely a non-limiting example. In some embodiments, multiple fibers may be included per jacket, such as, for example, four fibers per jacket in order to utilize the single boot 909 and uni-body rear body 906 of the connector shown in FIG. 9.

Figure 16:
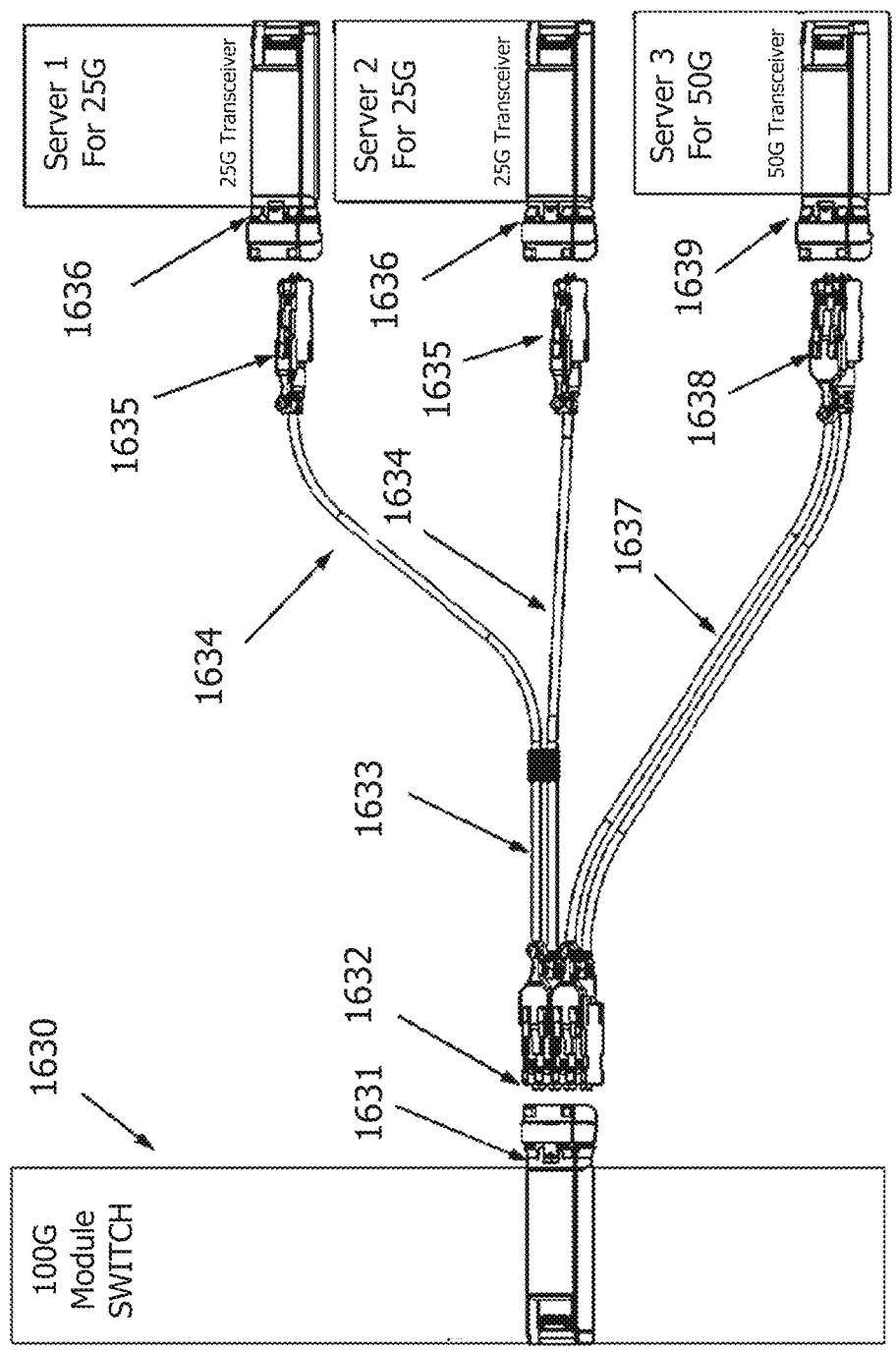
FIG. 16 is an illustrative example of using a cable management system using multiple fiber strands per jacket.

A specific example using multi-strand cables is shown in FIG. 16 for illustrative purposes only. It should be understood that numerous alternatives and modifications are possible, such as, for example, that shown in FIGS. 18A-18B and FIGS. 19A-19D. As shown, a switch (e.g., 100G switch) 1630 is shown with a transceiver (e.g., 100G transceiver) 1631. The transceiver 1631 has a receptacle to receive duplex connectors 1632. From each of the two duplex connectors 1632, a four fiber cable 1633 extends to connect to various other connectors and transceivers. In some embodiments, as discussed herein, a clip (e.g., detachable clip) 1640 may connect two or more cables (e.g., 1633) to ensure the zip cables do not come apart. As shown, one four fiber cable 1633 is split into two two-fiber cables 1634, which are then each attached to a single simplex connector 1635 and placed into a transceiver (e.g., 25G transceiver) 1636. As further shown, one of the four fiber cables 1637 is connected to a single duplex connector 1638, which is then inserted into another transceiver (e.g., 50G transceiver) 1639.

Figure 17:
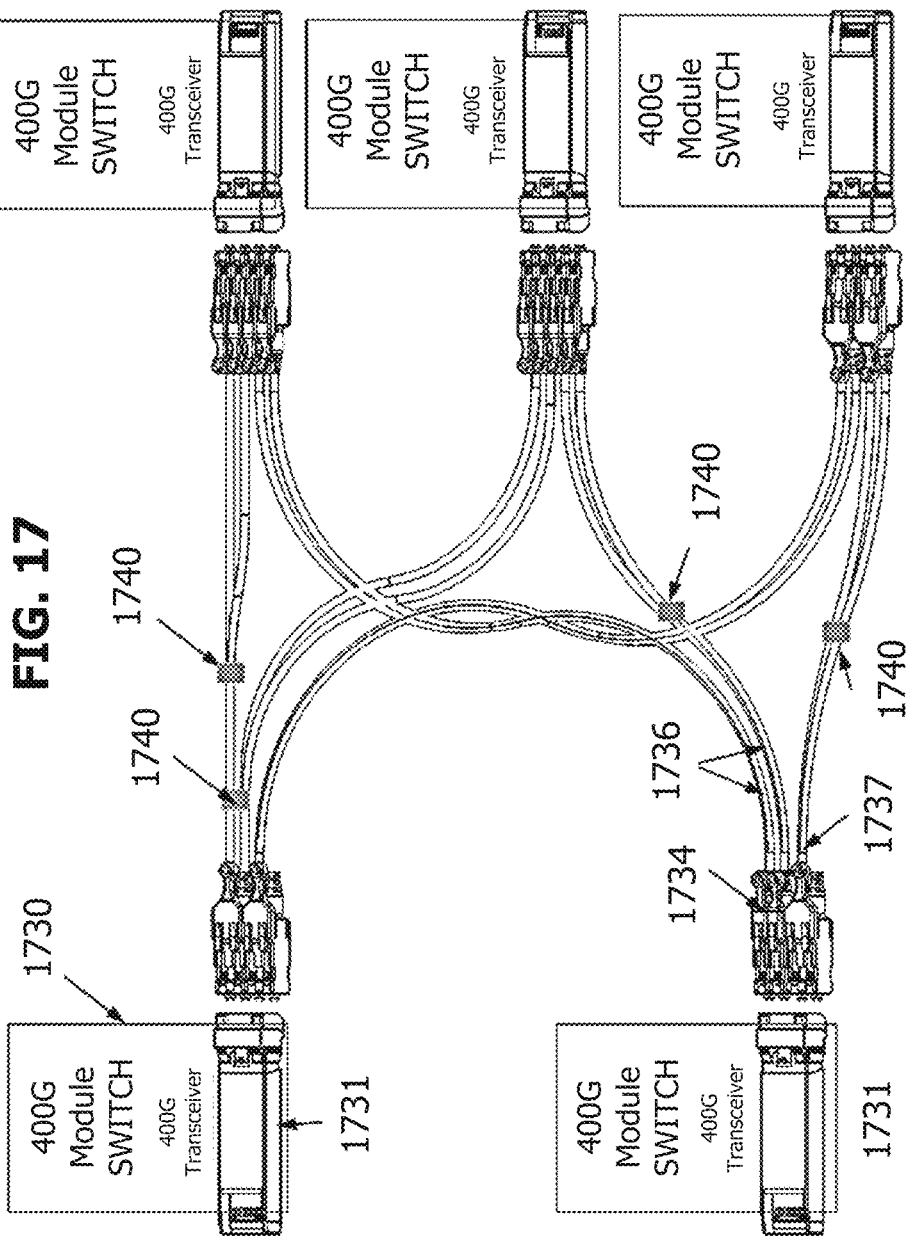
FIG. 17 is another illustrative example of using a cable management system using multiple fiber strands per jacket.

An additional or alternative embodiment is shown in FIG. 17. As shown, one or more switches (e.g., 400G switches) 1730 and 1732 are shown each with a transceiver (e.g., 400G transceiver) 1731 and 1733. The first transceiver 1731 has a receptacle that is receiving two simplex (single) connectors 1734 and one duplex (dual) connector 1735. From each of the two simplex connectors 1734, a two fiber cable 1736 extends to connect to various other connectors and transceivers. Similar to FIGS. 14 and 16, some embodiments may have a clip (e.g., detachable clip) 1740 that may connect two or more cables (e.g., 1736, 1738, etc.) to ensure the zip cables do not come apart. From the duplex connector 1735 a four-fiber cable 1737 is split into two two-fiber cables 1738, which are then each attached to a single simplex connector each and placed into a transceiver (e.g., 400G transceiver).

Accordingly, embodiments described herein allow for improvements over the current state of the art. By way of specific example, connectors generally have three types of fixed cables. Moreover, some cables may be bifurcated. As such, the cable cannot be split once installed and the polarity of the cables cannot be changed. Alternatively, the embodiments discussed herein may allow a user to change from a four-way to a 2-Duplex, to a 4-simplex connector, etc. (e.g., FIG. 20). Moreover, as discussed herein, the individual connectors can be split into individual connectors anytime, even after deployment. Additionally, the polarity can be changed within the connectors easily in a manner that does not risk damage to the one or more ferrules and fibers, as discussed above. It should also be noted that the depicted connectors are used herein merely for illustrative purposes, and that various other connectors may be used in any embodiment (e.g., an MT connector, such as that shown in FIGS. 18A-18B, and the optical connectors of FIGS. 21, 37, and 41).

FIGS. 18A-18B depict an optical connector including an MT ferrule 1810 in a housing that is substantially similar to the housing 301 of FIG. 3. As with the embodiment of FIG. 3, the various features of the connector are configured such that two optical connectors having two MT-type optical ferrules may be accommodated in a small form-factor pluggable (SFP) transceiver footprint or at least four optical connectors having a total of four MT-type optical ferrules may be accommodated in a quad small form-factor pluggable (QSFP) transceiver footprint. As will be appreciated by those skilled in the art, in one or more embodiments, an MT-type ferrule is a ferrule comprising a ferrule body having width spaced apart between opposite ends, a pair of guide pin openings, and a plurality of optical fiber 1810a-1810d passages, as shown in FIG. 18B, spaced apart between the pair of guide pin openings. FIG. 18C is a lens-type MT-type or mechanical transfer ferrule 1800 with an opening 1810e to receive epoxy to secure optical fibers within ferrule body 1810d. A plurality of optical fibers 1810a-1810l are along a dimension of ferrule body 1810d at a proximal end. An opposing pair of guide pin 1810c holes are located the proximal end. Lens ferrule 1810 is at a slight incline 1810f, as opposed to the MT-type ferrule depicted in FIG. 18B.

Figure 19A:
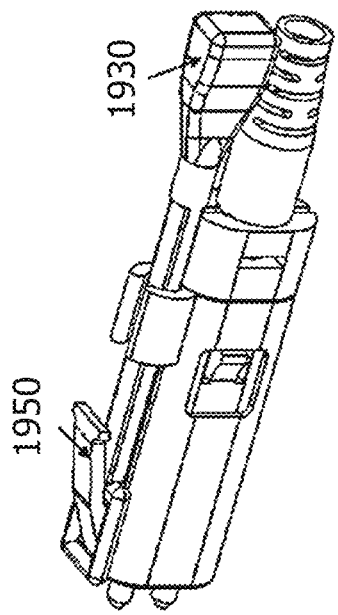
FIGS. 19A-D are illustrative examples of possible alternative connector designs.
Figure 19B:
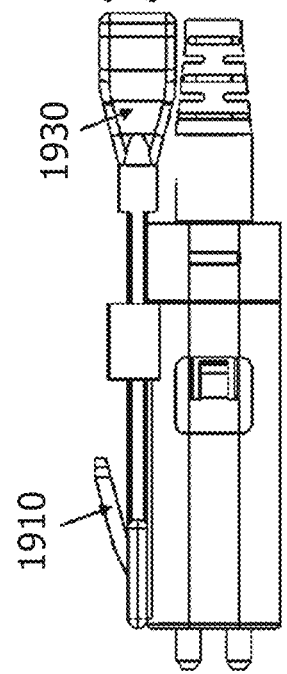
Figure 19C:
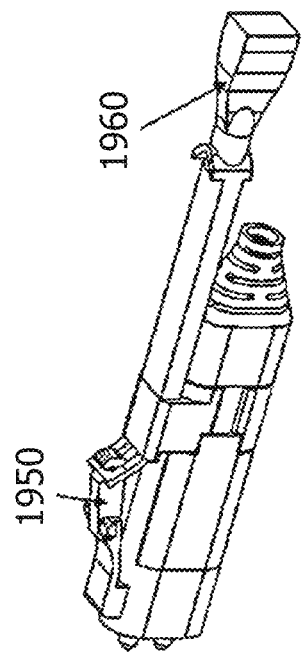
Figure 19D:
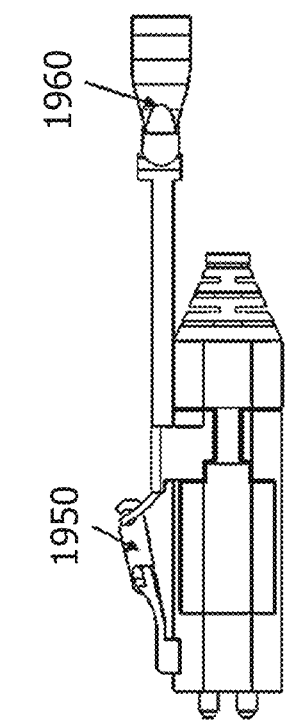

FIGS. 19A-19D show alternative embodiments of the optical connectors of FIG. 3 in which the push-pull tabs are not integrated with the optical connector housing. As seen in FIGS. 19A-19B, a push-pull tab 1930 is a separable element from a connector housing. The push-pull tab 1930 actuates a latch 1910 for inserting and extracting the connector from an adapter or transceiver. An alternative latching mechanism is depicted in FIGS. 19C-19D. Latch 1950 includes a notch that is actuated by push-pull tab 1960.

Figure 20:
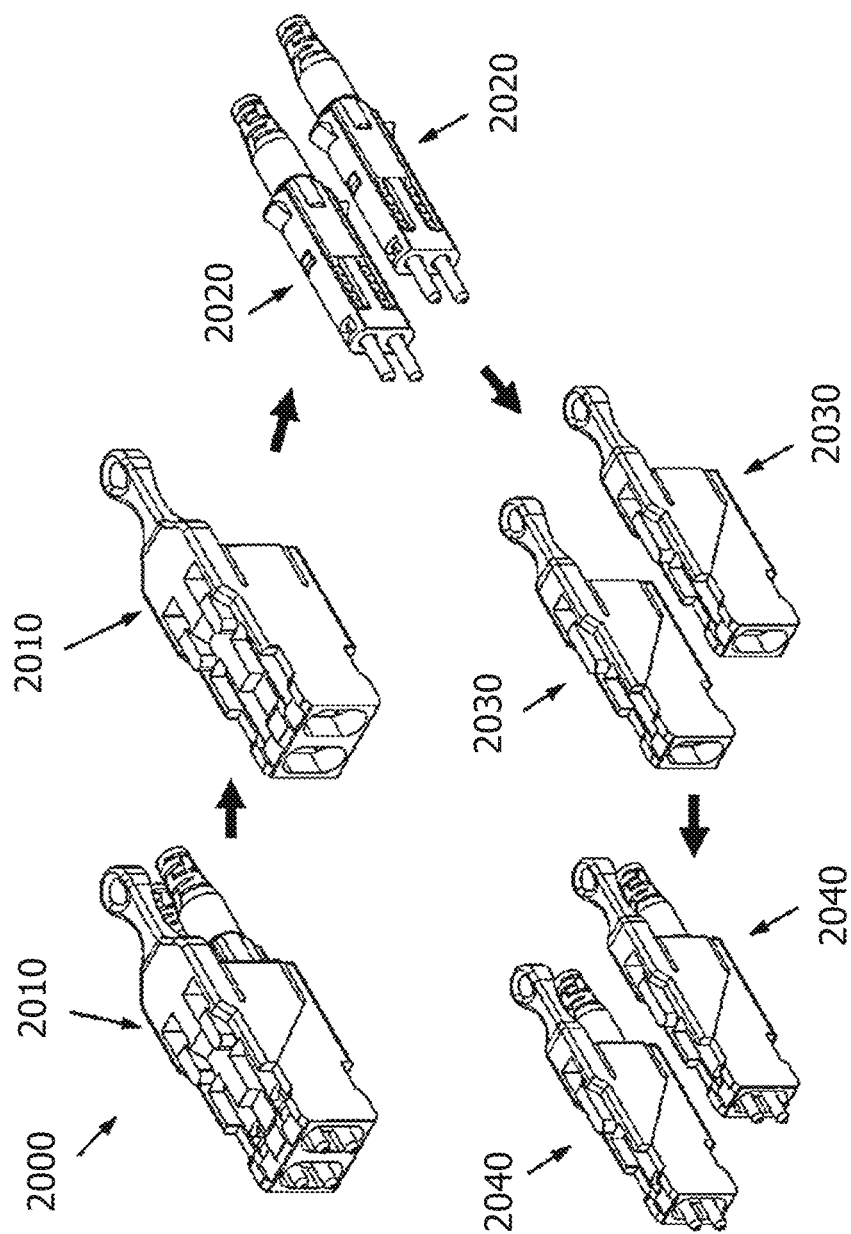
FIG. 20 shows moving two connectors from a duplex connector to two simplex connectors.

FIG. 20 depicts the disassembly of a four-connector housing (two duplex connectors in a single housing) into two duplex connectors. This may be performed in changing, for example, a connector as shown in FIG. 14A to a connector as shown in FIG. 14C. In FIG. 20, an optical connector 2000 is depicted including a housing 2010 that houses two duplex connectors (four optical fibers). The housing 2010 is removed, leaving the two duplex connectors 2020. Two housings 2030 are then provided and two individual duplex connectors 2040 are then created from the initial single housing connector 2000. This reconfigurable housing simplifies cable management, for example, when optical cables are interconnected between lower-speed transceivers and higher-speed transceivers as seen in FIG. 16.

Figure 21A:
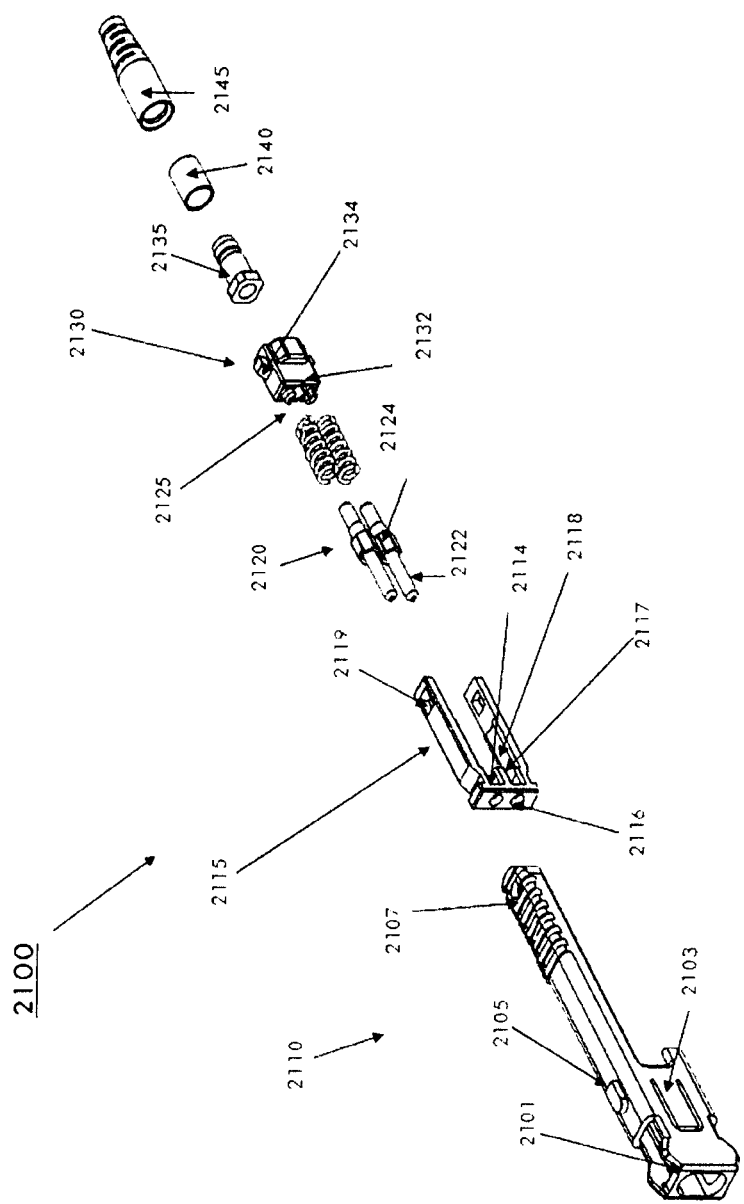
FIG. 21A is an exploded view of a micro optical connector according to an embodiment.

FIG. 21A depicts an embodiment of an optical connector 2100, shown in exploded view while 21B depicts the optical connector 2100 in an assembled view. Optical connector 2100 may include an outer housing 2110, a front body 2115, one or more ferrules 2122, one or more ferrule flanges 2124, one or more springs 2125, a back body 2130, a back post 2135, a crimp ring 2140, and a boot 2145. The outer housing 2110 may include a longitudinal bore for accommodating the front body 2115 and a ferrule assembly 2120, a connector alignment key 2105 used during interconnection, a connector flap 2103 and an optional pull tab 2107 to facilitate removal of the connector 2100 when connected in a dense array of optical connectors. Optionally, the ferrules may be LC-type ferrules having an outer diameter of 1.25 mm.

In prior art optical connectors, an inner enclosed housing was used in place of open front body 2115. Front body 2115 includes top and bottom portions but no sidewalls, termed "open sidewalls" in this embodiment. By using front body 2115, space occupied by the prior art inner housing sidewalls becomes available to increase the density of optical connectors within a given footprint, an advantage over prior art connectors. It was determined that the outer housing 2110, combined with the front body 2115, provided sufficient mechanical strength and ferrule protection, advantageously providing the space for additional optical connectors. Removal of sidewalls increases available space by 1-2 millimeters.

Note that, in this embodiment, the outer housing is configured to hold two optical ferrules 2122. Typically, two optical ferrules may be used in a "transmit" and "receive" pairing of optical fibers, called a duplex connector. However, the outer housing may be configured to hold more or fewer optical ferrules including a single optical ferrule, multiples of single optical ferrules, or multiple pairs of optical ferrules, depending upon the application. Further, the front body 2115 may be removed from the outer housing 2110 and the front body placed in a larger outer housing with other front bodies to form a larger optical connector in a manner to be discussed in more detail below. In particular, two front bodies may be used with a four-ferrule outer housing or four front bodies may be used with an eight-ferrule outer housing.

Figure 29B:
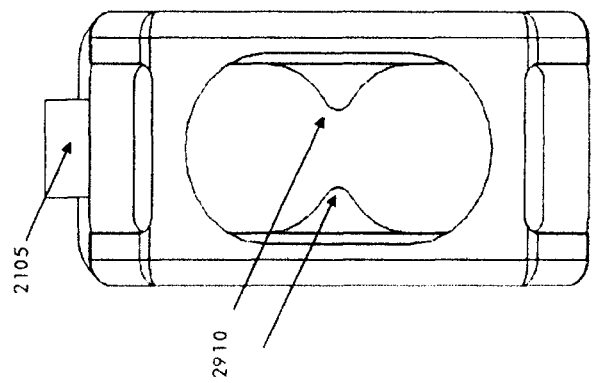
FIG. 29B is a front view of the outer housing of FIG. 29A.
Figure 29A:
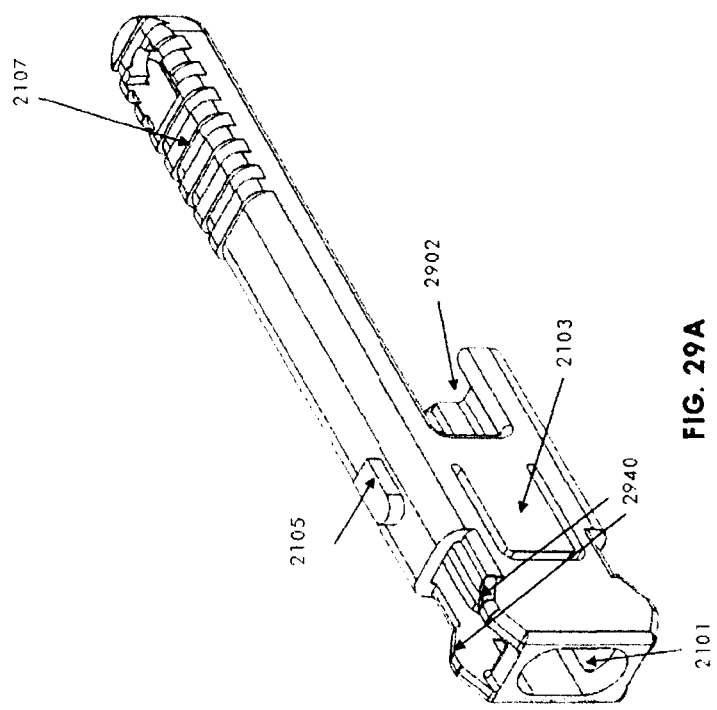
FIG. 29A is an isometric view of the outer housing of the micro optical connector of FIG. 21A.
Figure 29C:
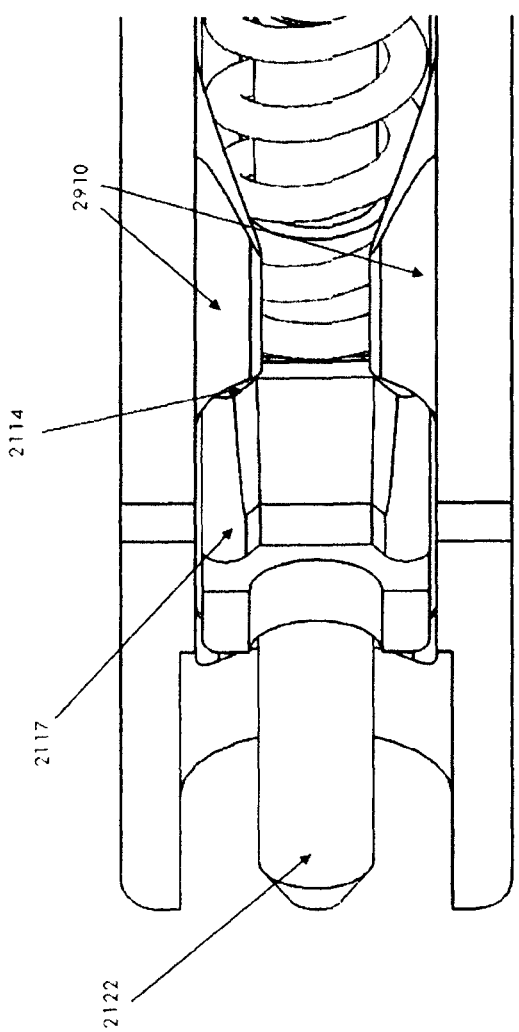
FIG. 29C is a cross-sectional view of the outer housing of FIG. 29A showing the top of an orientation protrusion.
Figure 29D:
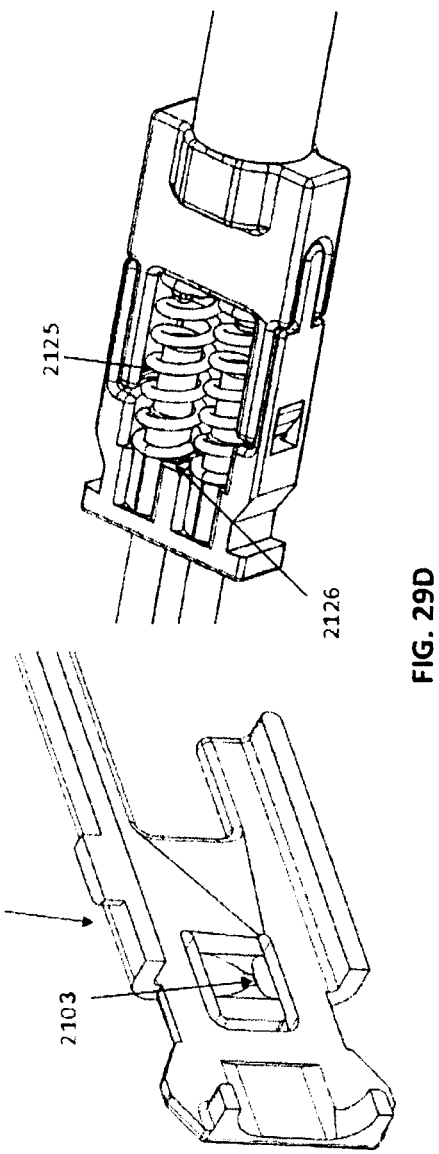
FIG. 29D is an inner view of the outer housing of FIG. 29A.
Figure 29E:
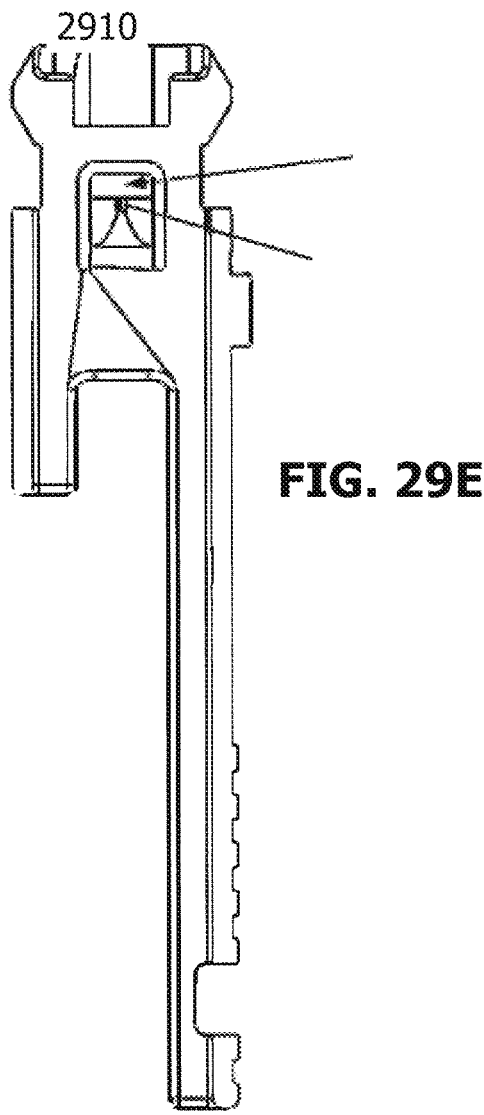
FIG. 29E is an inner view of the outer housing of FIG. 29A.

Turning to FIGS. 29A and 29B, isometric and front views of the outer housing 2110 are shown. As seen in the front view of FIG. 29B and the cross-sectional view of FIG. 29C, connector orientation protrusions 2910 are provided within the interior of the outer housing 2110. Connector protrusion 2910 is further seen in the inner view of the housing, FIG. 29E. When the front body is inserted within the longitudinal bore 2101 of outer housing 2110, the outer housing connector flap 2103 locks the outer housing 2110 to the front body 2115 in the following manner. As the front body 2115 is inserted into the outer housing 2110, the outer housing locking surface 2114, best seen in FIG. 27C, engages the connector orientation protrusion 2910, seen in an inside view of the outer housing in FIG. 29D, labelled as "Flap A", flexing the connector flap 2103 outwardly from the outer housing body 2110, depicted in the inset of FIG. 29C. The flap protrusion mating location is indicated as "mating place B" in FIG. 29D. Once the locking surface 2114 passes beyond the orientation protrusion, the connector flap returns to its original position (FIG. 29A), and the protrusion 2910 engages locking surface 2114 and any withdrawal of the front body assembly from the outer housing 2110 is prevented as the proximal end face of the connector flap 2103 is stopped by protrusion 2910.

Figure 35A:
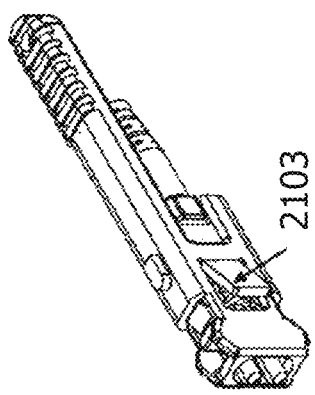
FIG. 35A-FIG. 35C depicts the micro optical connector of FIG. 21B side flap operation before (FIG. 35A), during (FIG. 35B), and after (FIG. 35C) latching.
Figure 35B:
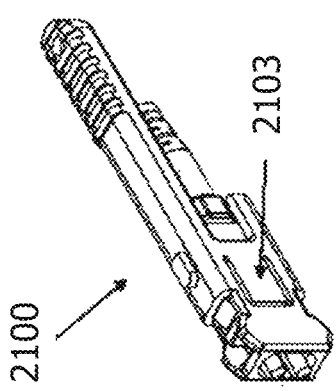
Figure 35C:
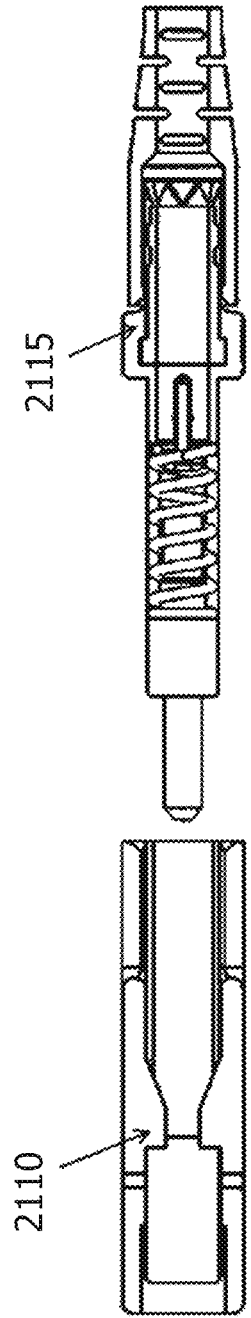

FIGS. 35A-35C depict the sequence of operations to remove an assembled front body from the outer housing in order to reverse polarity or to aggregate plural connectors in a multi-connector housing. To separate the front body from the outer housing, the connector flap 2103 is flexed outward using a finger or a tool, as depicted in FIG. 35B. Flexing the connector flap 2103 outwardly causes the protrusion 2910 to disengage from the front body's outer housing locking surface 2114, permitting the front body/ferrule assembly 2115 to be removed from the outer housing. This may be performed when it is desired to reverse the polarity of the connector (to be discussed below) or when desiring to aggregate plural connectors into a larger connector housing as discussed above. The separated components are depicted in FIG. 35C, that is, front body 2115 with the ferrule assembled therein and outer housing 2110.

In some embodiments, the back body 2130 may comprise one or more protrusions or hooks 2134, best seen in FIGS. 28A and 28B, which may interlock with a back body hook window/cutout 2119 in the front body 2115. This may allow for the back body 2130 and the front body 2115 to be securely fastened together around the ferrule(s) 2122, ferrule flange(s) 2124, and the spring(s) 2125. The back body 2130 includes a cable bore 2820, spring guides 2132, and side protrusions 2810.

Figure 23A:
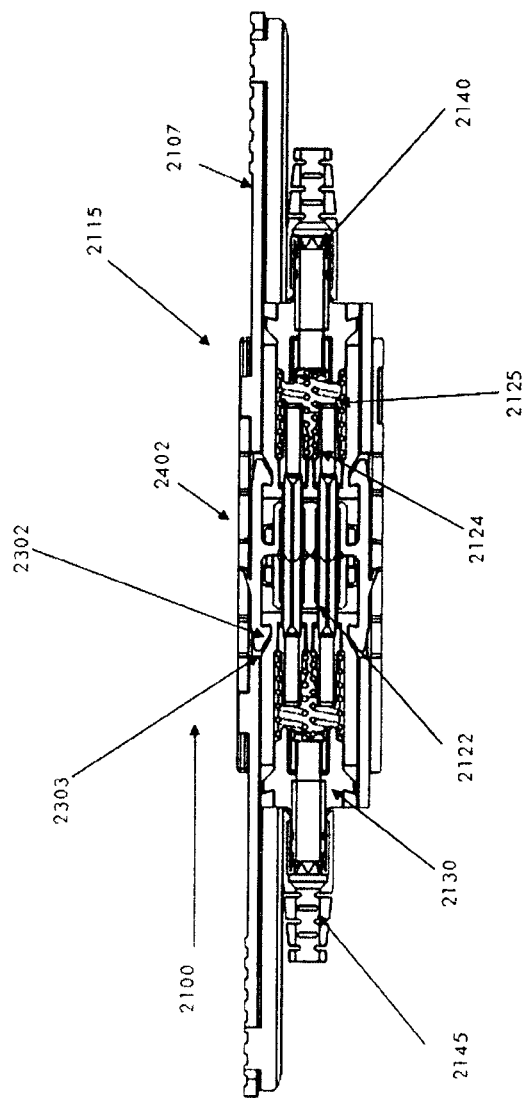
FIG. 23A is a cross-sectional view of the micro optical connector of FIG. 21B latched into the adapter of FIG. 24.
Figure 23B:
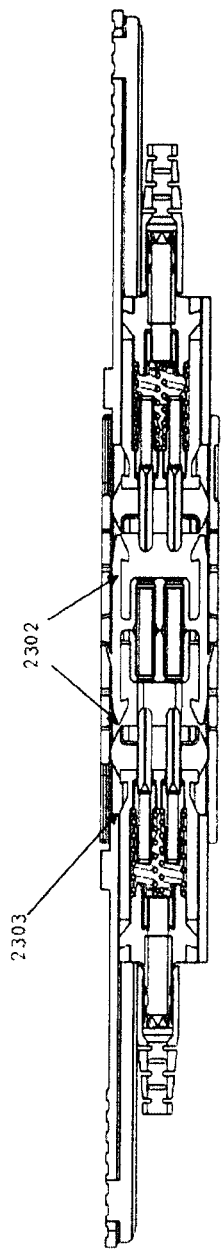
FIG. 23B is a cross-sectional view of the micro optical connectors of FIG. 21B unlatched from the adapter of FIG. 24.

During assembly, the ferrule flanges 2124 fit into ferrule flange alignment slots 2117 (see FIGS. 27A and 27B) adjacent the ferrule openings 2116 of the front body 2115, compressing the springs 2125 (preload) which are positioned along front body spring holders 2118. The ends of the springs 2125 are secured on spring guides 2132 (FIGS. 28A, 28B) of back body 2130 by spring tension. As seen in the assembled cross-sectional views of FIGS. 23A and 23B, the springs 2125 are positioned to urge the ferrules 2122 into contact with mating connectors or transceiver optics, ensuring minimum insertion loss. As further seen in FIGS. 27A and 27B, the front body includes a receptacle hook recess 2710 with a receptacle hook retainer surface 2720 the receiver a receptacle hook when mating with an adapter or with a transceiver receptacle, as shown in further detail below.

Further reductions in connector size may be obtained by reducing the size of springs 2125, see FIG. 21. By using a maximum spring outer diameter of 2.5 mm, the pitch of the ferrules, that is to say, the spacing between adjacent ferrules, may be reduced to 2.6 mm when coupled with the removal of inner housing walls and walls separating adjacent ferrules. This advantage is best seen in FIG. 22 which depicts the front of connector 2100 showing overall connector dimensions and ferrule pitch. The connector size 4.2×8.96× 30.85 mm (2207, 2006 respectively) (excluding optional pull tab 2107 and connector alignment key 2105) with a ferrule pitch of 2.6 mm 2205. FIG. 22A depicts connector 2100 with a second alignment key 2105.1 positioned opposite a first alignment key 2105. Also, alignment key 2105 width "W1" is greater than second alignment key 2015.1 width "W2". The difference in widths "W1" and "W2" ensures connector 2100 is correctly oriented in adapter port, or alternatively connector 2100 polarity, e.g. Tx, Rx location, matches an opposing pair of fibers on at a second port of adapter 2200.

Figure 22:
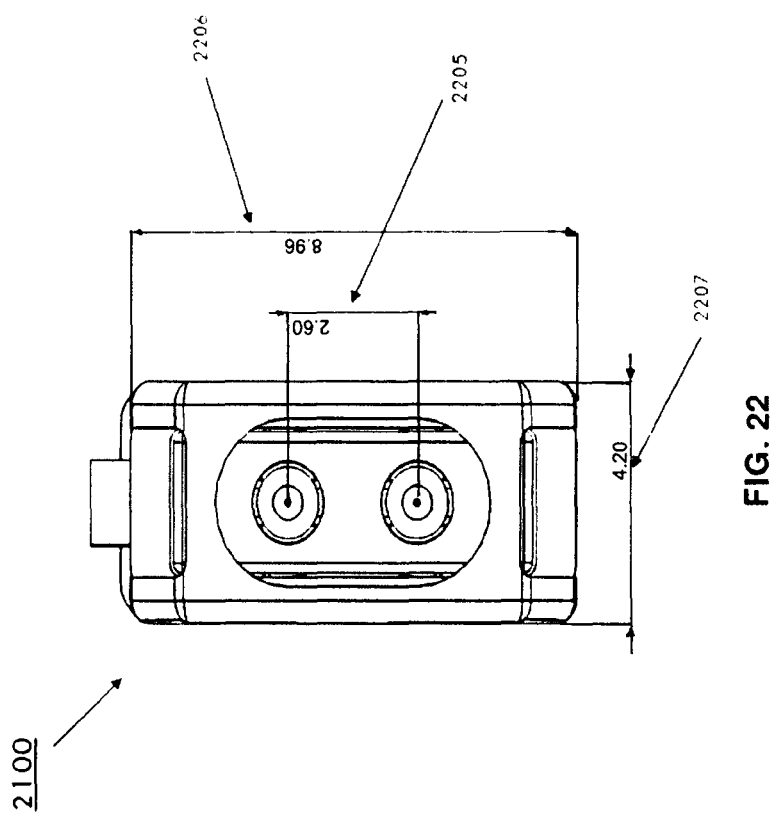
FIG. 22 is a front view of the micro optical connector of FIG. 21B showing overall connector dimensions and ferrule pitch.
Figure 22A:
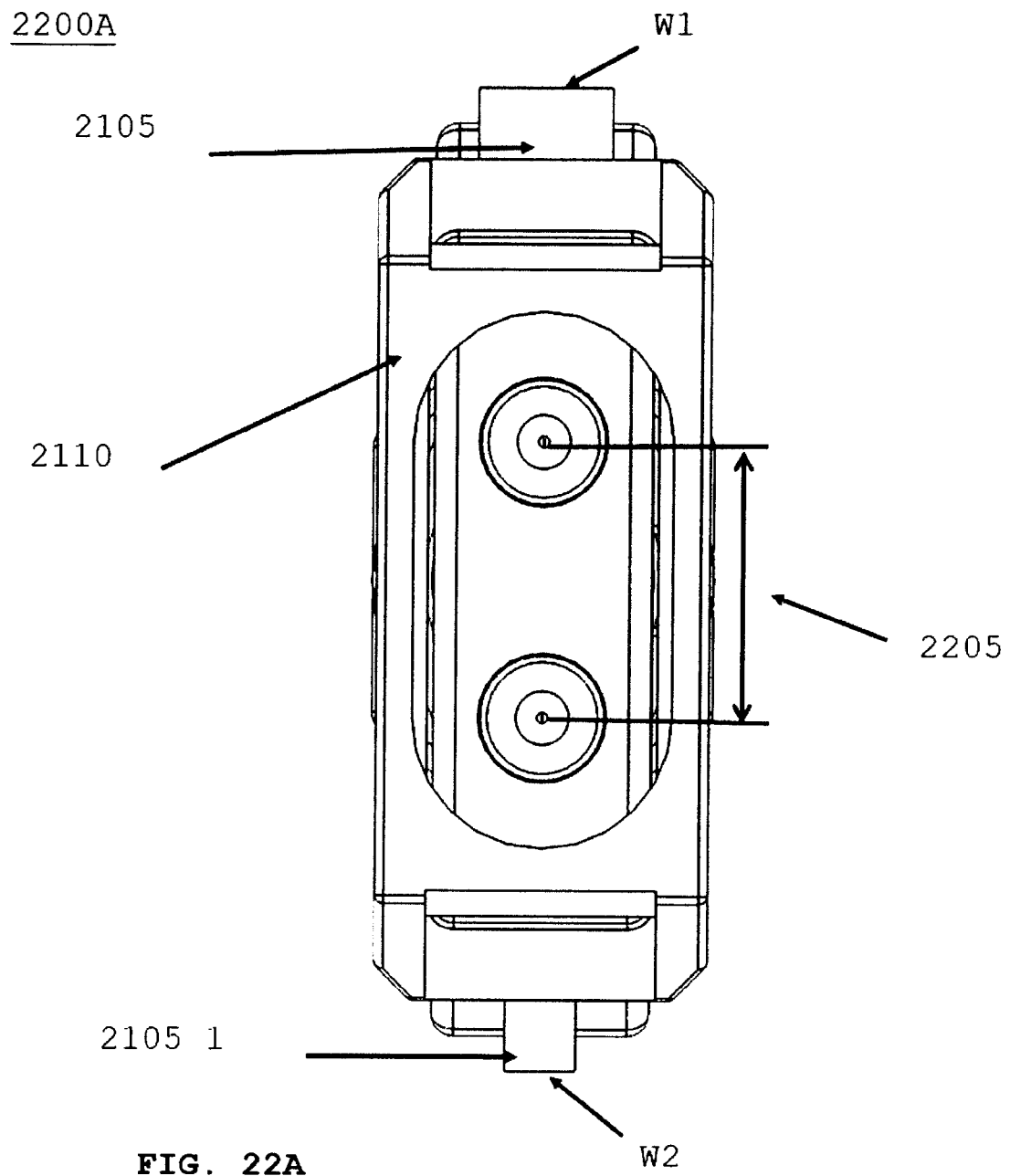
FIG. 22A is a front view of the micro optical connector of FIG. 21C showing the dual alignment key locations and overall pitch or distance between the ferrules.
Figure 22B:
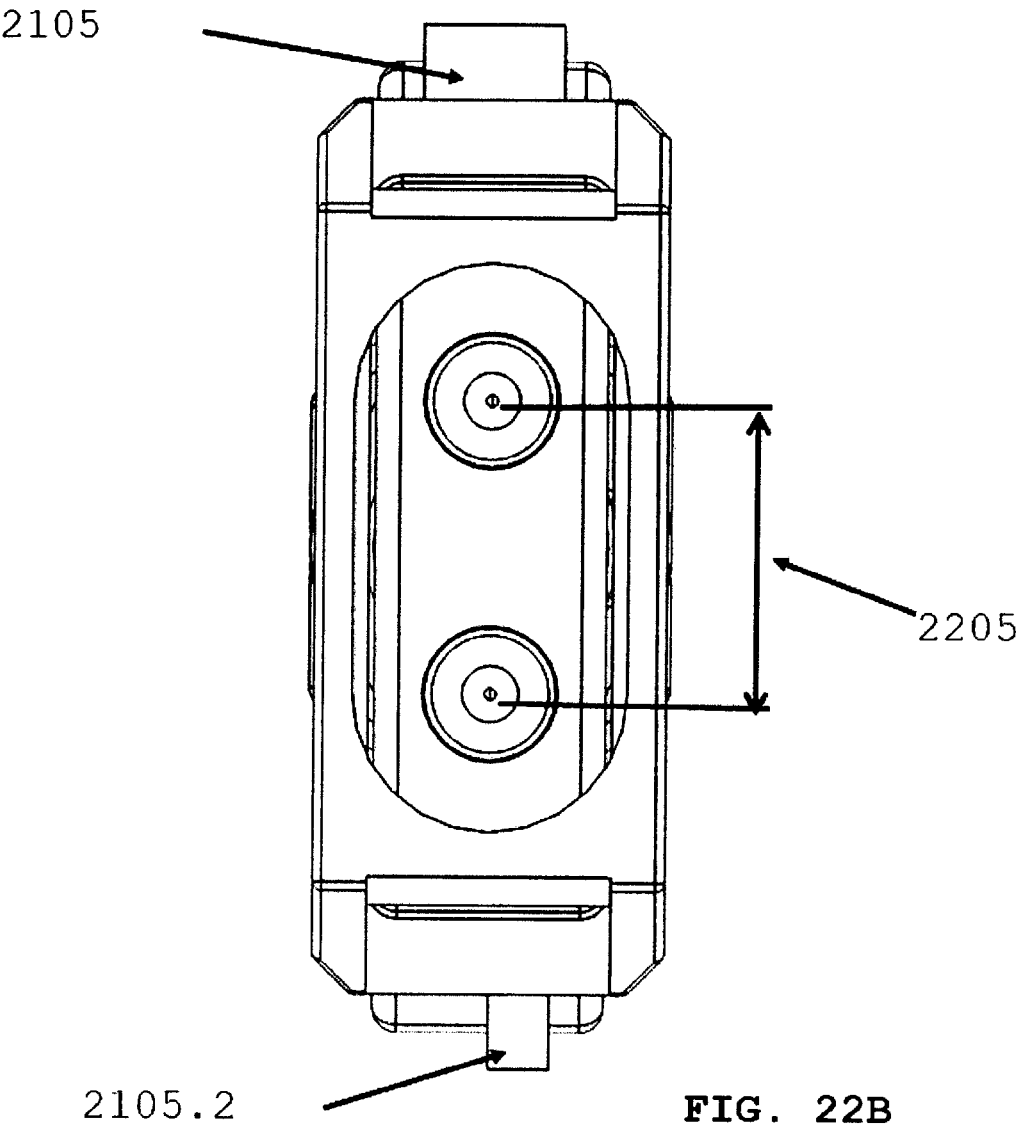
FIG. 22B is a front view another embodiment of FIG. 21C.

FIG. 22B depicts alignment key 2105 offset from alignment key 2105.2. Instead of opposing alignment keys, as depicted in FIG. 22A, an offset allows for manufacturing tolerances in internal alignment slots (2280a-2280b, 2282a-2282b). Further offset of alignment key 2105.2 helps prevent a user placing a first connector into internal alignment slot 2280a and slot 2282b, due to the close proximity of a pair of opposing alignment slots. This may occur as connector 2100 is designed to be smaller and smaller to increase fiber connector density within an adapter 2200 with a standardized outside dimension. It is further understood, the corresponding internal alignment slot width is sized to accept its corresponding alignment key, and can be no small than "W1" or "W2" for its respective alignment key (2105, 2105.1).

Figure 21B:
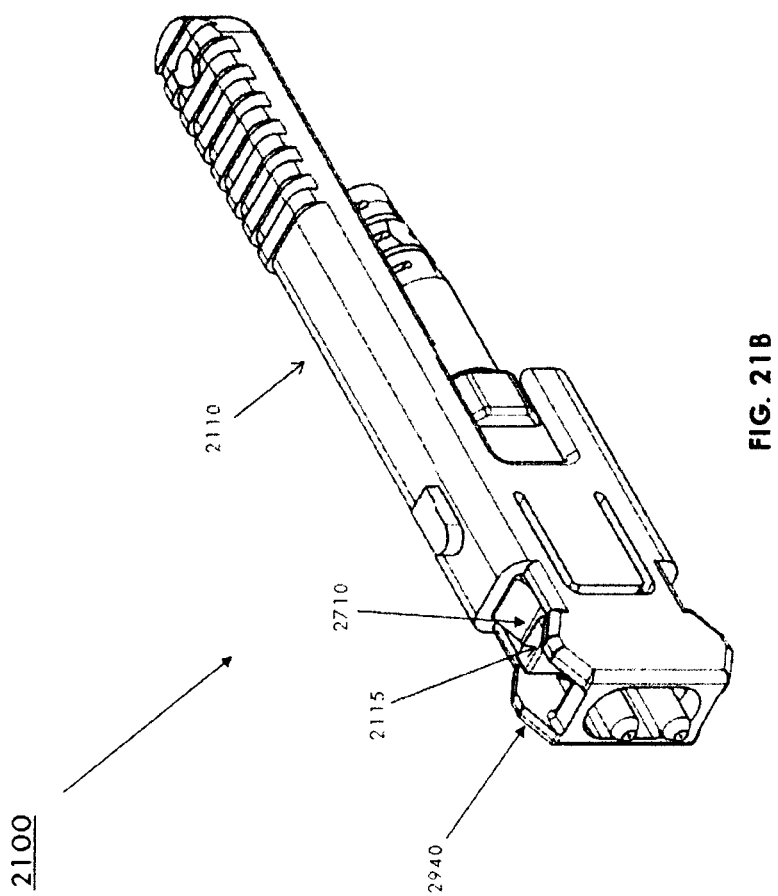
FIG. 21B is a perspective view of the assembled micro optical connector of FIG. 21A.
Figure 21C:
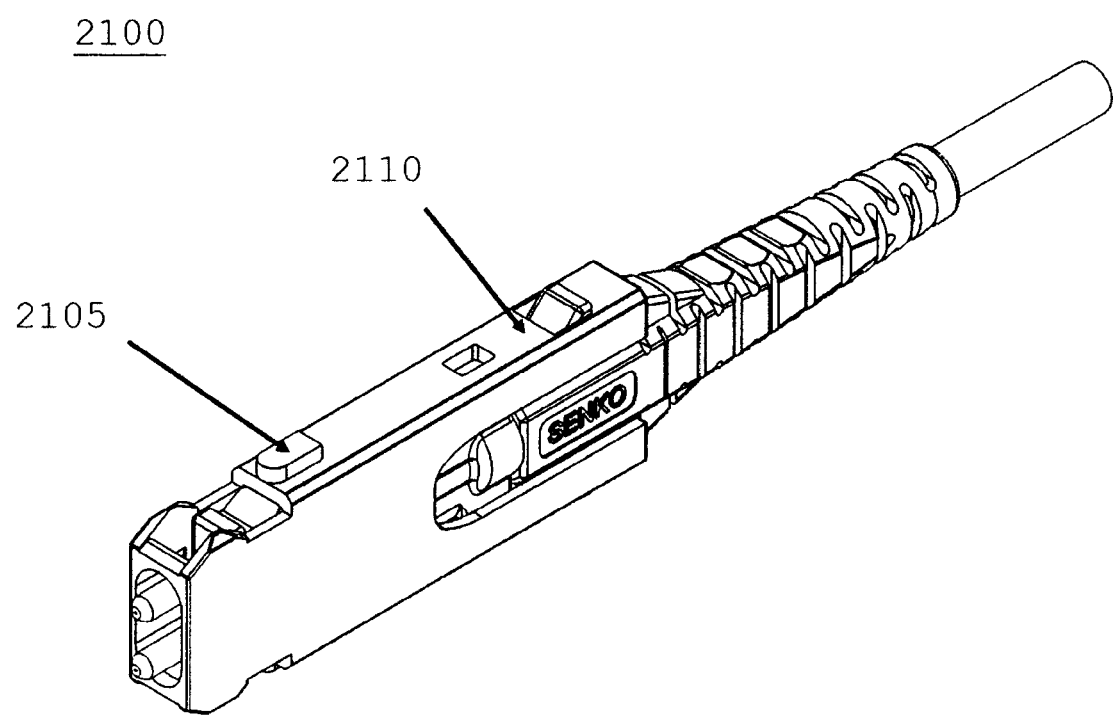
FIG. 21C is a perspective view of an assembled micro optical connector having an alignment key on first side of the connector outer housing.
Figure 27B:
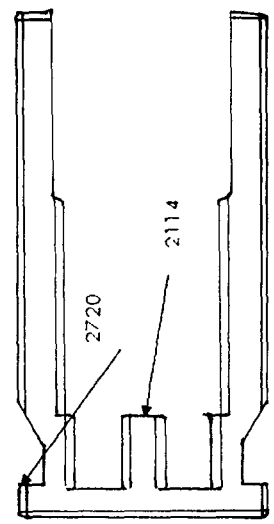
FIG. 27B is a right side view of the front body of FIG. 27A.
Figure 27A:
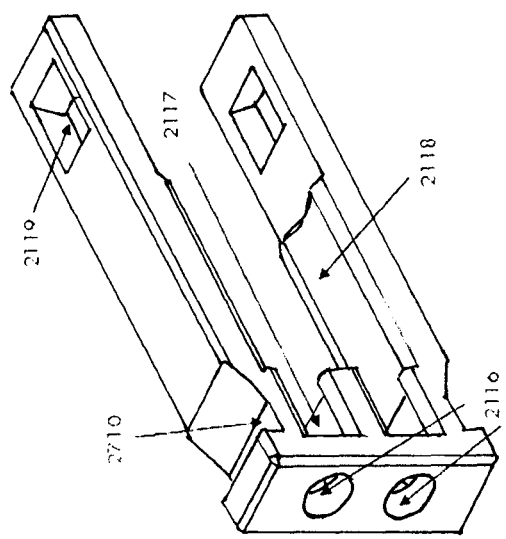
FIG. 27A is an isometric view of the front body of the micro optical connector of FIG. 21A.

As best seen in FIG. 21B, the outer housing 2110 and the front body 2115 together provide a receptacle hook ramp 2940 (on the outer housing) used to guide a receptacle hook into a receptacle hook recess 2170 (in the front body 2115), also shown in FIGS. 27A and 27B (receptacle hook recess 2710 and receptacle hook retainer surface 2720). The receptacle hook, to be discussed in more detail below, may be from an adapter or a transceiver to secure the optical connector 2100 thereto. As seen in FIG. 21C, an alignment key 2105 is positioned on the outside of connector housing 2110 nearer the proximal end or ferrule end of the connector. This allows earlier alignment of connector within adapter port. Alignment key 2105 allows a user to position connector 2100 within an adapter port 2405 by aligning key 2105 with alignment slot 2403.

Figure 22C:
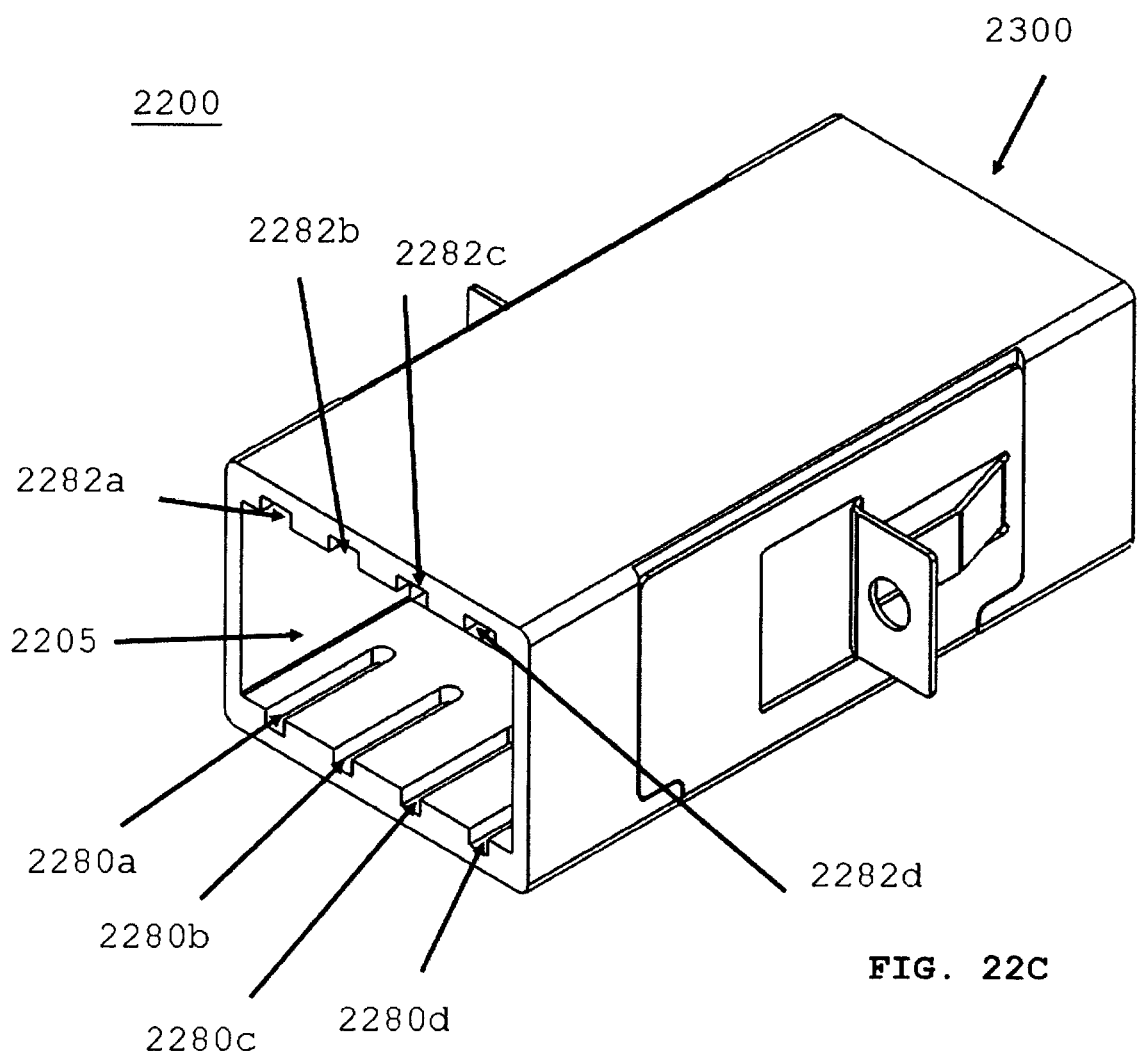
FIG. 22C is a perspective view of an adapter configured to accept a dual key micro optical connector or connector of FIG. 21C according to the present invention.
Figure 24:
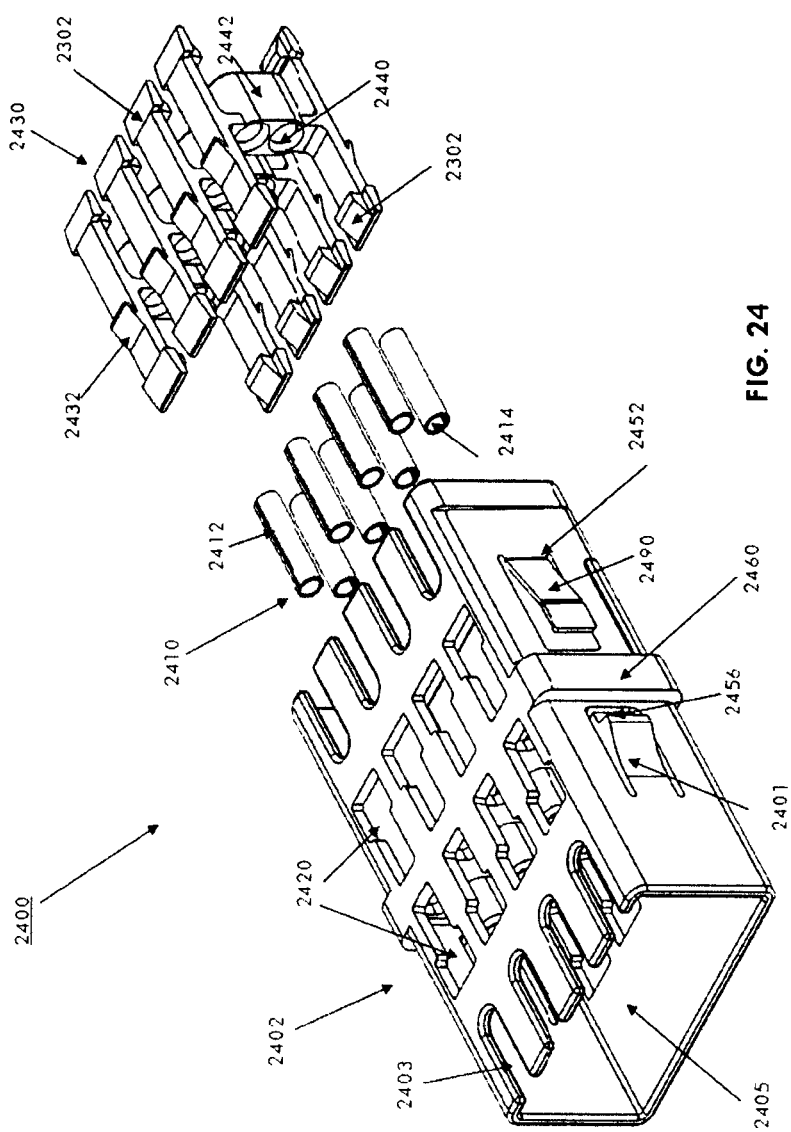
FIG. 24 is an exploded view of an adapter for the micro optical connectors of FIG. 21B.

FIG. 22C depicts an adapter 2200 similar to FIG. 24 adapter 2400. FIG. 22C adapter has at least one pair of alignments slots (2280a, 2282a). The slots (2280a-2280d; 2282a-2282d) may be opposing or slightly offset to accommodate a large number of connectors 2100, 2200A or 2200B with the adapter 2200, as described above in FIG. 22B. The opposing slots or substantially opposing alignment slots provide orientation of a connector 2100, 2200A or 2200B inserted into adapter 2200. Connectors 2100, 220A and 2200B may be mixed and matched and secured within adapter 2200. Orientation also ensures correct mating polarity between opposing connectors, that is, Tx1, Rx1 are opposite Tx2 and Rx2 respectively. Connector 2100 is inserted into an adapter port defined by slot pair (2282a, 2280a) while second connector 2200A or 2200B is inserted into a second adapter port (2280b, 2282b). Likewise, connector 2200A may be inserted in each port, defined by opposing slots (2280a, 2282a) or opposing slots (2280d, 2282d). Alternatively, instead of connectors at opposing port side from (2280a, 2282a) transceiver 2300 may inserted. Transceiver 2300, as shown in FIG. 17, converts an optical signal into a digital signal, as is known in the prior art. The alignment keys on the connector outer housing and the alignment slots help ensure proper orientation to establish a communication channel, that is, fiber to fiber transfer of the light signal, while the alignments keys and slots further help to ensure the opposing connectors end faces or ferrules are in the same parallel path to transmit light across the air gap between ferrule to opposing ferrule most efficiently.

Figure 36A:
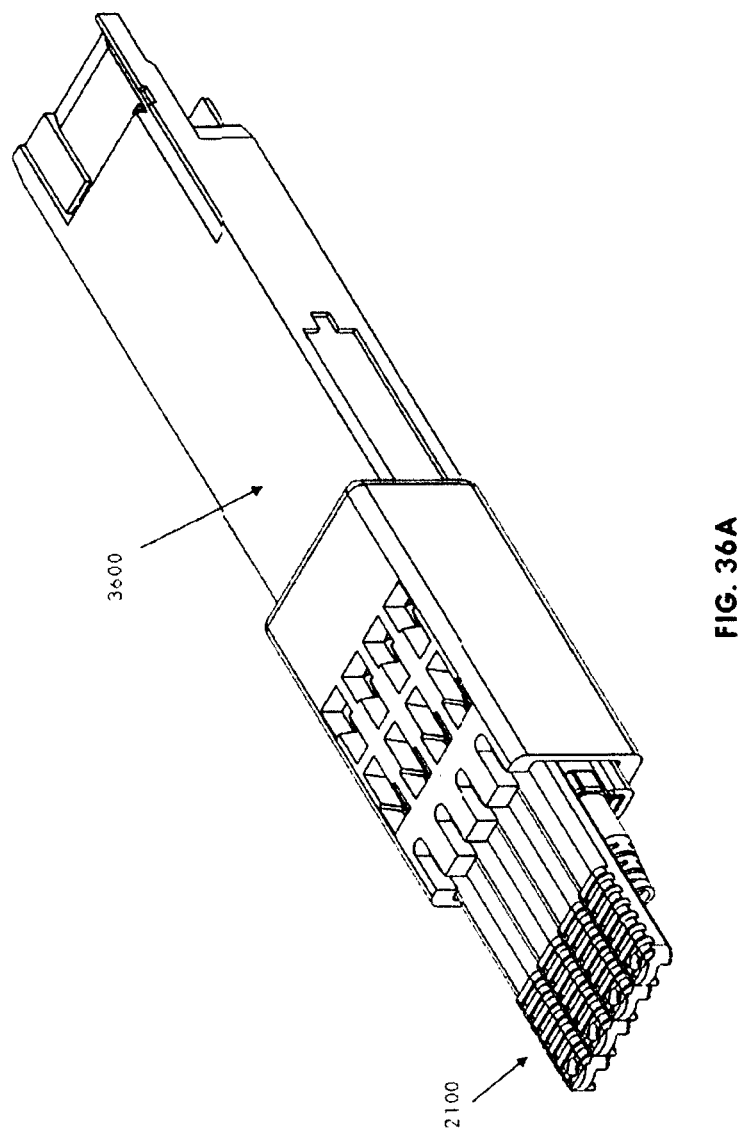
FIG. 36A depicts plural micro optical connectors in a transceiver.
Figure 36B:
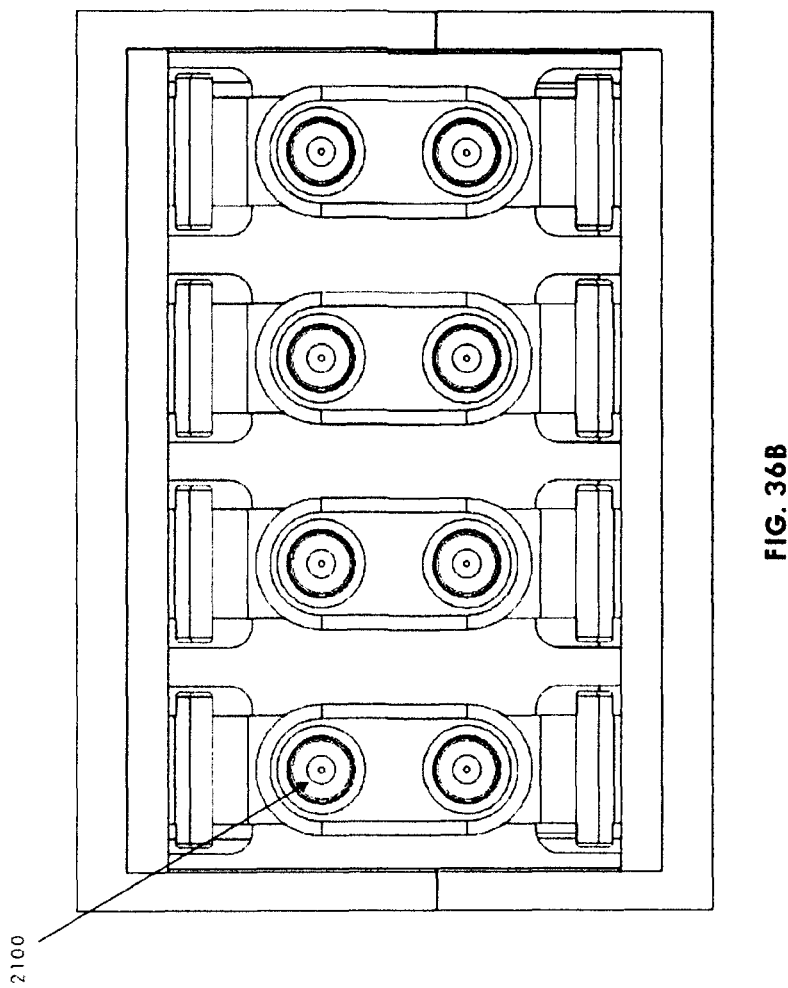
FIG. 36B is a front view of the transceiver of FIG. 36A.

The optical connectors 2100 may be used in a variety of connection environments. In some applications, the optical connectors 2100 will mate with other optical connectors. Typically, this mating will occur with a receptacle such as an adapter or optical transceiver receptacle. An exemplary adapter 2400 depicted in FIG. 24 in an exploded view and depicted in FIG. 31 having four mating pairs of optical connectors 2100 latched therein. In other applications, as when an optical signal is to be converted to an electrical signal, the micro optical connectors 2100 will mate with an optical receptacle in a transceiver 3600 as shown in FIG. 36. Typically, transceiver 3600 may be found in a data center, switching center, or any other location where optical signals are to be converted to electrical signals. Transceivers are often a part of another electrical device such as a switch or a server, as is known in the art. Although much of the connection operation of this embodiment will be described with respect to an adapter, 2400, it is understood that substantially similar mechanical retention mechanisms are positioned within the receptacle of transceiver 3600 so that any description of connector retention in adapter 2400 applies in a substantially similar way to retention of an optical connector within transceiver 3600. An example of a transceiver optical receptacle is depicted in FIG. 36B (holding optical connectors 2100); as seen in FIG. 36B, the connection environment is substantially similar to one-half of an adapter 2400.

Figure 30:
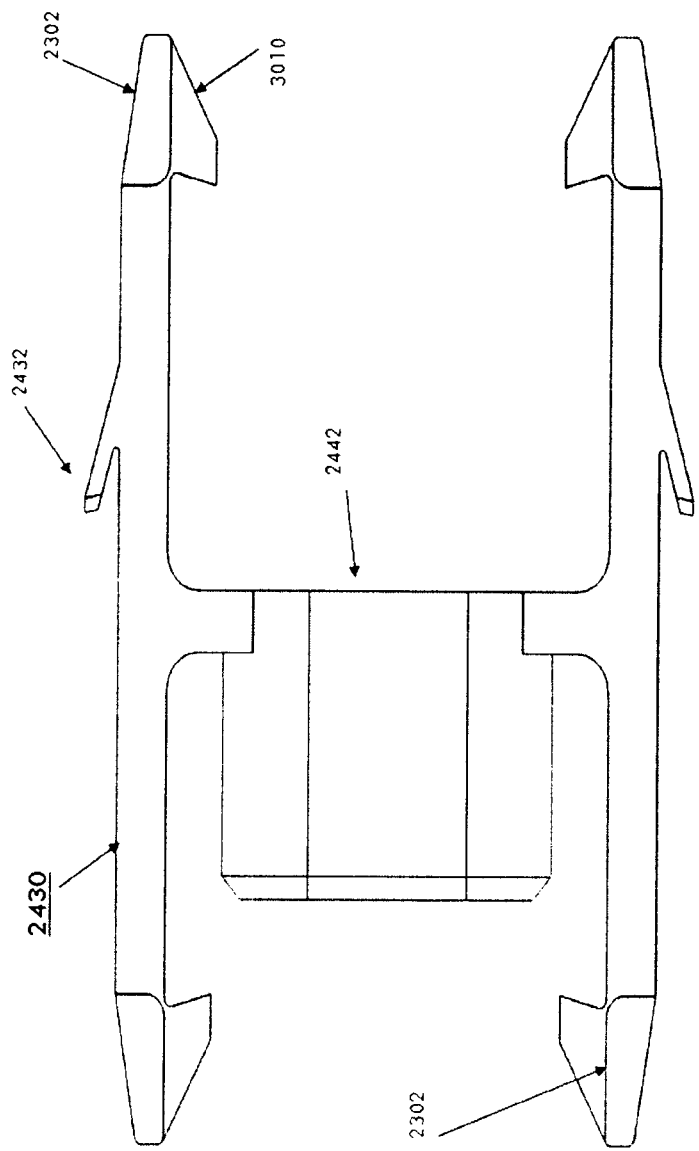
FIG. 30 is a side view of an adapter hook of the adapter of FIG. 24.

Turning to FIG. 24, further size reductions in the overall optical assembly of connectors plus adapter or connectors plus transceiver may be obtained through various connection mechanisms to be described with respect to the adapter 2400 but also apply to optical connection features within the front end of transceiver 3600. The adapter 2400 includes an adapter housing 2402 having an adapter alignment assembly 2430 positioned therein. The adapter alignment assembly 2430 includes alignment sleeves 2410 positioned within alignment sleeve openings 2440 of alignment sleeve holders 2442. The adapter alignment assembly further includes receptacle hooks 2302 that will grip optical connectors 2100 through front body connector hook recess 2710 of FIG. 21B. As seen in FIG. 30, receptacle hooks 2302 include an inner surface 3110. The adapter housing 2402 further includes connector alignment slots 2403 that mate with connector alignment key 2105 of FIG. 21A. The connectors 2100 are received through adapter port 2405 of the adapter housing 2402 which also includes flex tab 2401, cutout 2456, mount plate 2452 and panel hook 2490. To assemble the adapter alignment assembly 2430 in the adapter housing 2402, adapter housing hooks 2432 are provided. Adapter housing hooks 2432 are received in housing adapter hook openings.

Figure 25B:
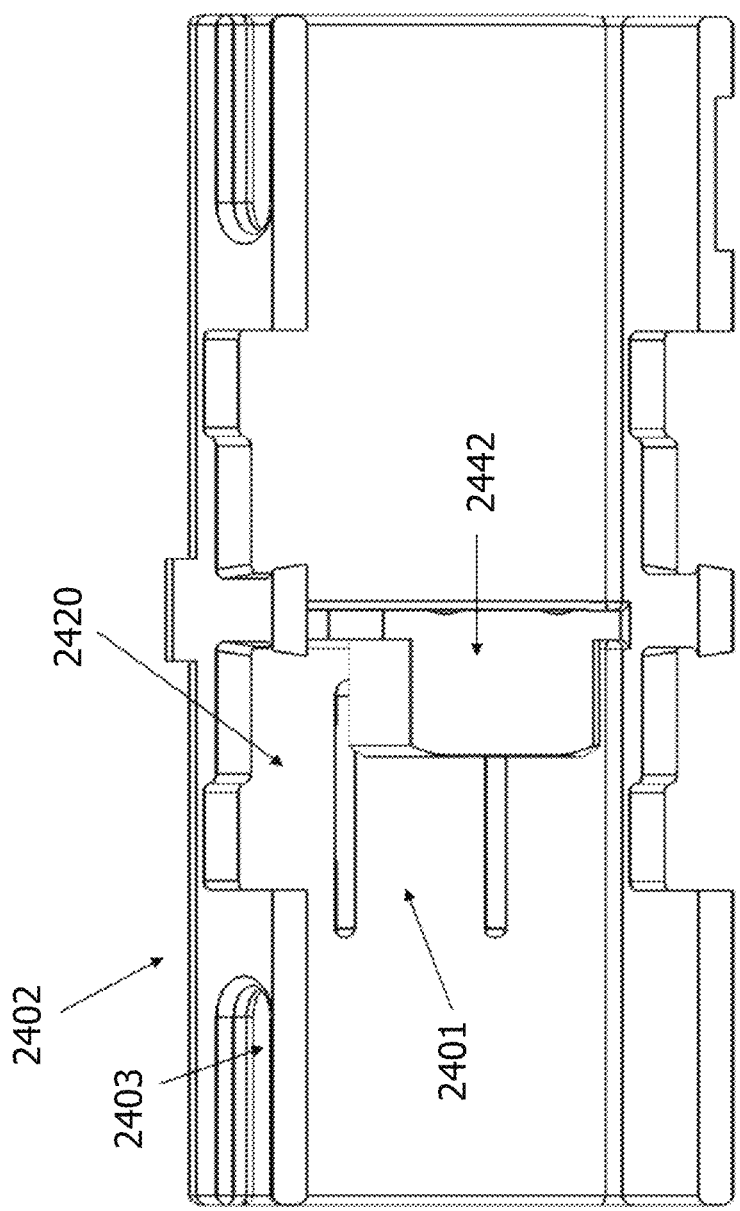
FIG. 25B is a cross-sectional side view of the adapter housing of FIG. 24.

In one or more embodiments alignment slots 2403 are formed as part of outer housing 2402. Slots 2403 extend through an entire thickness of a wall portion housing 2402, as shown in FIG. 24. Alignment key 2105 is accepted within slot 2403, thus allowing the overall dimension of housing 2402 to be smaller, as alignment key 2105 is not contained within or inside of the housing walls. FIG. 25A depicts a cut-away view of adapter 2400 along longitudinal axis with slots or cut-outs 2403 formed in adapter housing 2402. Slots receive alignment key 2105 located on either side of connector housing 2110. Latch hook 2302 is partially lifted through opening 2420 upon insertion of connector into receptacle, as shown in FIGS. 34A-34c. Alignment sleeve 2442 receives a LC type ferrule 2222 upon insertion of connector into adapter receptacle opening. Alignment key 2105 on connector ensures ferrule is received within alignment sleeve 2442 without ferrule tip engaging sleeve 2442 walls causing damage to connector, thereby increasing insertion loss. FIG. 25B depicts similar cut-away as shown in FIG. 25A except one alignment sleeve 2442 is shown. The side opposite to alignment sleeve 2442 can accept a transceiver 1636 fiber stub assembly as depicted in FIG. 16.

It should be understood that above description of connection mechanisms with respect to adapter 2400 may be applied in a substantially similar way with respect to the receptacle of transceiver 3600. Particularly, the receptacle of transceiver 3600 may include a receptacle housing having a receptacle alignment assembly positioned therein. The receptacle alignment assembly includes alignment sleeves positioned within alignment sleeve openings of alignment sleeve holders. The receptacle alignment assembly further includes receptacle hooks that will grip optical connectors 2100 through front body connector hook recess 2710 of FIG. 21B. As seen in FIG. 30, receptacle hooks 2302 include an inner surface 3110. The receptacle housing further includes connector alignment slots that mate with connector alignment key of FIG. 21A. The connectors 2100 are received through connector opening of the receptacle housing which also includes flex tab, cutout, mount plate and panel hook. To assemble the receptacle alignment assembly in the receptacle housing, receptacle housing hooks are provided. Receptacle housing hooks are received in housing receptacle hook openings.

Figure 32A:
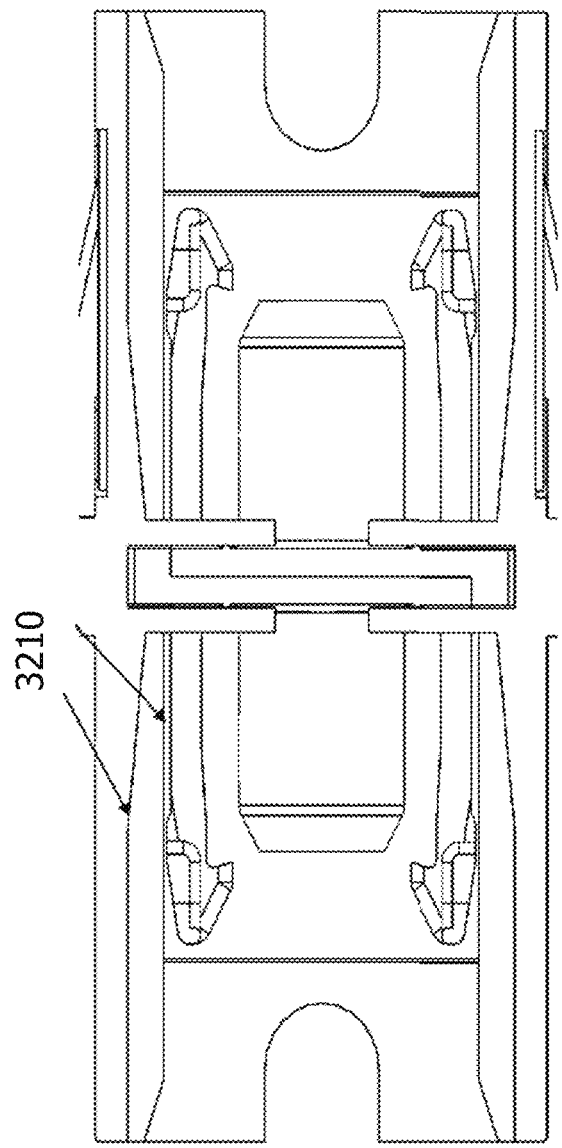
FIG. 32A is cross-sectional view of a prior art connector showing a latch gap.

To further reduce the size of optical connectors and associated mating components, the adapter housing 2402 includes receptacle hook openings 2420, seen in FIGS. 25A and 25B. Receptacle hook openings 2420 accommodate the clearance required by receptacle hooks 2302 when they flex upwards prior to latching with connectors 2100. The interaction of the receptacle hooks 2302, having slanted inner surfaces 3110, with the receptacle hook openings 2420 is best seen in FIGS. 32B and 34A-C. Prior to latching (FIG. 34A), the receptacle hook 2302 is in an unflexed condition within the receptacle (adapter or transceiver). As the connector 2100 is inserted into the adapter housing 2402 or the transceiver, the receptacle ramp 2490 pushes against the receptacle hook inner surfaces 3110, flexing receptacle hook 2302 into the receptacle hook opening 2420. Without providing the opening, additional clearance would need to be provided to accommodate the flexing of the receptacle hook 2302. This additional required clearance is depicted in the prior art connector/adapter of FIG. 32A. As seen in FIG. 32A, a connector latch gap 3210 must be provided in the prior art to accommodate the prior art connector hooks, increasing the overall footprint of the prior art connector/adapter assembly. By providing receptacle hook openings 2420 in the present disclosure, approximately 2.25 mm of valuable footprint real estate is obtained which may be used to increase connector density. Hook 2302 has an adapter housing hook 2432. Referring to FIG. 34C, housing hook 2432 is secured behind a wall cut-out 2402b.

Figure 26:
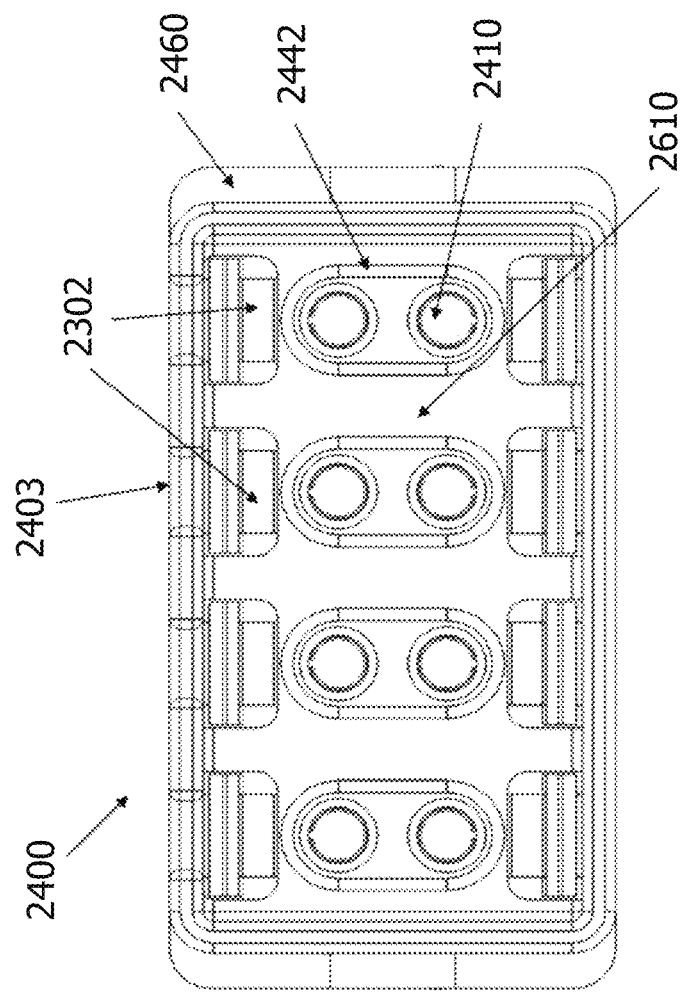
FIG. 26 is a front view of the assembled adapter of FIG. 24.

Another improvement in adapter size is obtained by removing prior art adapter walls between adjacent connectors. This is best seen in the front view of an assembled adapter 2400 shown in FIG. 26. As seen, pairs of ferrule alignment sleeves 2410 are separated only by connector gap 2610 with a 4.35 mm pitch between adjacent connectors. The adapter size is 19.0×10.71×32.5 mm (excluding the adapter flange 2460). Also seen in FIG. 26 is the connector alignment slot 2403, alignment sleeve holder 2442, and a front view of receptacle hooks 2302.

Figure 31:
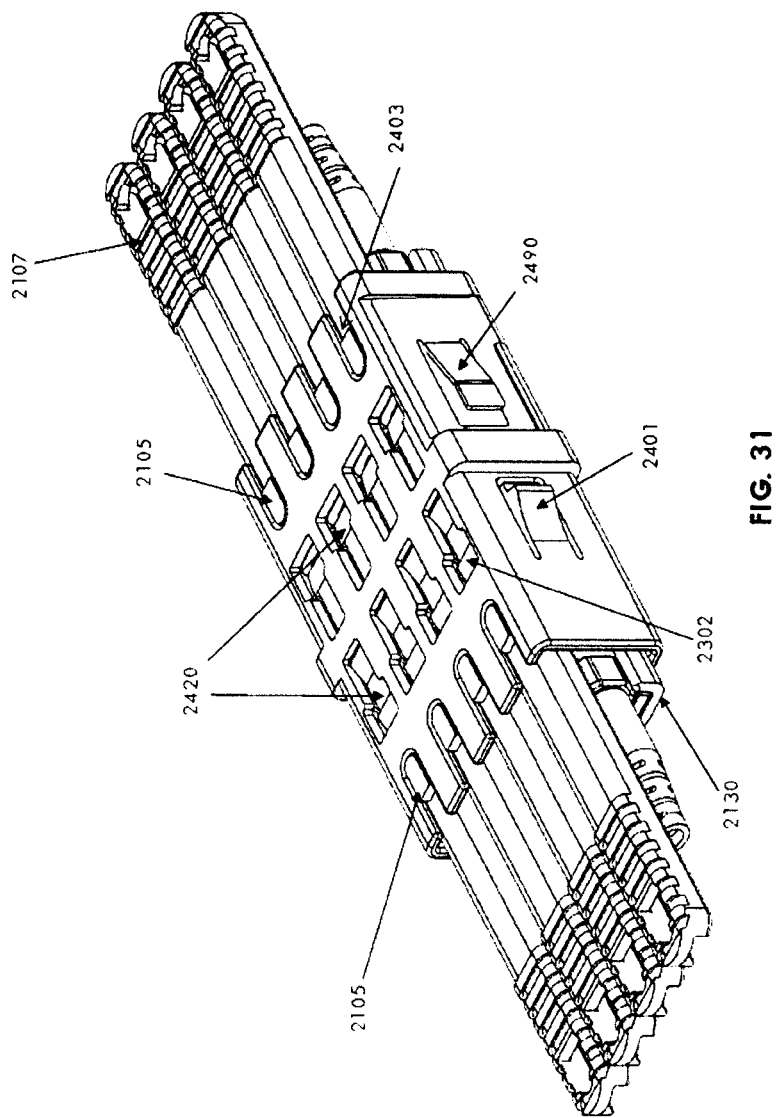
FIG. 31 is an isometric view of the adapter of FIG. 24 assembled with the micro optical connectors of FIG. 21B.

FIG. 31 depicts an assembled adapter 2400 with four pairs of mating connectors 2100 latched therein. Note that in the latched position, receptacle hooks 2302 do not extend into receptacle hook openings 2420. This is further visible in the cross-sectional view of an assembled adapter 2400 of FIG. 25A. Connector alignment keys 2105 are positioned within connector alignment slots 2403. As seen in the cross-sectional view of FIG. 23A, the push-pull tab 2017 may extend beyond the connector boot 2145 providing clearance to easily grip the tab and remove a connector. Also seen in FIG. 31 is adapter flex tab 2401 and panel hook 2490 for interaction with racks or other equipment.

Figure 33B:
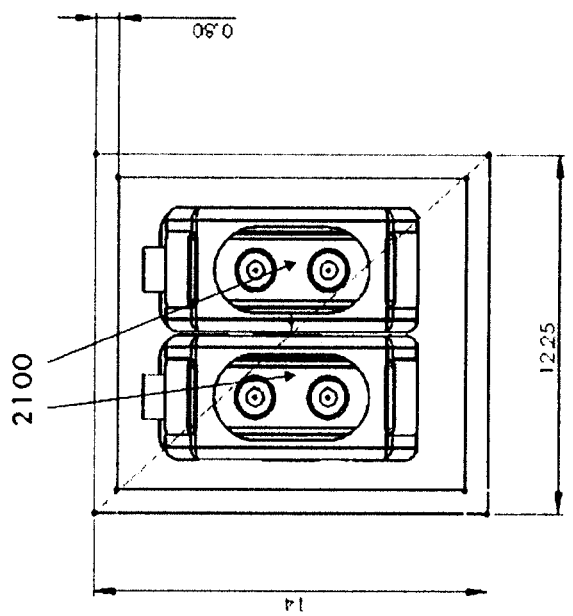
FIG. 33B depicts the micro optical connectors of FIG. 21B in an SFP footprint, depicting dimensions in millimeters.

Through the various features described above, the density of optical connectors 2100 that may be provided in the standard transceiver footprint connector spaces may be doubled. For example, in a small form factor pluggable (SFP) footprint of 14×12.25 mm, two connectors 2100 having four LC-type ferrules 2122 of 1.25 mm outer diameter may be accommodated as seen in FIG. 33B. Similarly, in a quad small form factor pluggable (QSFP) footprint of 13.5×19 mm, four connectors 2100 having a total of eight LC-type ferrules 2122 may be accommodated as seen in FIG. 33A. Further, by providing the connectors in transmit and receive pairs, greater flexibility in optical routing is obtained, as demonstrated by previous FIGS. 16 and 17.

Figure 37:
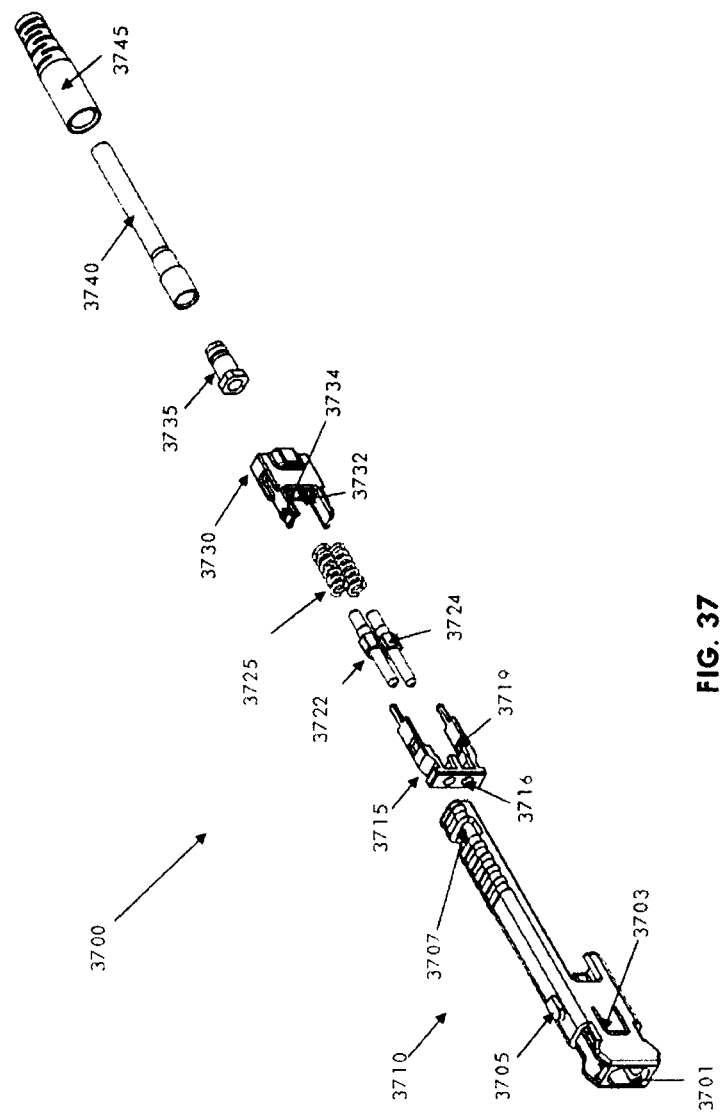
FIG. 37 is an exploded view of a micro optical connector according to a further embodiment.

Turning to FIG. 37, another embodiment of an optical connector is depicted. In this embodiment, the last two digits of each element correspond to the similar elements in the optical connector of FIG. 21A et seq. In FIG. 37, connector 3700 may include an outer housing 3710, a front body 3715, one or more ferrules 3722, one or more ferrule flanges 3724, one or more springs 3725, a back body 3730, a back post 3735, a crimp ring 3740 (depicted with an optional heat shrink tube extending therefrom), and a boot 3745. The outer housing 3710 may include a longitudinal bore 3701 for accommodating the front body 3715 and ferrules 3722, a connector alignment key 3705 used during interconnection, a connector flap 3703 and an optional pull tab 3707 to facilitate removal of the connector 3700 when connected in a dense array of optical connectors. Optionally, the ferrules may be LC-type ferrules having an outer diameter of 1.25 mm.

Figure 38:
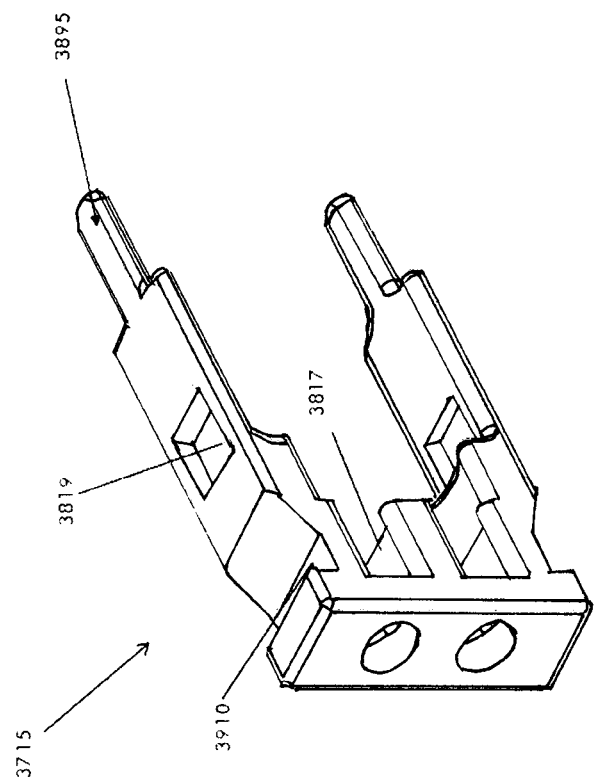
FIG. 38 is an isometric view of a front body of the micro optical connector of FIG. 37.

In FIG. 38 an isometric view of the front body 3715 is depicted. In this embodiment, the back body hook cutout 3819 has been moved forward, advantageously strengthening the assembled connector in side load environments. An alignment tab 3895 is provided for mating with a receiving recess on the back body. The receptacle hook recess 3910 operates in a substantially similar manner to the recess of FIG. 21A, described above. A ferrule flange alignment slot 3817 is also provided.

Figure 39:
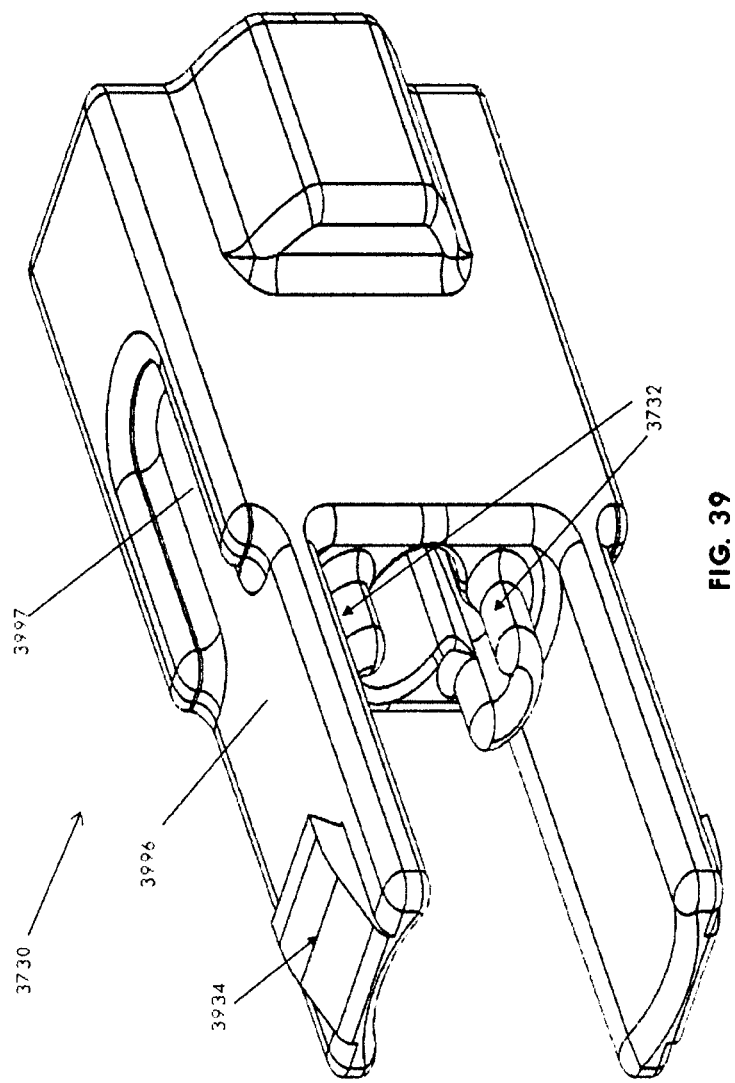
FIG. 39 is an isometric view of a back body of the micro optical connector of FIG. 37.

In FIG. 39, the back body 3730 is depicted, showing alignment tab recess 3997 for receiving alignment tab 3895. The front body hook 3934, for interconnecting in back body hook cutout 3819, extends outwardly from the main portion of the back body through extended hook arm 3996. Through the extended hook arm 3996 and the alignment tab 3895, breakage during side loads is reduced as the load is redistributed more evenly across the entire connector, reducing stress on the backpost.

Figure 40:
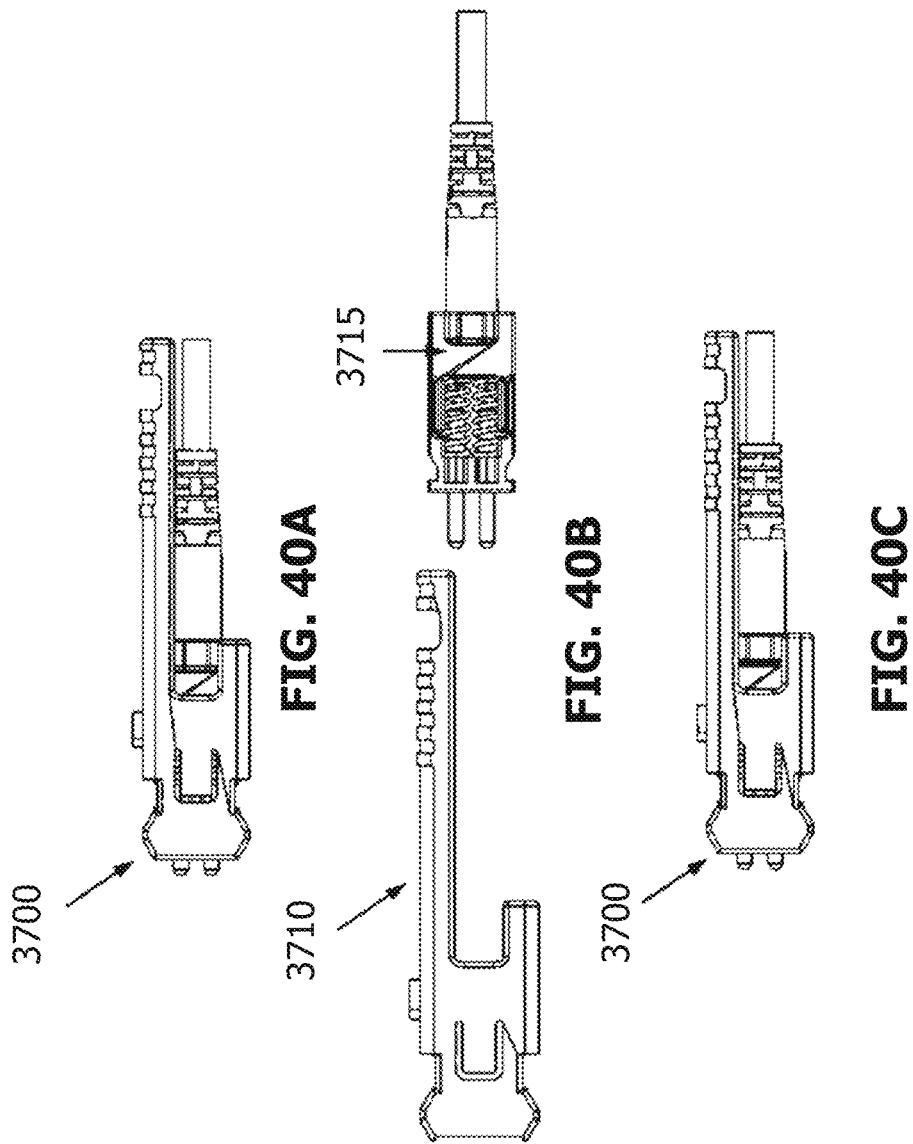
FIGS. 40A, 40B, and 40C depict a technique for reversing polarity of the optical connector of FIG. 37.

As seen in FIGS. 40A-40C, the assembled front body 3715 may be removed from the outer housing 3710, rotated 180° as indicated by the arrow (FIG. 40B), and re-inserted into the outer housing (FIG. 40C). This allows for a change in the polarity of the front body 3715, and therefore the ferrules can switch quickly and easily without unnecessarily risking the delicate fiber cables and ferrules. As described previously with respect to FIGS. 35A-35C, connector flap 3703 is flexed outward to release the front body from the outer housing.

Figure 41:
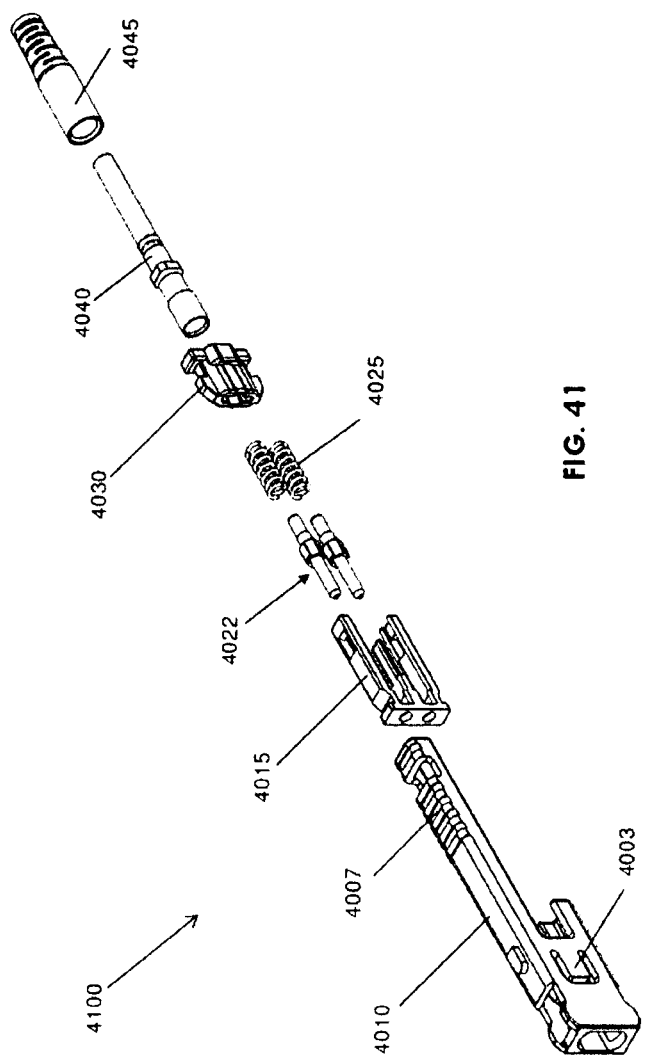
FIG. 41 is an exploded view of a micro optical connector according to a further embodiment.

Turning to FIG. 41, another embodiment of an optical connector is depicted. In this embodiment, the last two digits of each element correspond to the similar elements in the micro optical connectors of FIG. 21A and FIG. 37. In FIG. 41, connector 4100 may include an outer housing 4110, a front body 4115, one or more ferrules 4122, one or more springs 4125, a back body 4130, a crimp ring 4140, and a boot 4145. The outer housing 4110 may include a connector flap 4103 and an optional pull tab 4107 to facilitate removal of the connector 4100 when connected in a dense array of optical connectors. Optionally, the ferrules may be LC-type ferrules having an outer diameter of 1.25 mm.

As seen in FIG. 42A, the front body 4015 in this embodiment includes a middle wall 4260 interposed between the ferrules and springs when the front body is assembled. This middle wall reduces the possibility of the springs becoming entangled with each other, binding the connector and breaking the optical fibers. The front body 4015 also includes an alignment cut out guide 4625, seen in the side view of FIG. 42B. The alignment cut out guides the back body 4030 into the front body 4015 during assembly of the connecter, and also further reduces the side load that leads to connector breakage or disconnection of the front body and the back body 4030.

Back body 4030, depicted in an enlarged view in FIG. 43, includes an alignment guide 4377 that fits into the alignment cut out guide 4265 of FIG. 42B. The wall structure 4378 also stops the front body to prevent over-compressing the springs and provides strength under a side load.

Figure 44A:
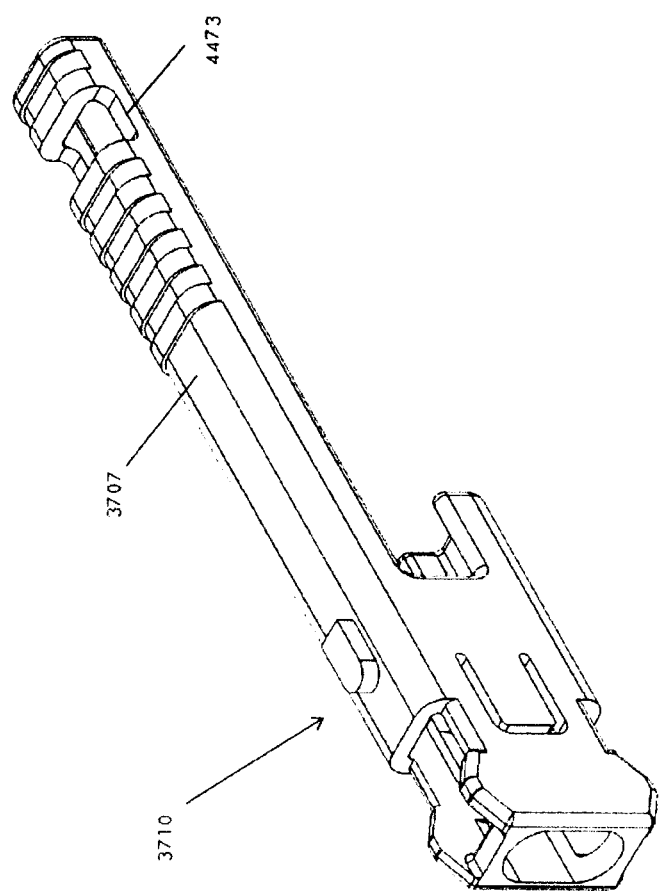
FIGS. 44A, 44B, and 44C are isometric views of the outer housings that may be used with any of the micro optical connectors of FIGS. 21A, 37, and 41.
Figure 44B:
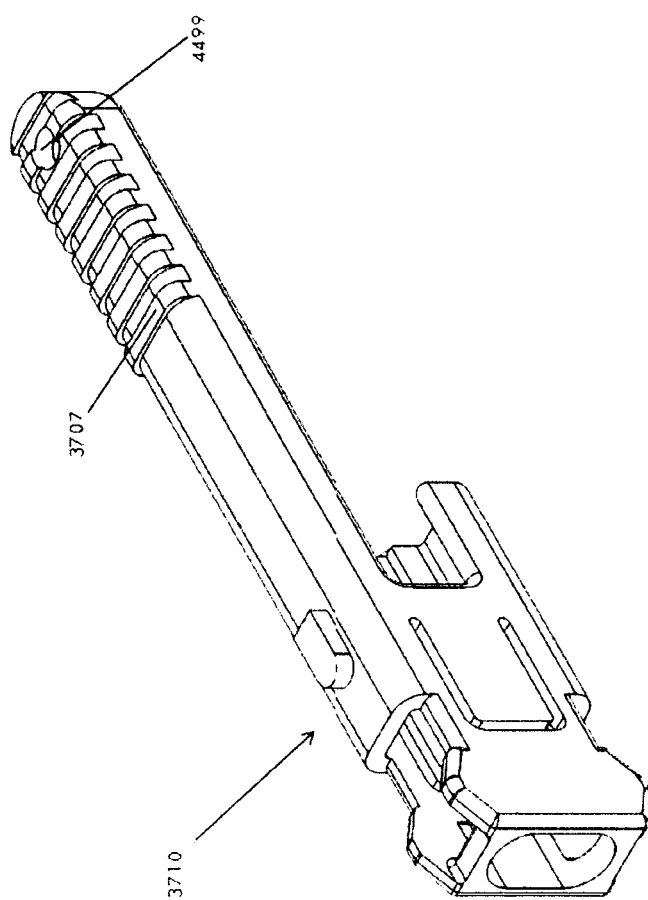
Figure 44C:
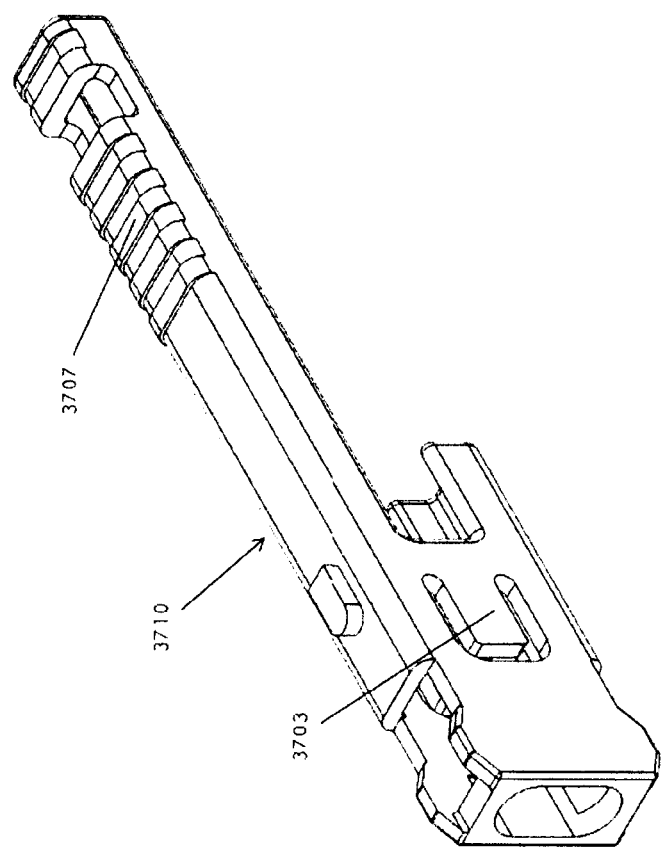

Various modifications to the outer housing, depicted in FIGS. 44A-44C, may be used with any of the optical connectors depicted in FIGS. 21, 37, and 41 or earlier embodiments. In FIG. 44A, the push-pull tab 3707 may include a release recess 4473. Release recess 4473 permits insertion of a tool or fingernail to remove the connector from an adapter or transceiver, without disturbing adjacent connectors. Similarly, FIG. 44B depicts a release hole 4499 in push-pull tab 3707 to permit insertion of an extraction tool to remove the connector from an adapter or transceiver. FIG. 44C shows a modified connector flap 3703 with an increased cutout size of 1 mm to make it easier to insert a tool or a finger to flex the flap 3703 and remove the front body assembly when making a polarity change or aggregating the front body with other front bodies in a larger outer housing.

Figure 45:
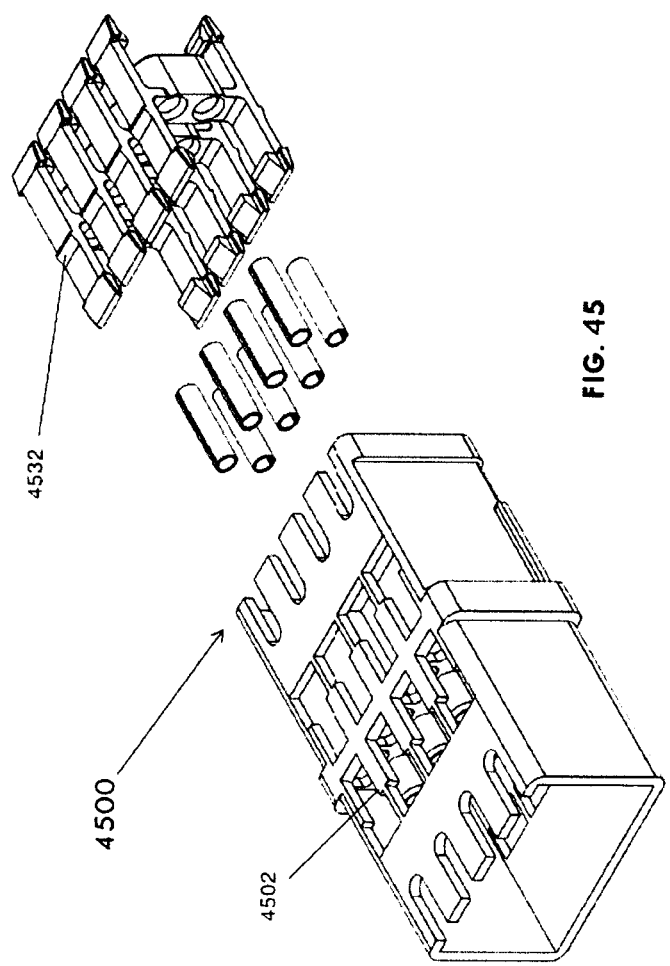
FIG. 45 is an exploded view of an adapter according to a further embodiment.
Figure 46:
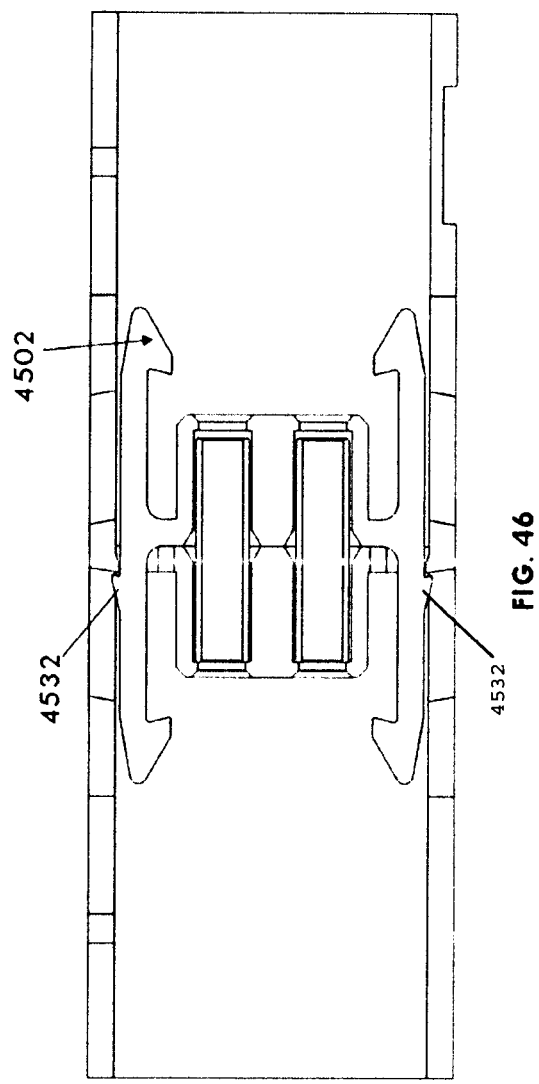
FIG. 46 is a cross-section of the adapter of FIG. 45, assembled.

Another embodiment of an adapter/transceiver receptacle is depicted in FIG. 45. Unlabeled elements are substantially similar to elements depicted in FIG. 24. In this FIG., adapter housing hooks 4532 can be seen along with receptacle hooks 4502. Turning to the cross-sectional view of the assembled adapter in FIG. 46, the engagement of these elements may be seen. FIG. 46 shows adapter housing hooks 4532 secured behind adapter wall portion to fix hook within adapter housing 2402.

Figure 47:
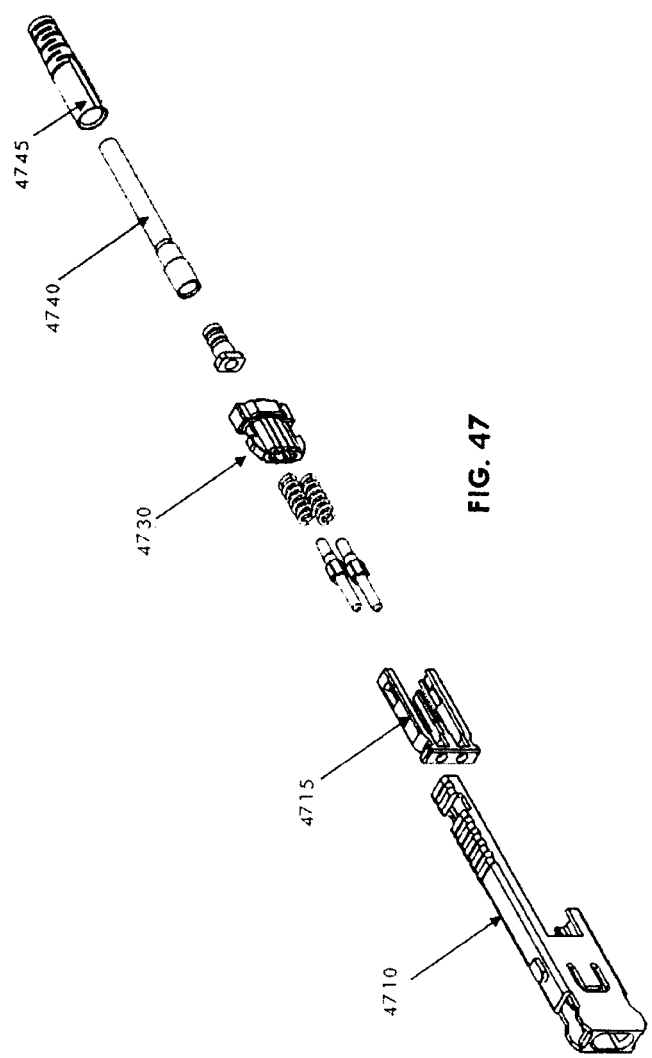
FIG. 47 is an exploded view of a connector according to another embodiment.

Another embodiment of an optical connector 4700 is depicted in FIG. 47. The optical connector of FIG. 47 includes outer housing 4710, front body 4715, ferrules 4722, springs 4725, back body 4730, backpost 4735, crimp ring 4740, and boot 4745. Here, the emphasis is on the back body, 4730. A more detailed view of the back body 4730 is presented in FIG. 48. In this embodiment, the backpost flange has a substantially rectangular shape in order to narrow the overall connector profile by approximately 0.5 mm. Back post overmolding 4859 accommodates the back post flange 4857 and reduces the potential for back post breakage. The back wall 4853 is extended in length to 3 mm from 1.5 mm to improve the sideload strength of the overall connector. The crimp ring positioning 4855 is inversed from earlier embodiments to improve holding of aramid fiber from an optical fiber cable, improving cable retention of the back post.

Figure 48:
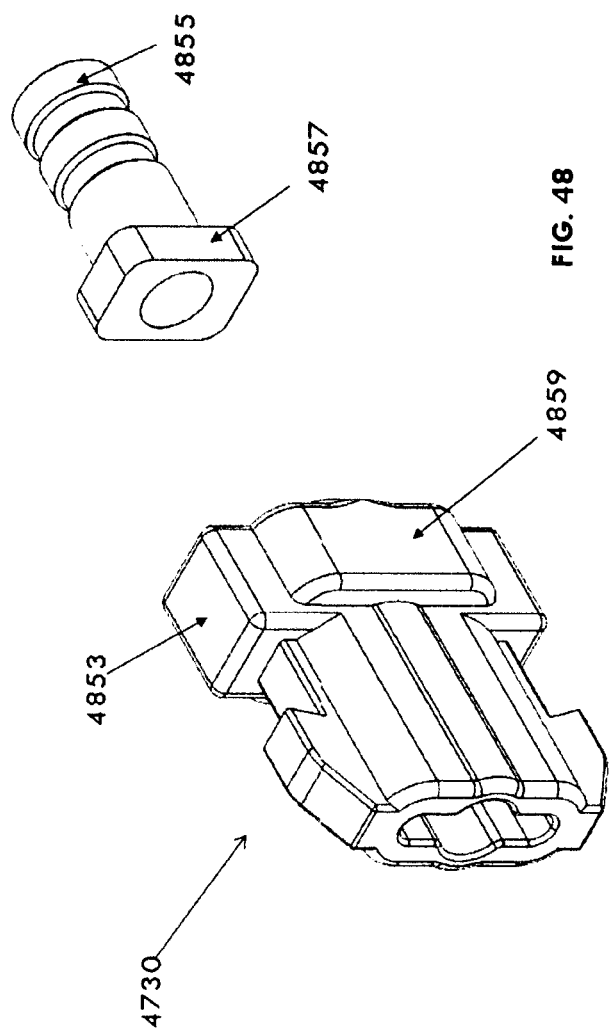
FIG. 48 is an isometric view of the back body and the back post of the connector of FIG. 47.
Figure 49:
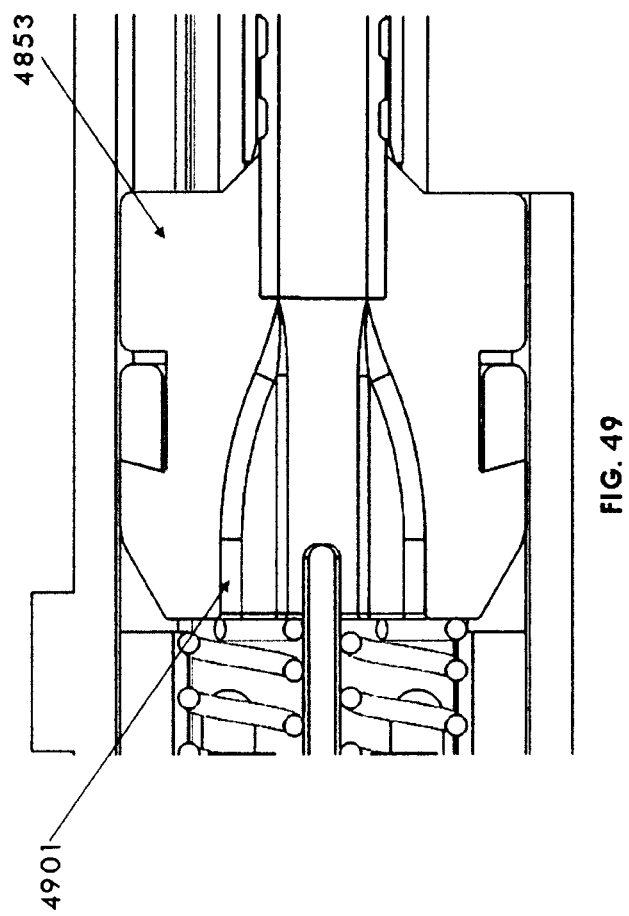
FIG. 49 is a cross-section of the back post of FIG. 47 assembled with optical fibers.

Many advantages are achieved by the backpost of FIG. 48. In addition to increased connector strength, a longer fiber path 4901 is provided as shown in FIG. 49. This longer fiber path, approximately 1.5 mm longer than in previous embodiments, allows for a gentler curve as the fibers are split from the fiber optic cable, improving insertion and return loss of the fibers. In FIG. 49, the back wall 4853 can be seen as a portion of the back body 4730.

Figure 50:
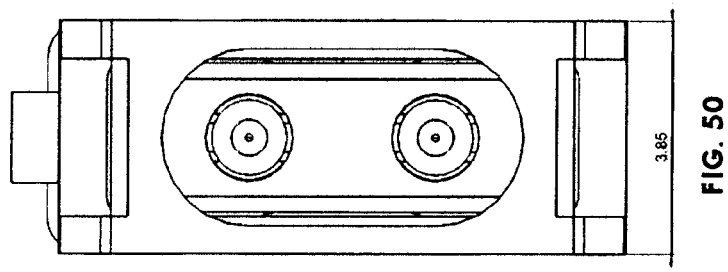
FIG. 50 is a front view of the connector of FIG. 47.

In view of the various modifications of this embodiment, FIG. 50 depicts a connector 4700 front view showing overall reduced connector width of 3.85 mm. Such a size reduction permits 4 optical connectors (a total of 8 ferrules) to be accommodated in a transceiver or connector footprint of 16 mm (including tolerances). Thus, the connectors of the present invention may be used to connect 8 LC-ferrule-housed fibers in a QSFP footprint.

Figure 51:
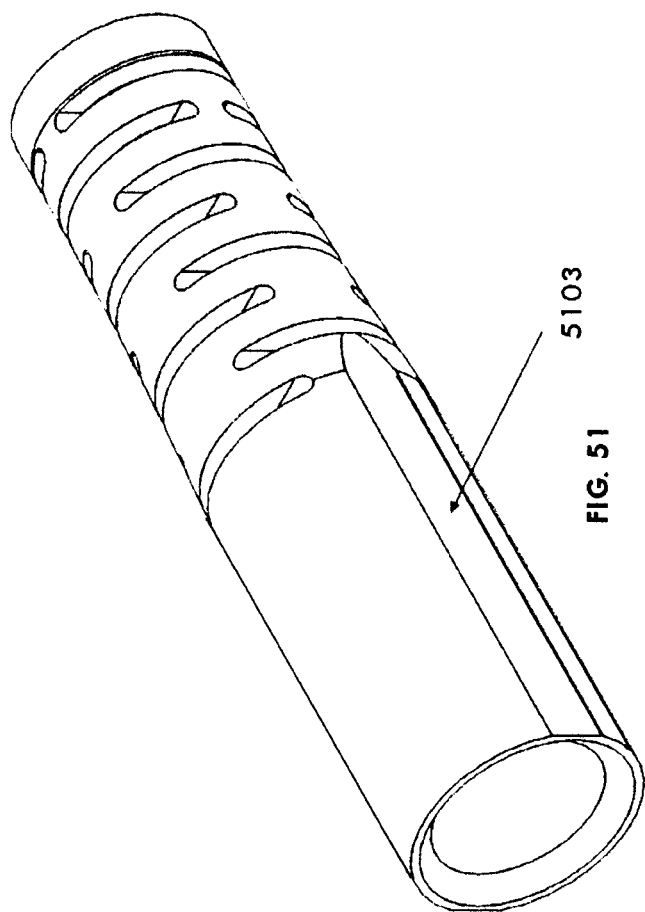
FIG. 51 is an isometric view of the boot of the connector of FIG. 47.
Figure 52:
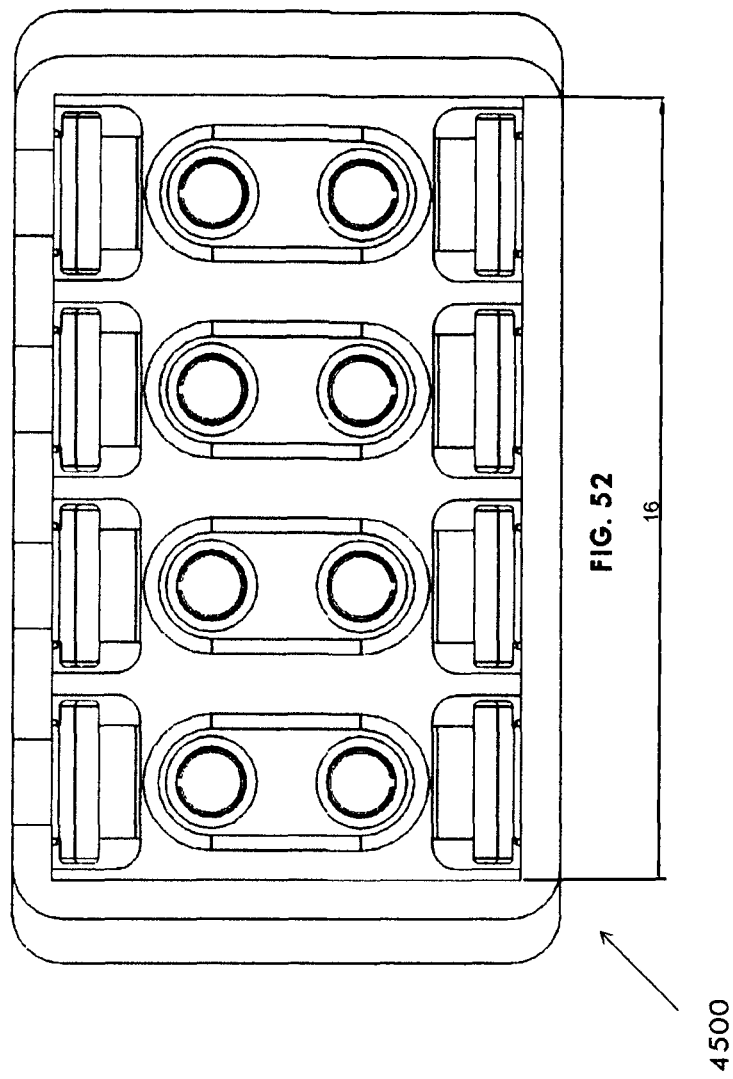
FIG. 52 is a front view of the adapter of FIG. 45.

To further decrease the space required by the optical connectors, a side thickness reduction may be carried out on the boot of connector 4700. Side thickness reduction 5103, depicted in FIG. 51, narrows the thickness of the boot on either side, reducing the space required by the boot to the 3.85 min profile of connector 4700. Thus four connectors will fit in the QSFP transceiver footprint. This footprint is shown in the adapter front view of FIG. 52—as noted above, the front view of an adapter and that of a transceiver are substantially similar from the optical perspective. In FIG. 52, the adapter inner wall is reduced from 17.4 mm to 16 mm. All of the modifications set forth in the FIG. 47 et seq. embodiment make it possible for the four connectors to fit in the profile of FIG. 52.

Figure 53:
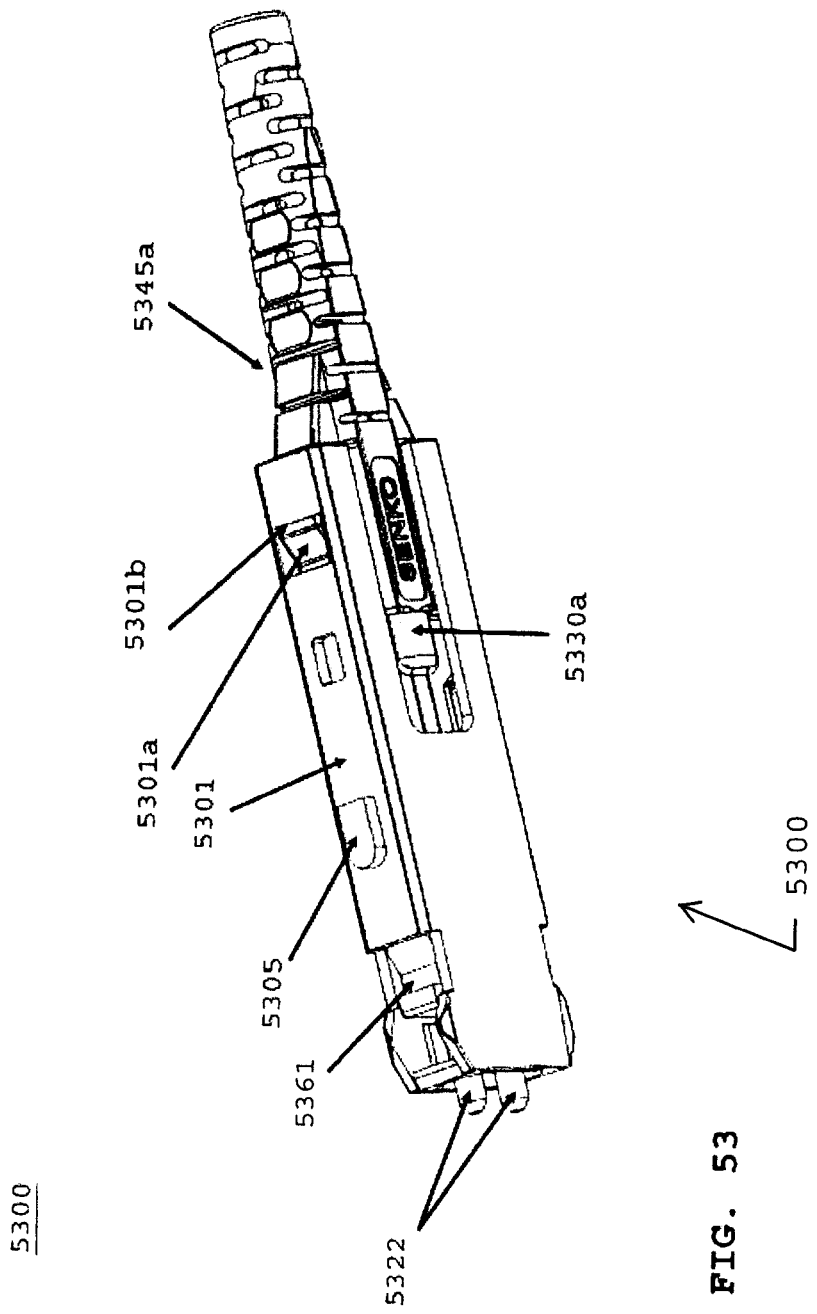
FIG. 53 is perspective view of a connector similar to the connector of FIG. 47 but incorporating a push/pull release feature.
Figure 57:
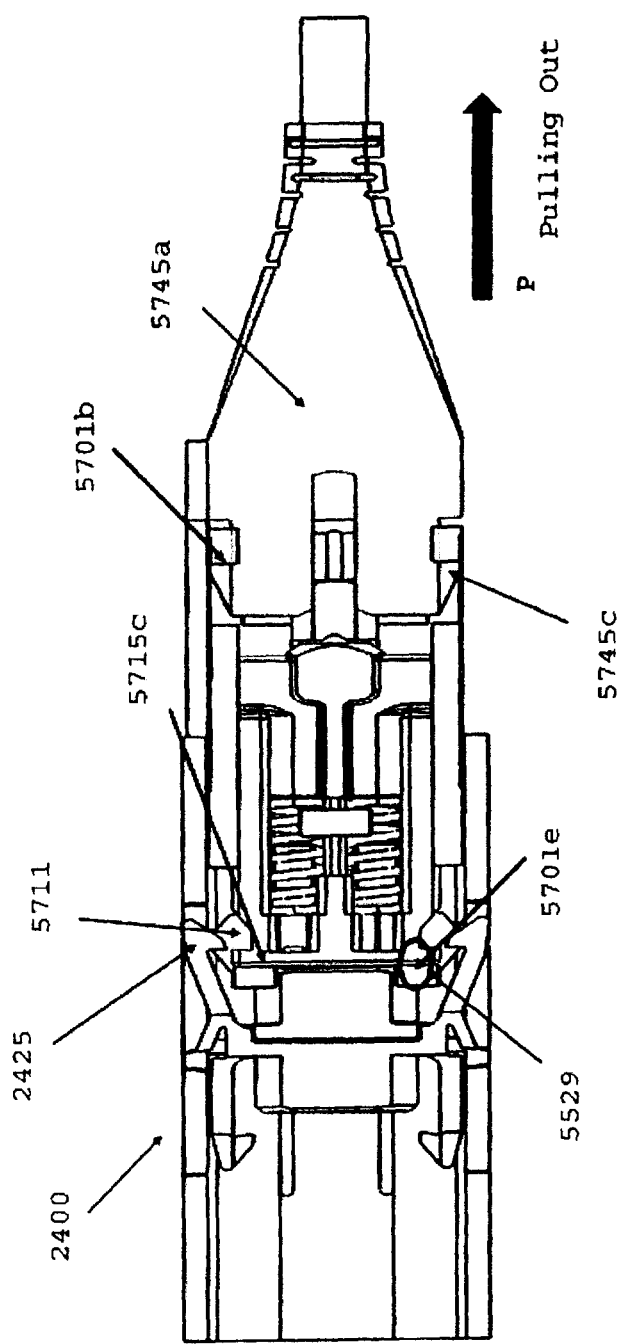
FIG. 57 is a cross-section view of connector of FIG. 53 partially removed using push/pull release boot according to the present invention.

FIG. 53 depicts connector 5300 with a push/pull boot assembly 5345a at its distal end receiving a fiber cable with a plural of fiber strands therein, and a proximal end configured to connect and secure to a back body 5330 secured with outer housing 5301. Outer housing 5301 has an opening 5301a with a stop face 5301b that boot wing (5545b, 5545c) (refer to FIG. 55) engages when boot assembly 5345a is pulled in a distal direction fully to release connector 5300 from a receptacle as shown in FIG. 57.

FIG. 54 depicts an exploded view of connector 5300 of FIG. 53. Boot assembly 5345a accepts crimp ring assembly 5440a having a protective tube 5440c covering fiber strands and a crimp ring 5440b secured to a back post 5430c of back body 5330, which in one or more embodiments comprises a back body member that is separately attached to the back post. A pair of springs 5425 are placed over a corresponding ferrule assembly 5420 comprising a ferrule and ferrule flange. The ferrule assembly and springs are held within front body 5415 by back body 5330, as described for connector 2400. The front body 5415 is inserted into a distal opening of outer housing 5301 with boot assembly wing 5545a secured with a distal opening 5301a of outer housing.

Figure 55:
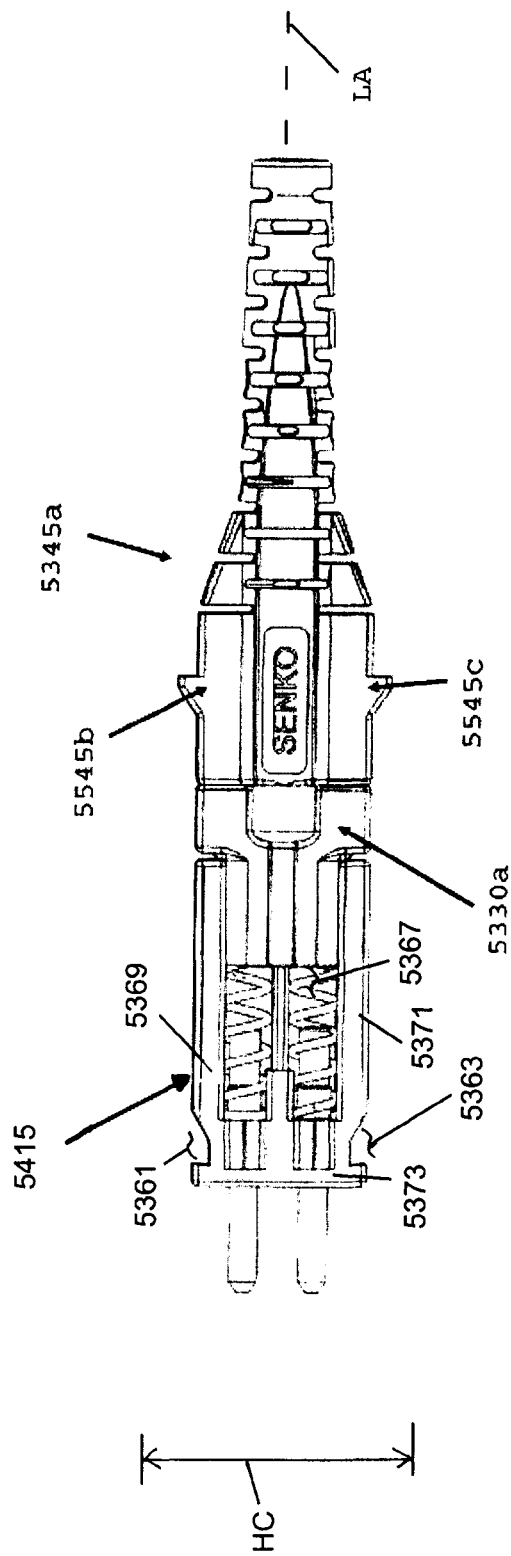
FIG. 55 is a side perspective view of connector of FIG. 53 with an outer housing removed.

FIG. 55 depicts connector of FIG. 53 without its outer housing 5301, in an assembled configuration. Boot assembly 5345a is secured on back post 5430c of back body 5330a via crimp ring 5440a, as described in FIG. 54. Wings (5545b, 5545c) secure FIG. 55 assembly within outer housing 5301, and during release of connector 5300 from a receptacle, wings (5545b, 5545c) pull back outer housing a specific distance "d", which releases hook 5625 that is seated in recess 5611 (refer to FIG. 56), while connector 5300 is secured within receptacle 2400.

Figure 56:
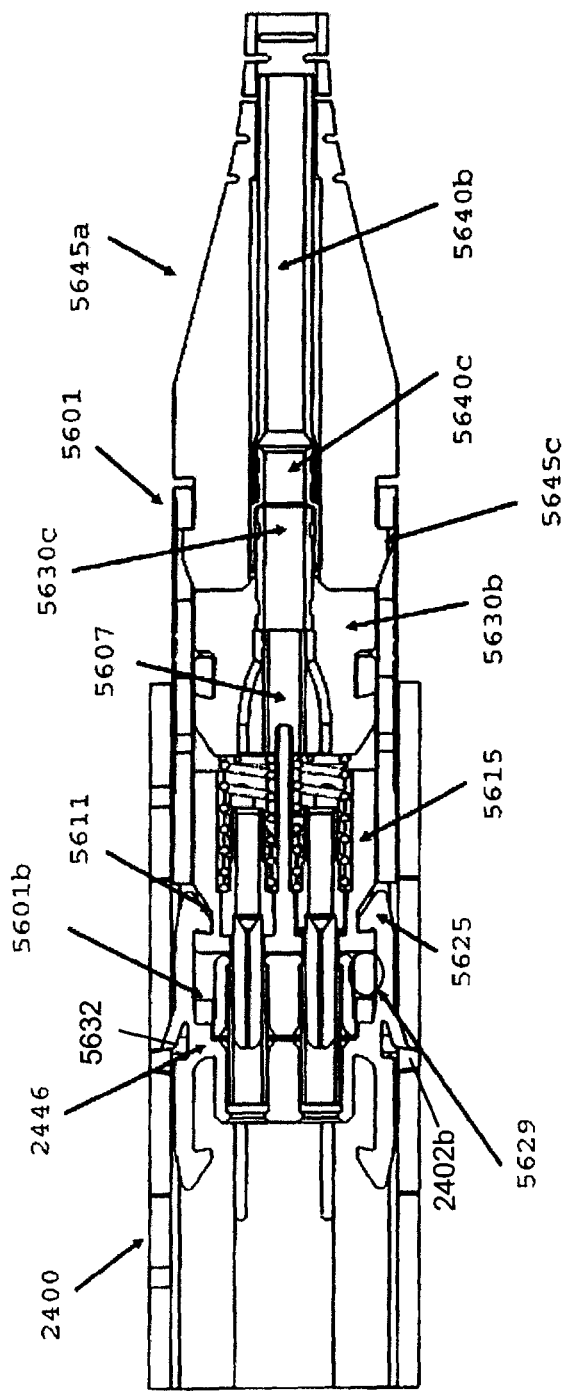
FIG. 56 is a cross-section view of connector of FIG. 53 latched into a receptacle.

FIG. 56 depicts connector 5300 secured within receptacle 2400 of FIG. 24. Receptacle hook or latch 5625 rests in connector recess 5611 formed within front body 5615, at its proximal end. A gap of distance "d" 5629 limits travel of outer housing 5601 as boot release 5645a wings (5645b, 5545b) engage 5301b stop face of outer housing 5601. Crimp ring 564c is shown secured to back post 5630c. Back body 5630b is secured within front body 5615 distal openings 5451b (FIG. 54). FIG. 56 further illustrates adapter housing hooks 5632 for connector hook 5625 secured behind adapter housing wall cut-out portion 2402b.

Figure 58:
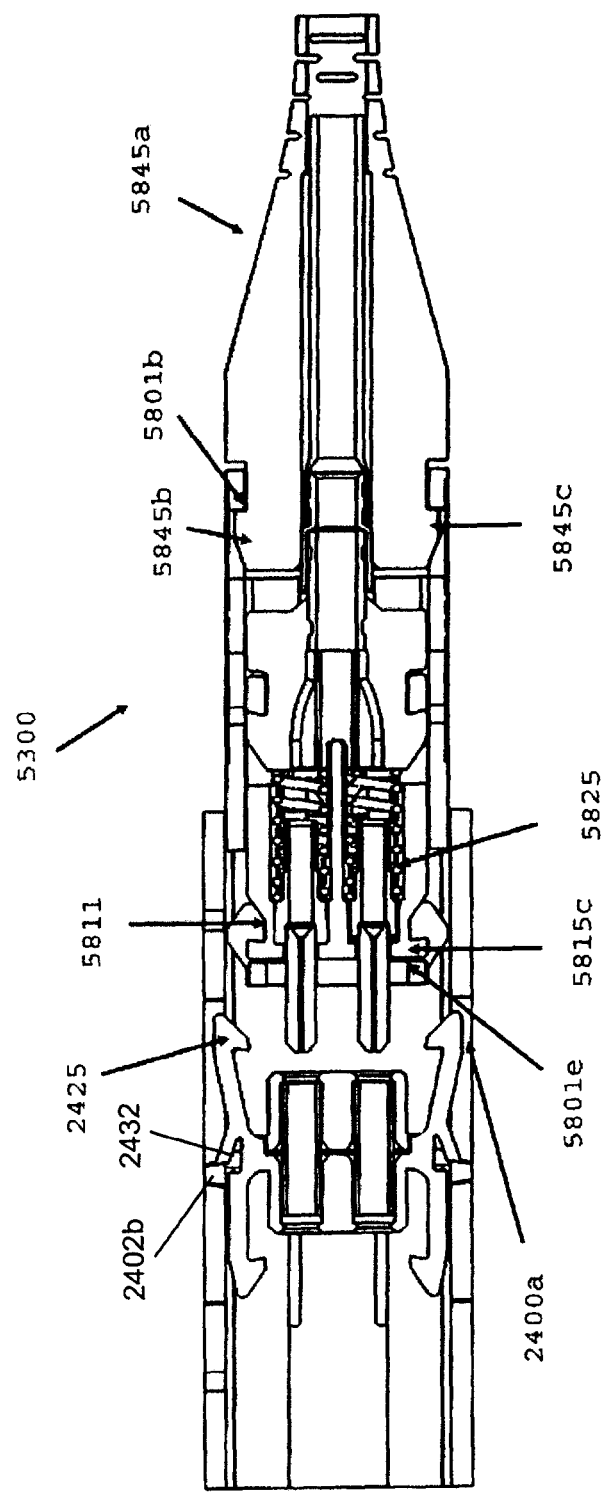
FIG. 58 is a cross-section view of connector of FIG. 53 released from receptacle inner latches or hooks of FIG. 24.

FIG. 57 depicts connector 5300 being removed or pulled out of receptacle 2400 in direction "P". Hook or latch 2425 within receptacle housing lifts out of recess 5711 along front body ramp 5401d (FIG. 54), as boot assembly is being pulled rearward or in a distal direction. Gap 5529 is closed as shown in FIG. 57. Inner face of connector housing 5715c is flush with front face of front body 5701e, which stops travel of boot assembly and is configured to ensure hook 2425 is displaced from recess 5711 to release connector from receptacle, as shown in FIG. 58. FIG. 58 depicts connector 5300 removed from receptacle 2400 using boot assembly 5845a. Wings (5845b, 5845c) are flush with outer housing face 5801b. Spring 2825 bias forward front body face 5815c to be flush with front body face 5801e. Hook or latch 2425 is displaced from recess 5811, and hook resides in a gap 2400a within outer housing of receptacle 2400. FIG. 58 further depicts adapter housing hook 2432 secured against wall portion 2402b formed by gap 2400a within adapter housing for a hook to flex into during connector insertion.

Accordingly, referring to FIGS. 53, 53A, 54, and 56, a low-profile optical connector, generally indicated at 5300, is configured to be retained in the receptacle of an adapter by a receptacle hook. An exemplary embodiment of an adapter to which the connector 5300 can be mated will be described in further detail below. In general, the optical connector 5300 comprises first and second recesses 5361, 5363 on opposite sides of the connector. For example, the first recess 5361 can be configured to receive a portion of a first hook arm of a receptacle hook and the second recess 5363 can be configured to a portion of a second hook arm of the receptacle hook to retain the optical connector 5300 in the receptacle.

In the illustrated embodiment, the connector 5300 includes the outer housing 5301 and a plurality of optical fibers 5365 (FIG. 53B) are supported in the housing. Suitably, the optical fibers are located between the first and second recesses 5361, 5363. In one or more embodiments, the recesses 5361, 5363 are spaced apart along a height HC (broadly, a first dimension) of the connector 5361, and at least some of the optical fibers 5365 are spaced apart along the same dimension between the recesses. In the illustrated embodiment, the optical connector comprises two LC ferrules 5420 supporting the optical fibers. The ferrules 5420 are located between the recesses 5361, 5363 and spaced apart along the height HC of the connector 5300. In another embodiment, the LC ferrules 5420 are replaced with SC ferrules or one or more mechanical transfer (MT-type) ferrules (see FIGS. 18A, 18B) oriented so that fibers are spaced apart along the height HC of the connector 5300.

Figure 53A:
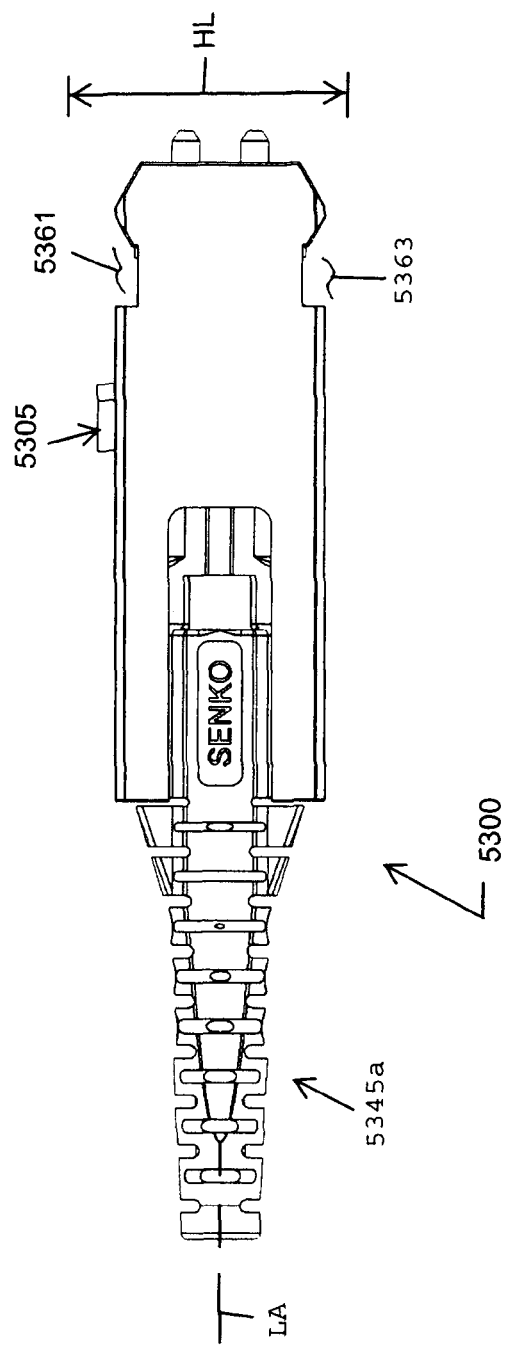
FIG. 53A is a side elevation of the connector of FIG. 53.
Figure 53B:
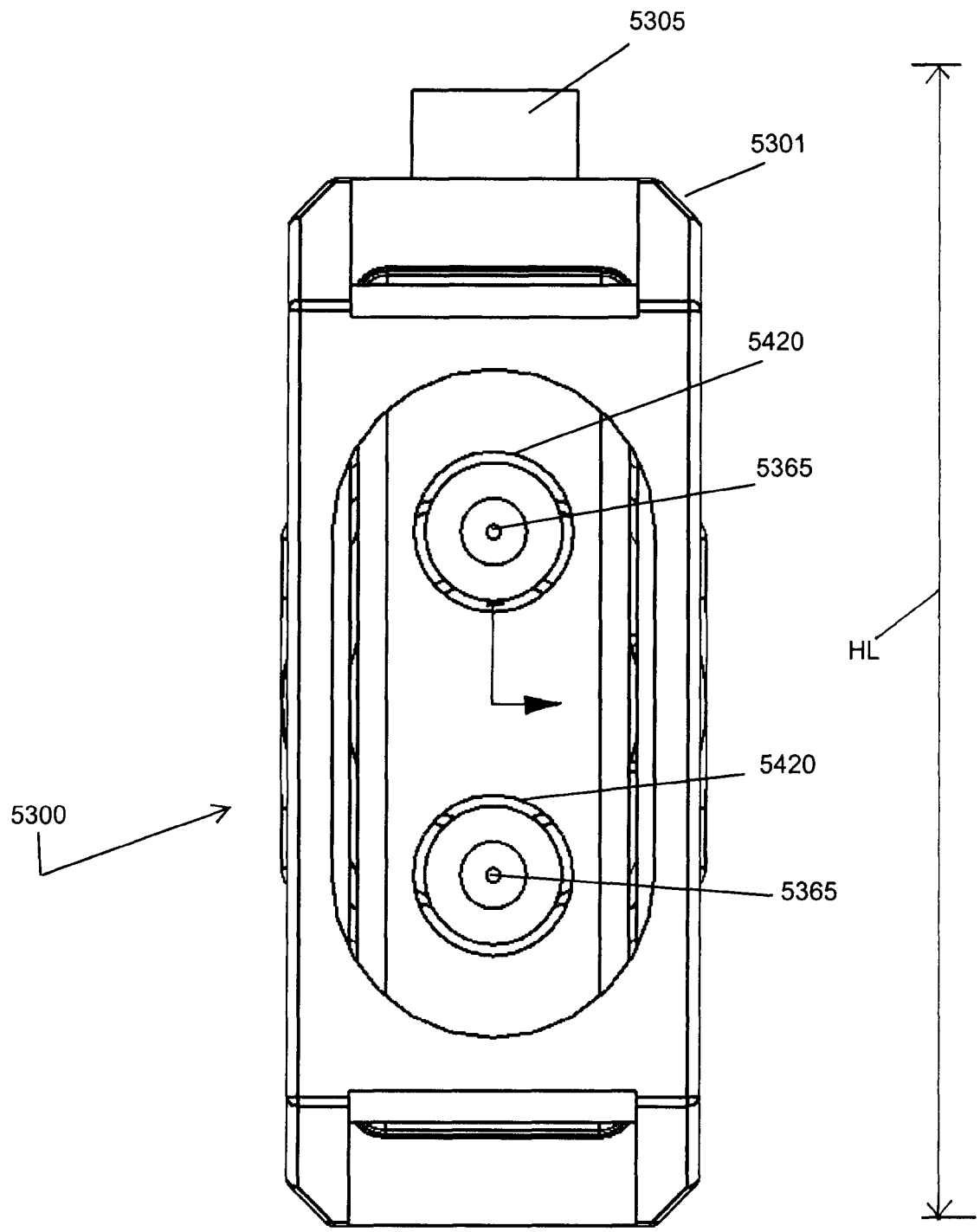
FIG. 53B is an end elevation of the connector of FIG. 53.

As explained above in reference to FIGS. 56-58, the outer housing 5301 of the connector 5300 is configured to be removably inserted into a receptacle of an adapter. The outer housing 5301 comprises an opening extending through the outer housing along a longitudinal axis LA (FIG. 53A). At least one inner front body 5415 is received in the opening of the outer housing 5301 (see FIGS. 54, 55). The inner front body 5415 has an interior 5367 in which the inner front body is configured to support at least one optical fiber ferrule 5420, and in turn support a plurality of optical fibers.

Referring to FIGS. 54 and 55, the inner front body 5415 comprises first and second longitudinal wall portions 5369, 5371 extending along the longitudinal axis LA on opposite ends of the interior. In the illustrated embodiment, the inner front body 5415 comprises an upper longitudinal body portion 5369 and a lower longitudinal body portion 5371 spaced apart along the height HC (first dimension) of the inner front body. The inner front body 5415 further comprises a front end portion 5373 that extends along the height HC of the connector 5300 adjacent the front end thereof. The front end portion 5373 connects the front end section of the upper lower longitudinal body portion 5369 to the front end section of the lower longitudinal body portion 5371. The front end portion 5369 suitably has one or more openings through which ferrules 5420 may extend and/or optical signals are passable from the optical fibers 5365. The front end portion 5373 supports the upper and lower longitudinal body portions 5369, 5371 in spaced apart relationship. Suitably, rear end portions of the upper and lower longitudinal body portion are not connected by any material. In addition, the inner front body 5415 has open sidewalls between the upper and lower wall portions 5369, 5371 on opposite sides of the interior 5367. As explained above, the open sidewalls allow a plurality of the connectors 5300 to be arranged side-by-side in relatively high density arrangements.

In the illustrated embodiment, front end sections of the upper and lower portions 5369, 5371 define the adapter hook recesses 5361, 5363. The recesses are exposed through aligned openings 5377, 5379 (FIG. 54) in the outer housing 5301 when the inner front body 5415 is installed in the outer housing.

As explained above, a ferrule spring 5425 can be compressed between a flange of each ferrule 5420 and a back body 5330 that can be lockingly engaged with one of the inner front body 5415 and the outer housing 5301 to hold the inner front body and the ferrules in the outer housing.

Figure 59A:
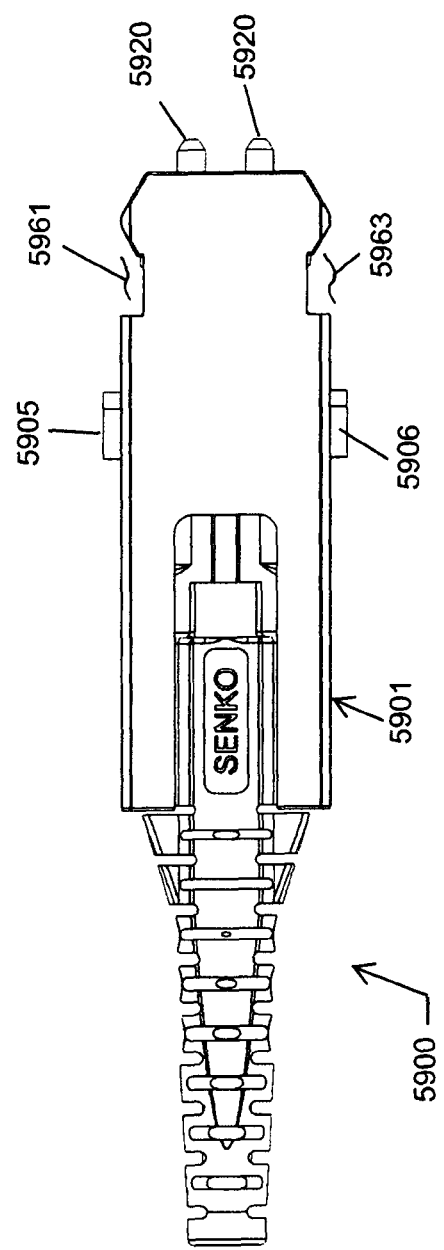
FIG. 59A is a side elevation of another embodiment of a connector.
Figure 59B:
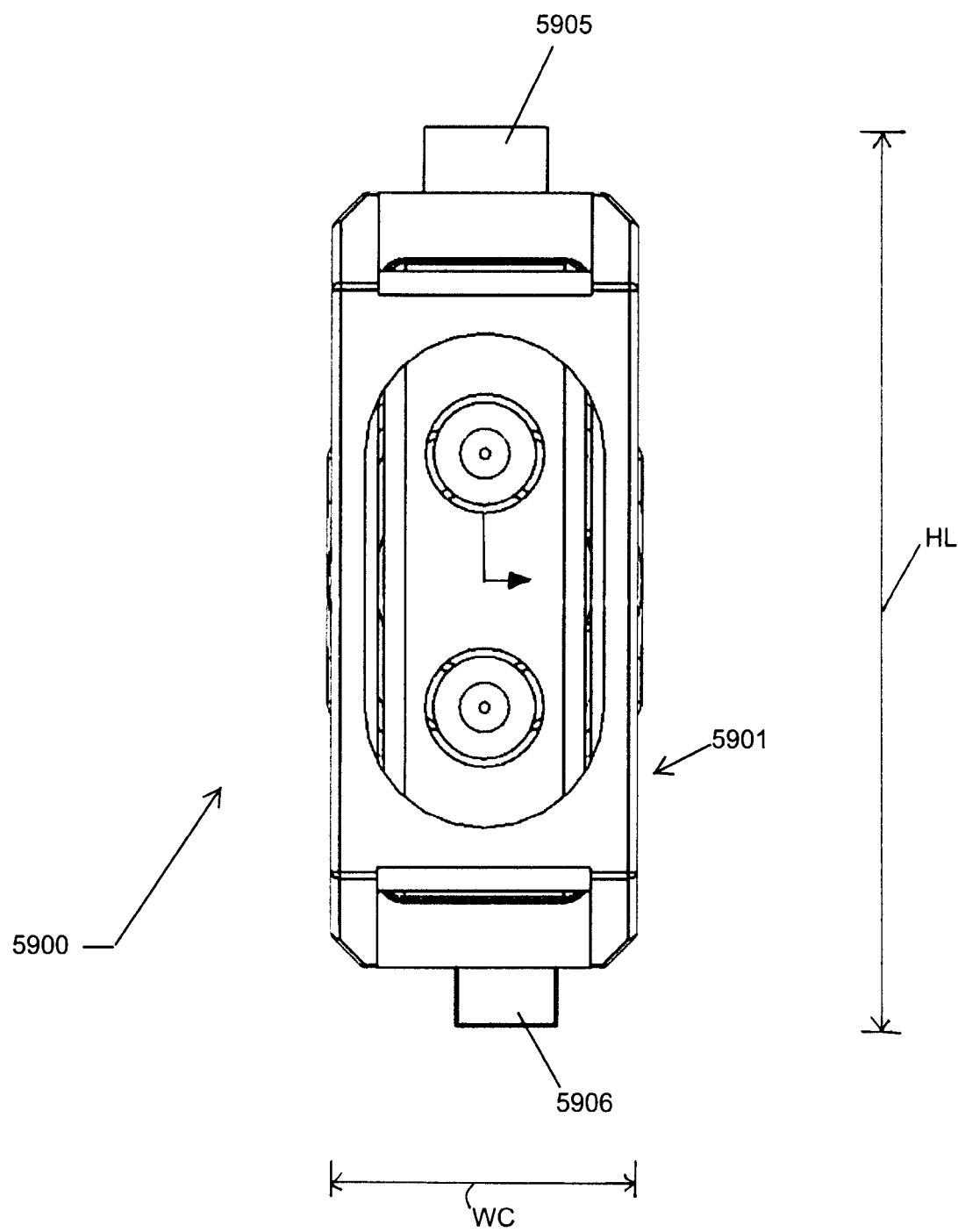
FIG. 59B is an end elevation of the connector of FIG. 59A.

Referring to FIGS. 53-53C, the outer housing comprises an alignment key 5305 on the top side of the outer housing 5301. Referring to FIGS. 59A-59B, in another embodiment of the connector 5900, the outer housing 5901 comprises a pair of alignment keys 5905, 5906 on each of a pair of opposite sides or ends (e.g., top and bottom) of the outer housing 5901. In general, each alignment key 5905, 5906 is configured to be received in a respective alignment recess of an adapter, as will be described in further detail below. Each of the illustrated alignment keys 5905, 5906 is generally in line with a respective hook recess 5961, 5963 (along a width WC (FIG. 59B) of the connector. For purposes of this disclosure, a hook recess is in line with a hook recess along the width of the connector when it at least partially overlaps the hook recess along the width of the connector. To prevent the connector 5300 from being connected in a reverse-polarity orientation, in one or more embodiments, the upper and lower alignment keys 5905, 5906 are offset from one another along a width WC of the connector. In certain embodiments, the upper and lower alignment keys 5905, 5906 differ in one or more of size, shape, and location to prevent being connected in a reverse-polarity orientation. In the illustrated embodiment, the width WC is a second dimension perpendicular to the dimension along which sides of the connector on which the alignment keys are formed are spaced apart from one another, e.g., the height HC.

Figure 64:
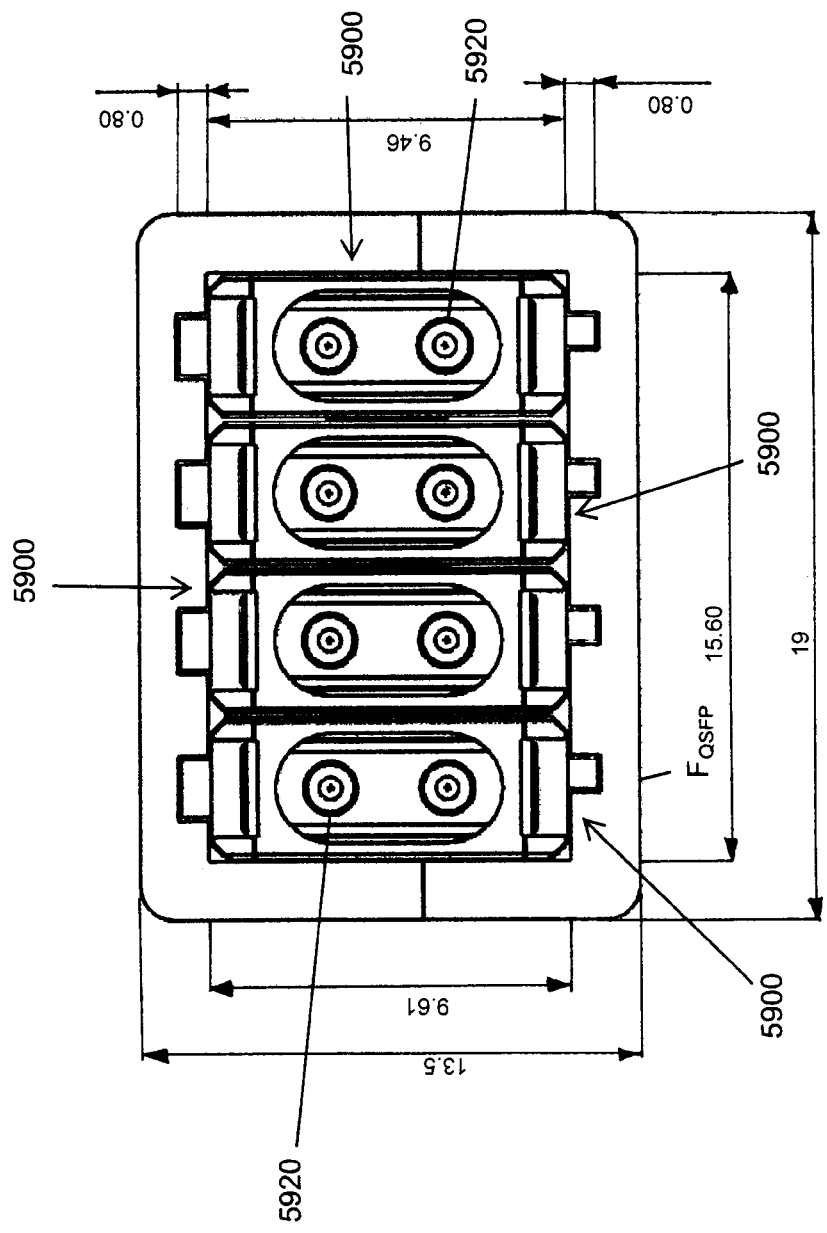
FIG. 64 is an elevation of four of the connectors of FIGS. 59A and 59B arranged in side-by-side relation and superimposed to scale on a quad small form factor pluggable transceiver footprint.
Figure 65:
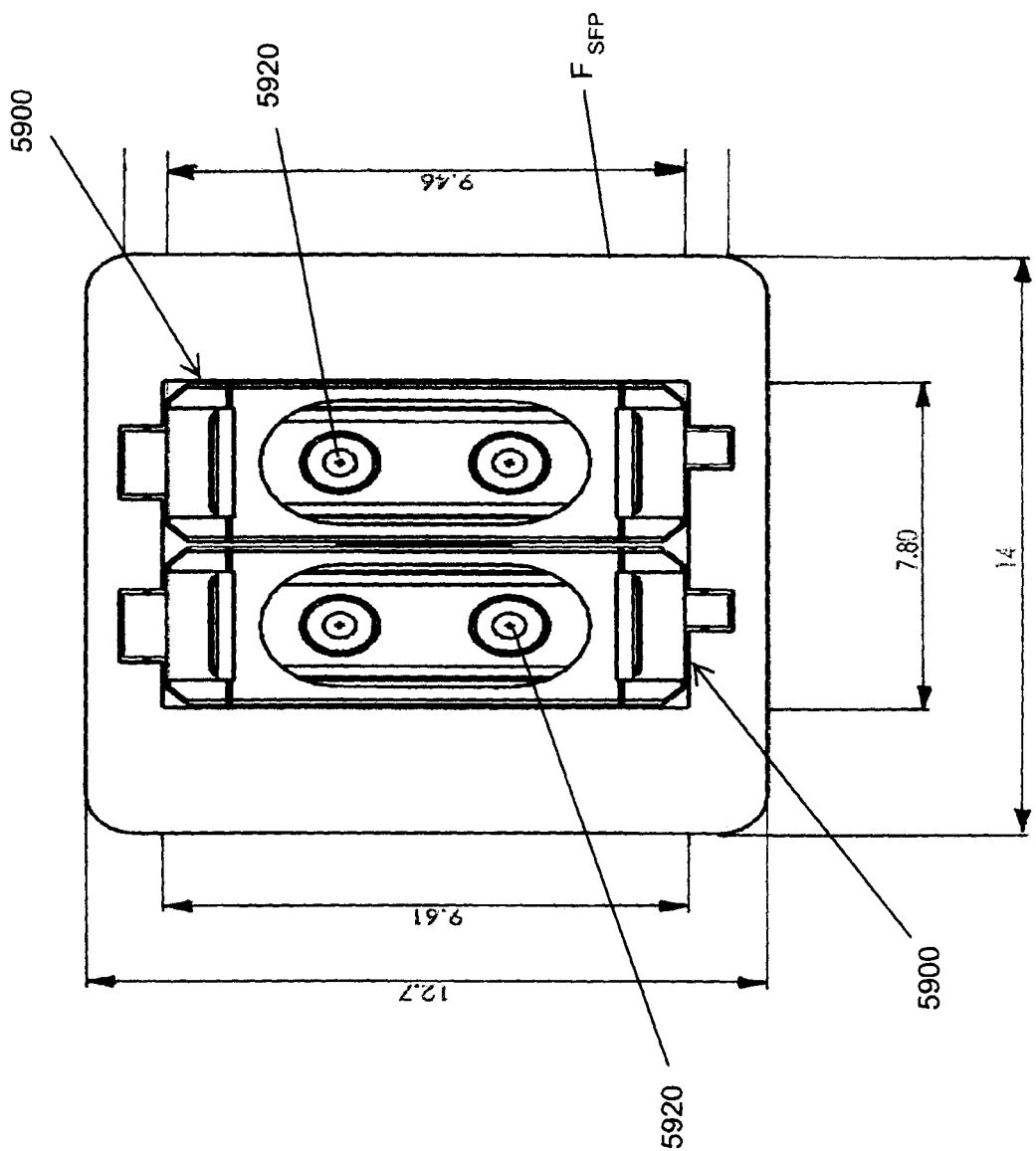
FIG. 65 is an elevation of two of the connectors of FIGS. 59A and 59B arranged in side-by-side relation and superimposed to scale on a small form factor pluggable transceiver footprint.
Figure 66:
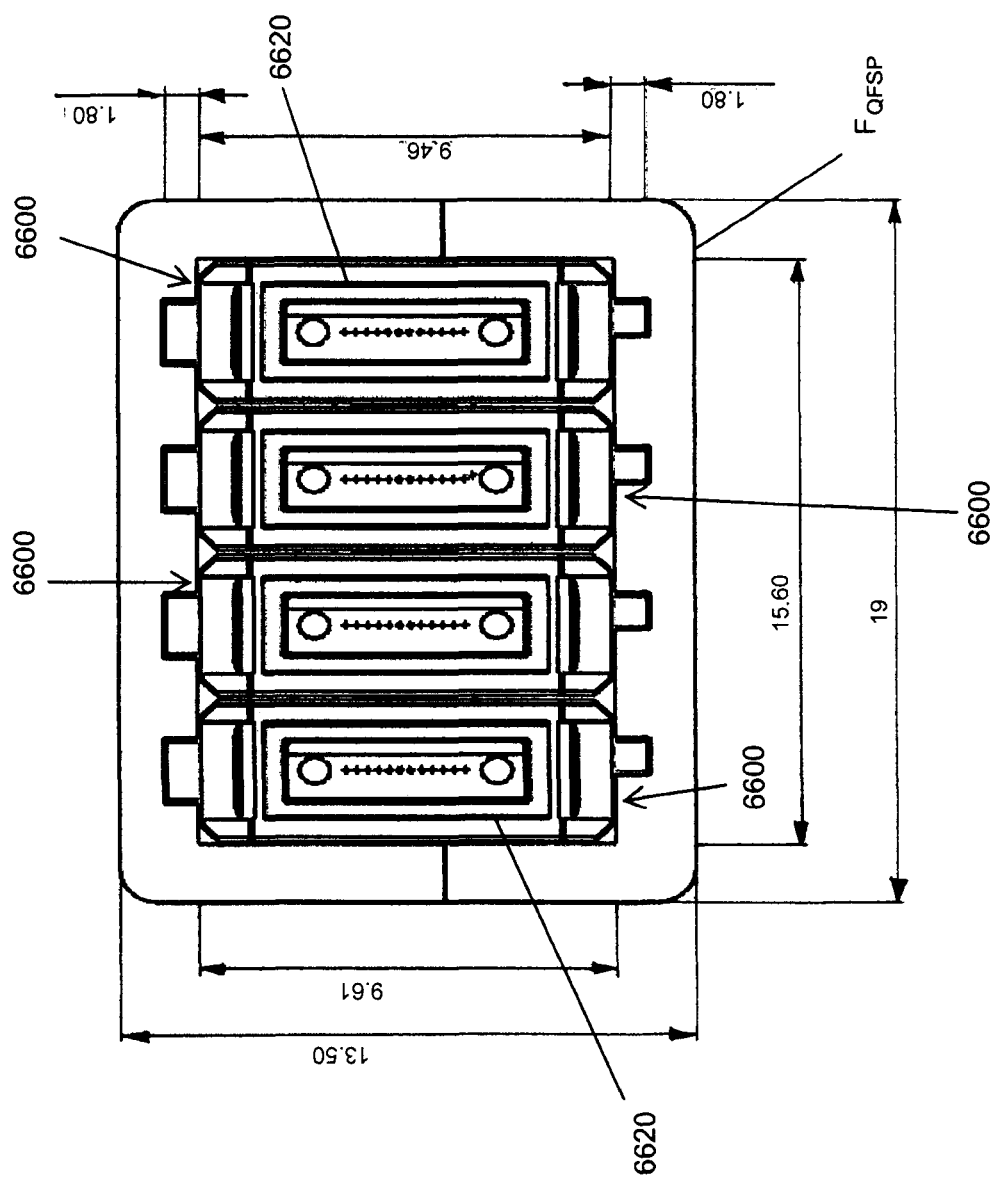
FIG. 66 is an elevation of four MT-type connectors arranged in side-by-side relation and superimposed to scale on a quad small form factor pluggable transceiver footprint.

Referring to FIG. 64, the connectors 5900 are sized and arranged such that four of the connectors can be arranged in side-by-side relationship within a QFSP footprint FQFSP. Similarly, two of the connectors 5900 can be arranged in side-by-side relationship within an SFP footprint $F_{FSP}$, as shown in FIG. 65. Referring to FIG. 66, four of a connector 6600 having an MT-type ferrule 6620 in place of the LC ferrules 5920 of the connector 5900 can likewise be arranged in side-by-side relationship within a $Q_{FSP}$ footprint $F_{QFSP}$. Similarly, two of the connectors 6600 can be arranged in side-by-side relationship within an SFP footprint $F_{FSP}$, as shown in FIG. 65.

Figure 60A:
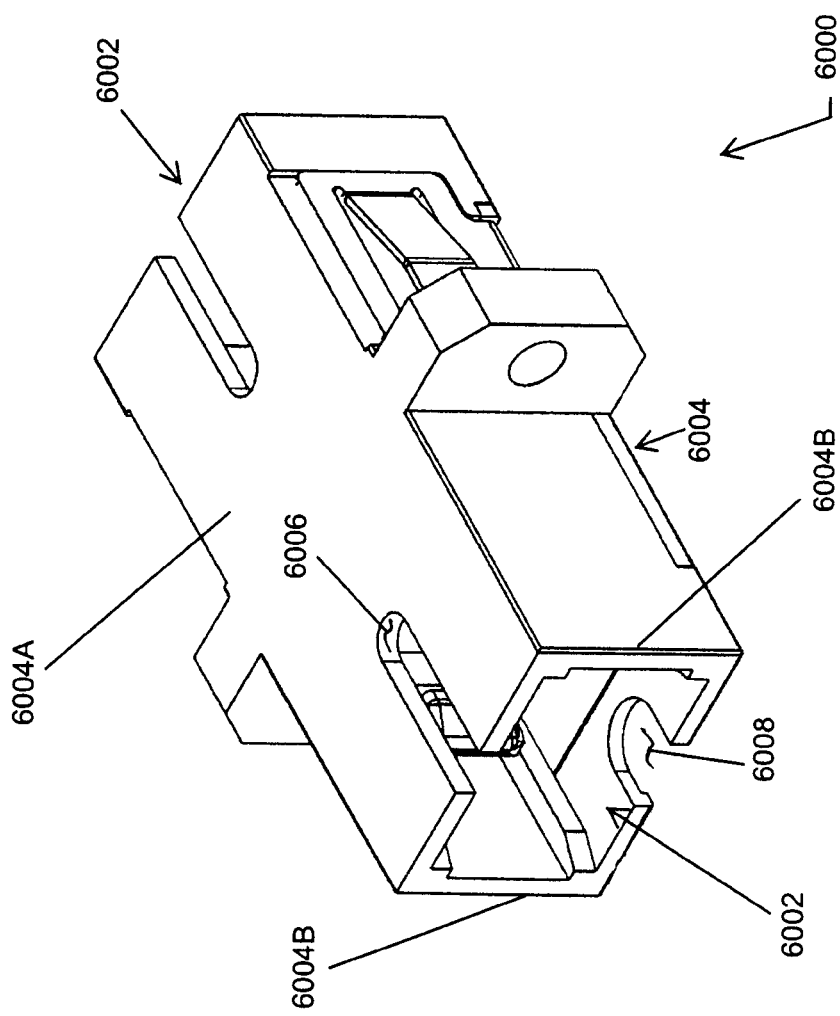
FIG. 60A is a perspective of another embodiment of an adapter.
Figure 60B:
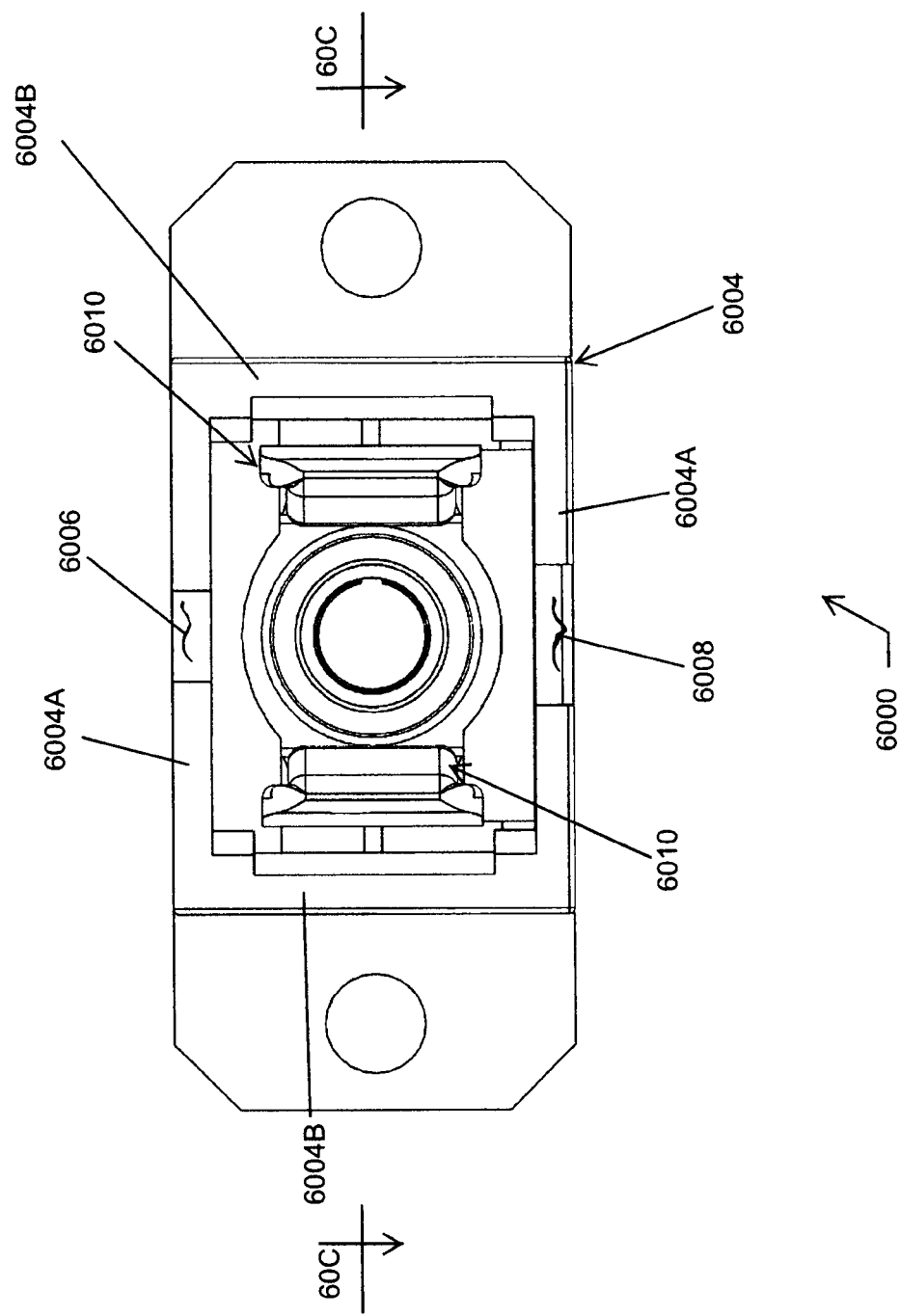
FIG. 60B is an end elevation of the adapter of FIG. 60A.
Figure 60C:
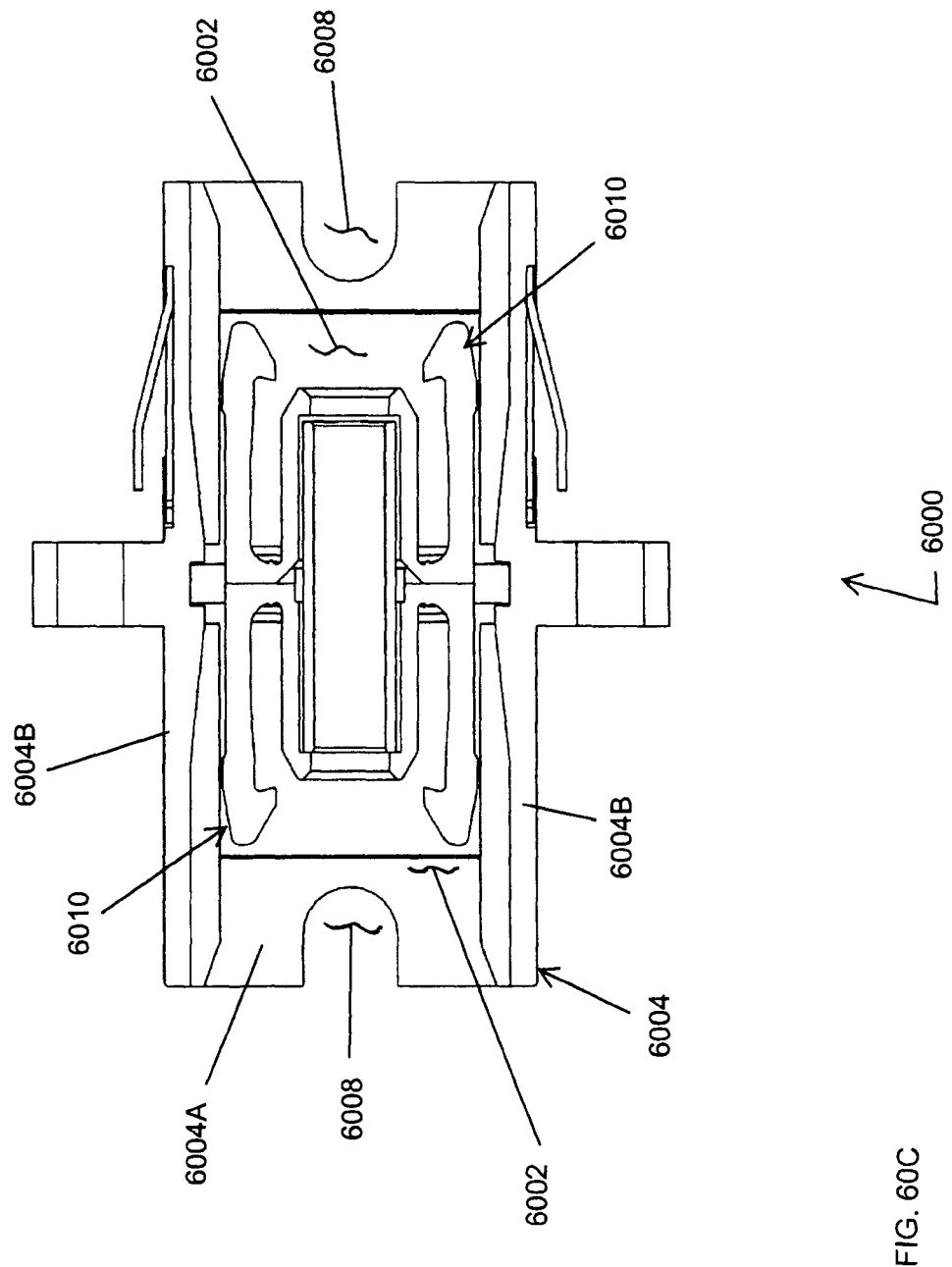
FIG. 60C is a cross section taken in the plane of line 60C-60C of FIG. 60B.

Referring to FIGS. 60A-60C, in one embodiment, an adapter 6000 for a simplex SC connector comprises a housing 6004 defining one or more receptacles 6002. In the illustrated embodiment, at each receptacle 6002, the housing 6004 comprises first and second open-ended alignment slots 6006, 6008 extending through an entire thickness of each of an opposite pair of side walls 6004A of the housing. Each slot 6006, 6008 is configured to receive an alignment key of an SC connector therein. Placing slots 6006, 6008 on opposite side walls of the adapter housing 6004 facilitates placement of the connector in the receptacle 6002 in either of two opposite orientations. Opposing hook arms 6010 are received in the housing to retain the connector therein. The hook arms 6008 are configured to deflect toward side walls 6004B oriented perpendicular to the side walls 6004A at which the open-ended slots 6006, 6008 are formed.

Referring to FIGS. 61A-61D, an exemplary embodiment of an adapter is generally indicated at reference number 6100. In one or more aspects of the present disclosure, the adapter 6100 comprises at least one receptacle 6102, 6103 configured to operatively receive at least one optical connector (e.g., connector 5300) for making a connection with the at least one optical connector. In an exemplary embodiment, the adapter 6100 includes first and second receptacles 6102, 6103 at opposite ends of the adapter that are aligned for making an optical connection between one or more pairs of optical connectors. In another embodiment, the adapter comprises a transceiver having a single receptacle at one end and optical or opto-electrical components at another end to which a connector is connected when installed in the receptacle. In the illustrated embodiment, the adapter 6100 comprises four-bay receptacles 6102, 6103, each configured for receiving a four connectors therein in side-by-side relation. But in other embodiments, the adapter could comprise multi-bay adapters configured for receiving multiple connectors therein as will be described in further detail below.

The adapter 6100 comprises a housing 6104 that defines each receptacle 6102, 6103. In the illustrated embodiment, the adapter housing 6104 has a top wall 6104A and a bottom wall 6104B (broadly, first and second sides) that are spaced apart along a height HA (broadly, a first dimension) of the adapter 6102, opposite first and second side walls 6104C, 6104D that are spaced apart along a width WA (broadly, a second dimension perpendicular to the first dimension) of the adapter, and opposite ends spaced apart along a length LA (broadly, a third dimension perpendicular to the first and second dimensions) of the adapter. The top and bottom walls 6104A, 6104B define the tops and bottoms of the receptacles 6102, 6103 and the side walls 6104C, 6104D define the opposite sides of the receptacles.

For each bay of the adapter 6100, one receptacle hook 6108 is received in the adapter. Generally, each hook 6108 is configured to retain one connector in at least one of the receptacles 6102, 6103. In one or more embodiments, a single hook member 6108 is configured to retain one connector 5300 in each receptacle 6102, 6103. But in other embodiments, separate hook members could be used in each receptacle. In FIGS. 61A-61D, four receptacle hooks 6108 are received in the adapter because the receptacles 6102, 6103 are four-bay receptacles. But in other embodiments, other numbers of hooks can be received in each receptacle.

Figure 61A:
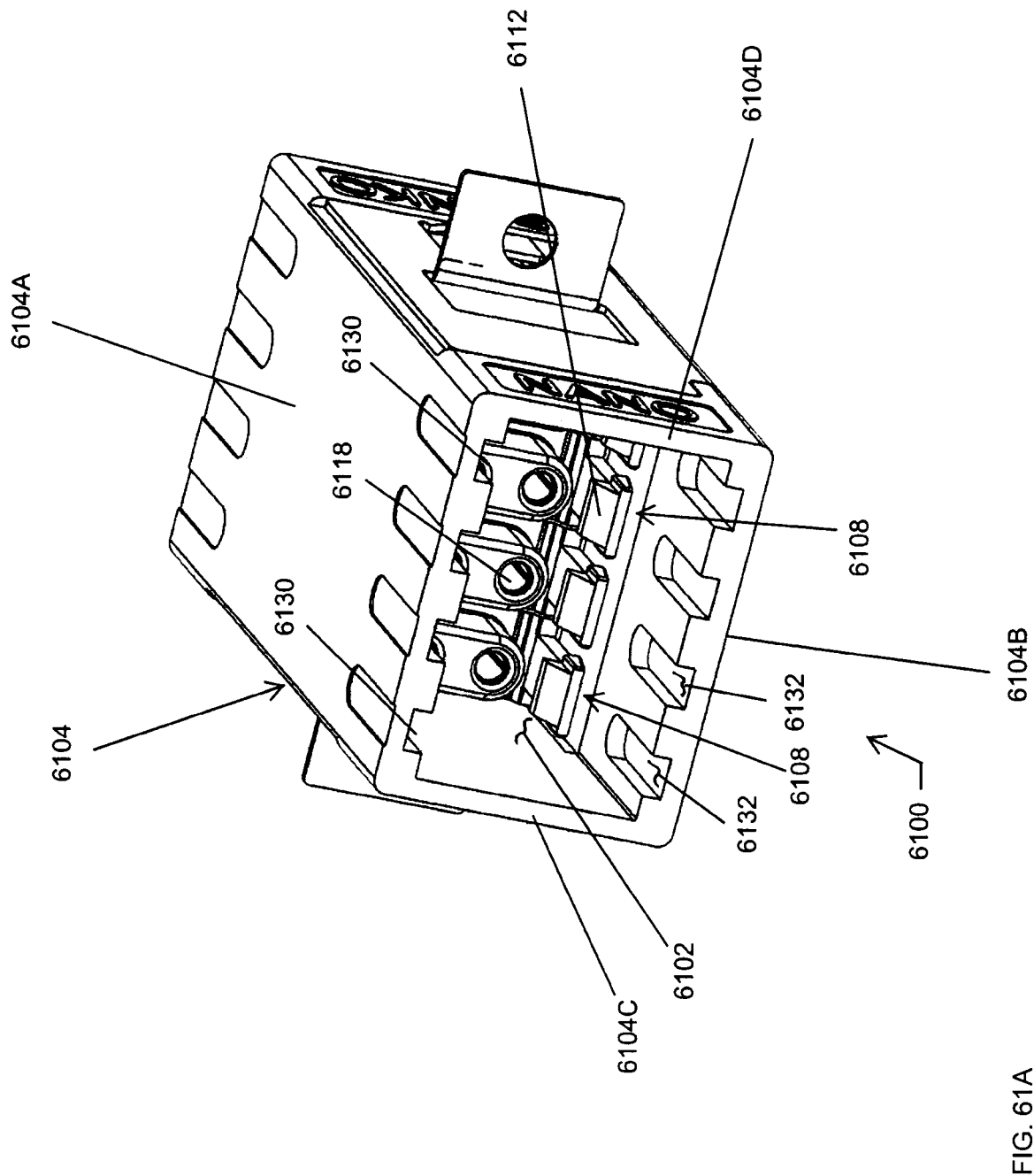
FIG. 61A is a perspective of another embodiment of an adapter.
Figure 61B:
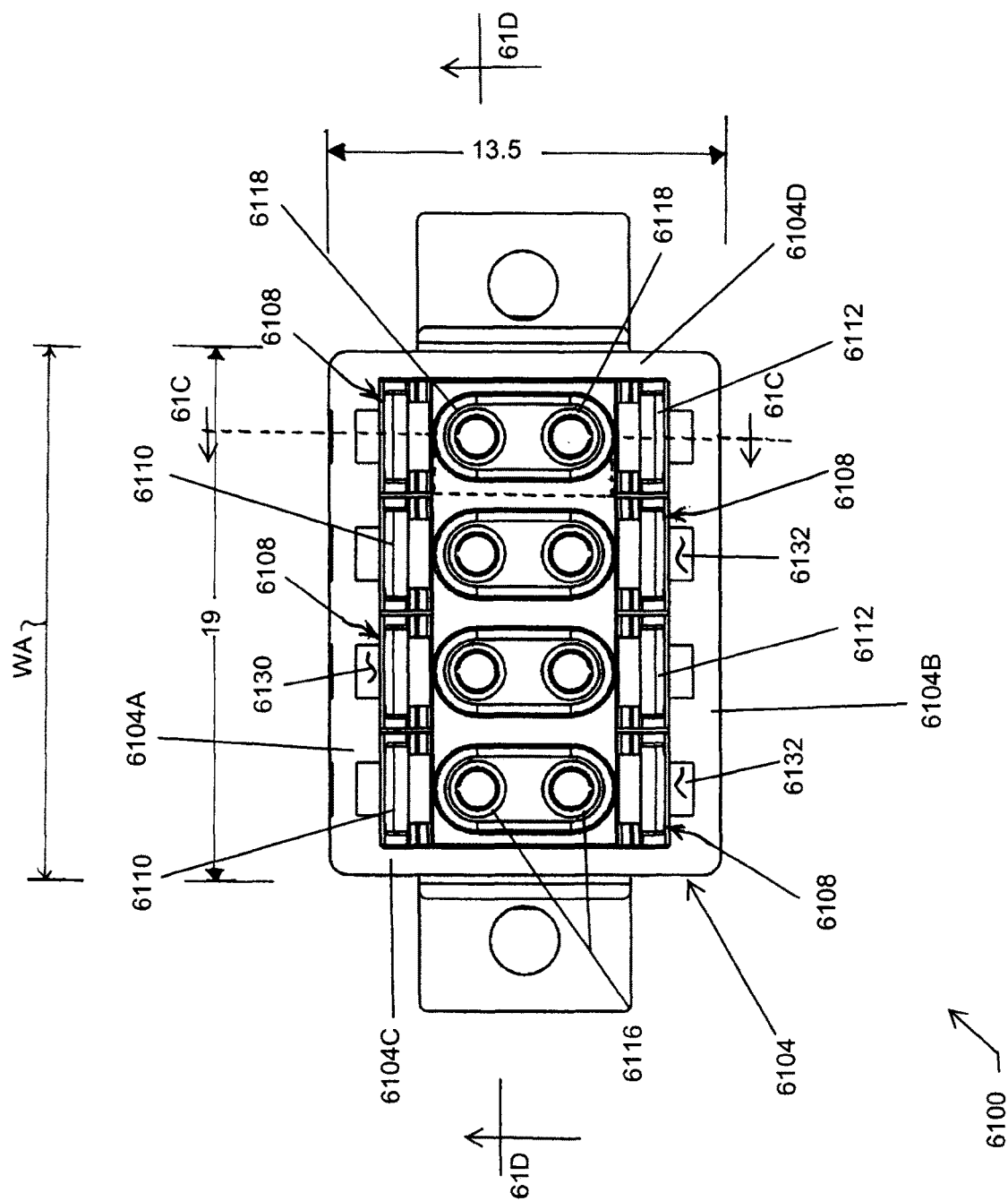
FIG. 61B is an end elevation of the adapter of FIG. 61A.
Figure 61C:
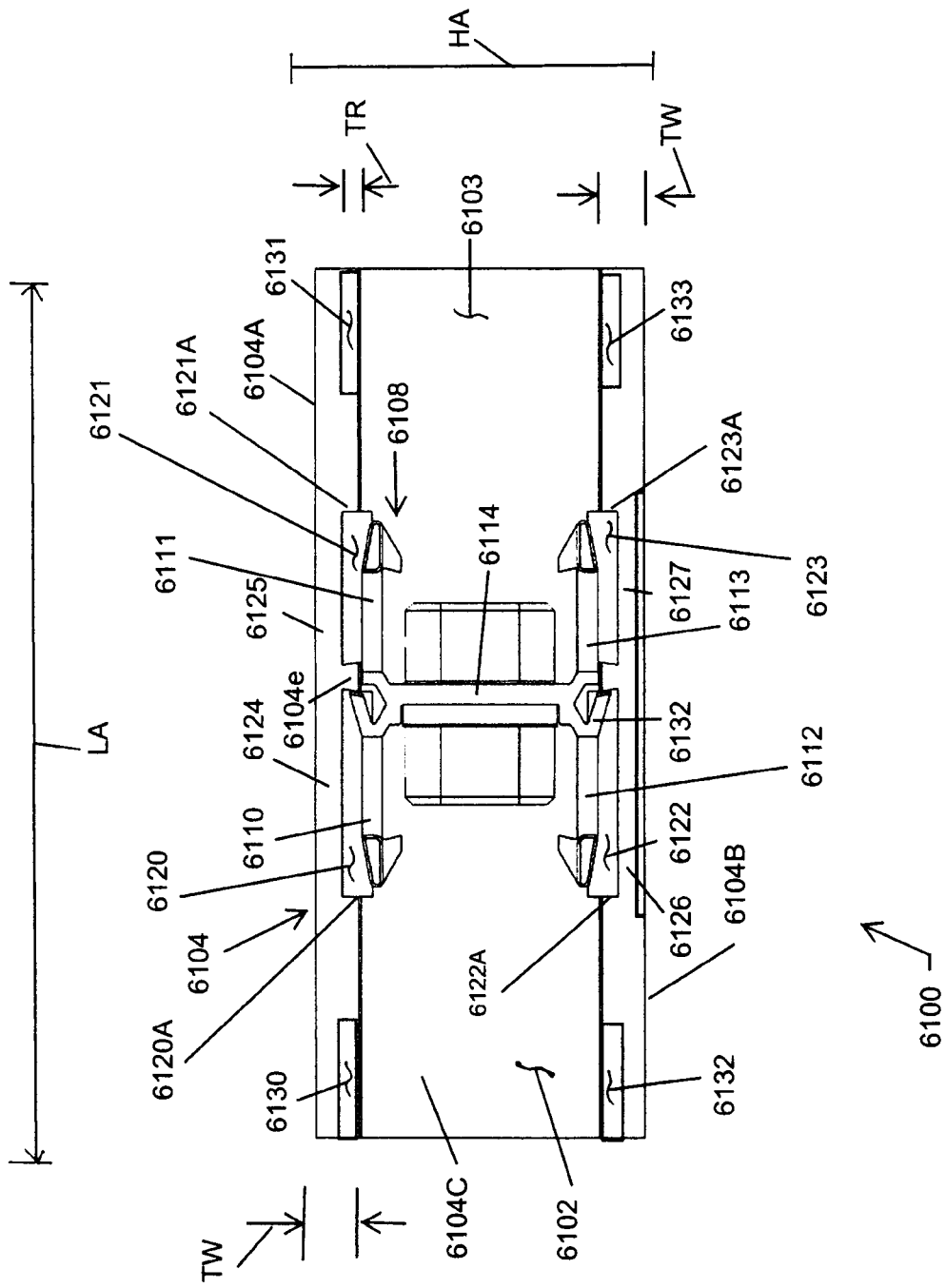
FIG. 61C is a cross section taken through line 61C-61C of FIG. 61B.

Referring to FIG. 61C, in each receptacle, the hook 6108 comprises at least one hook arm 6110, 6111, 6112, 6113 that is configured to resiliently deflect as the respective optical connector is inserted into the respective receptacle 6102, 6103 and to resiliently rebound after the respective optical connector is inserted into the receptacle whereby the hook arm engages the connector to retain the connector in the respective receptacle (e.g., catch portions of the hook arms are received in the connector recesses 5361, 5363). The housing 6104 is suitably formed to accommodate each hook arm being deflected as the optical connector is inserted into the receptacle.

In the illustrated embodiment, the hook 6108 comprises an upper hook arm 6110, 6111 and a lower hook arm 6112, 6113 in each receptacle 6102, 6103. A middle wall 6114 located between the opposite pairs of hook arms 6110, 6112, 6111, 6113 along the length of the hook 6108 extends between the upper and lower hook arms along the height HA of the adapter 6100 and holds each upper hook arm in spaced apart relationship with the opposing lower hook arm. In the illustrated embodiment, the middle wall 6114 is partially defined by the hook 6108 and partially defined by the adapter housing 6104 as explained with respect to above-described adapter embodiments. FIG. 61C further depicts adapter housing hook 6132 secured behind wall portion 6104e within upper recess 6120.

Figure 67:
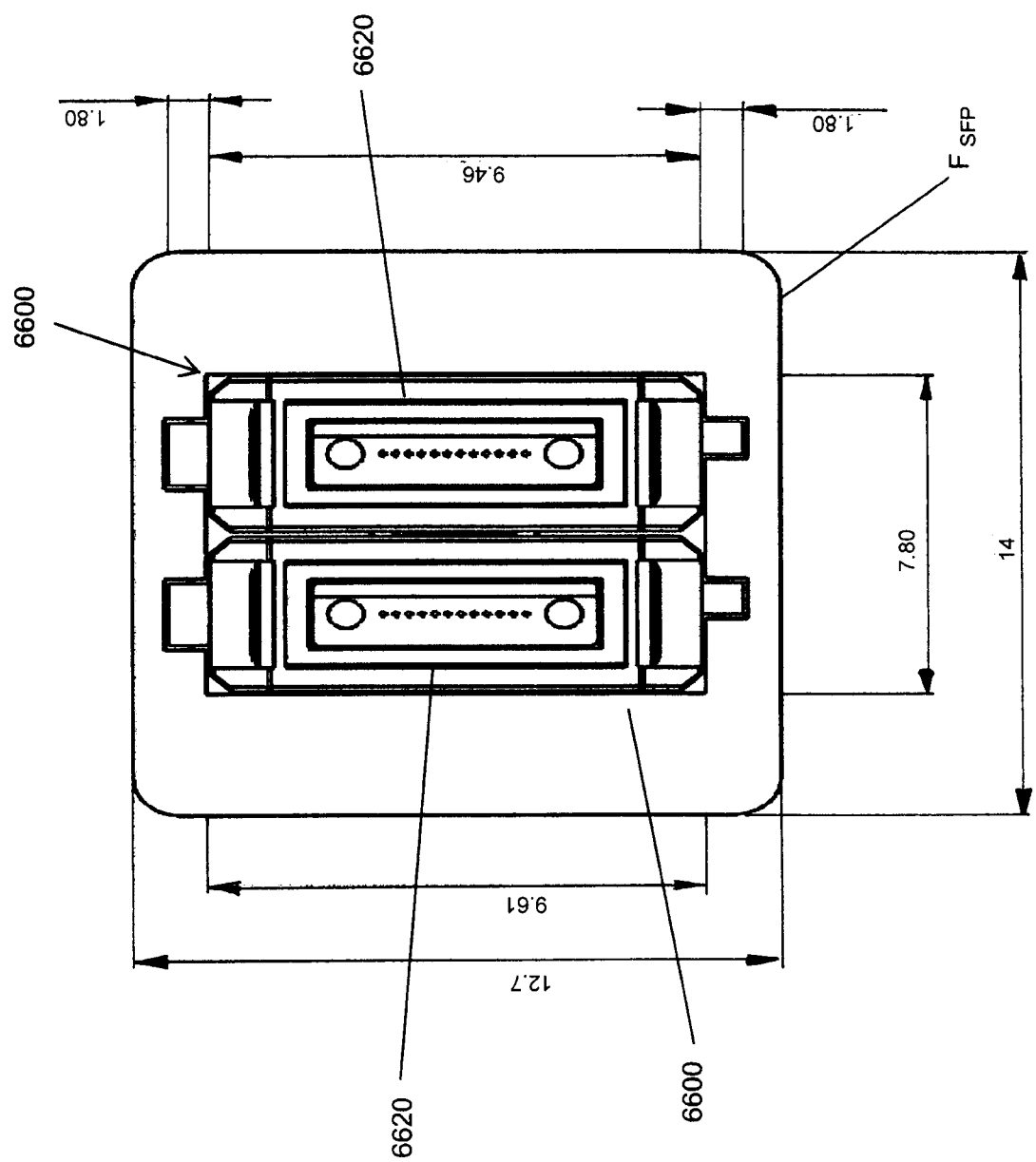
FIG. 67 an elevation of two MT-type connectors arranged in side-by-side relation and superimposed to scale on a small form factor pluggable transceiver footprint.

Each of the illustrated hooks 6108 defines a first and second opening 6116 (FIG. 61B) located between the upper and lower hook arms 6110, 6111, 6112 6113. The openings 6116 extend through the middle wall 6114 for passing optical signals to and/or from the first receptacle 6102 and the second receptacle 6103. In the illustrated embodiment, each opening 6116 retains a ferrule alignment sleeve 6118 for LC ferrules. Hence, the illustrated adapter 6100 is configured so that optical signals are passable through the openings 6116 from and/or to an LC connector. In another embodiment, the connector could be configured so that optical signals are passable from and/or to an MT-type connector, e.g., the MT-type connector shown in FIGS. 18A and 18B or the MT-type connectors 6610 shown in FIGS. 66 and 67. In still another embodiment, the connector could be configured so that optical signals are passable from and/or to a lens-type ferrule connector as shown in FIG. 18C. Further, it will be understood that the adapter could have other numbers and sizes of openings between the hook members for passing optical signals to, from, and/or between connectors.

As introduced above, the upper and lower hook arms 6110, 6112, 6111, 6113 in each receptacle 6102, 6103 are configured to deflect outwardly toward the top and bottom walls 6104A, 6104B of the adapter housing 6104 as the connector 5300 is inserted. The top wall 6104A of the adapter is formed accommodate the deflection of the upper hook arms 6110, 6111 and the bottom wall 6104B of the adapter is formed to accommodate the deflection of the lower hook arms 6112, 6113. Referring to FIG. 61C, at each receptacle 6102, 6103, the top wall of the housing 6104 has an upper recess (e.g., gap or bounded space) 6120, 6121 formed into an interior surface thereof to accommodate the deflection of the respective upper hook arms 6110, 6111 and the bottom wall of the adapter housing has a lower recess 6122, 6123 formed into an interior surface thereof to accommodate the deflection of the respective lower hook arms 6112, 6113. The upper and lower recesses 6120, 6121, 6122, 6123 receive portions of the respective upper and lower hook arms 6110, 6112, 6111, 6113 upon deflection.

Figure 61D:
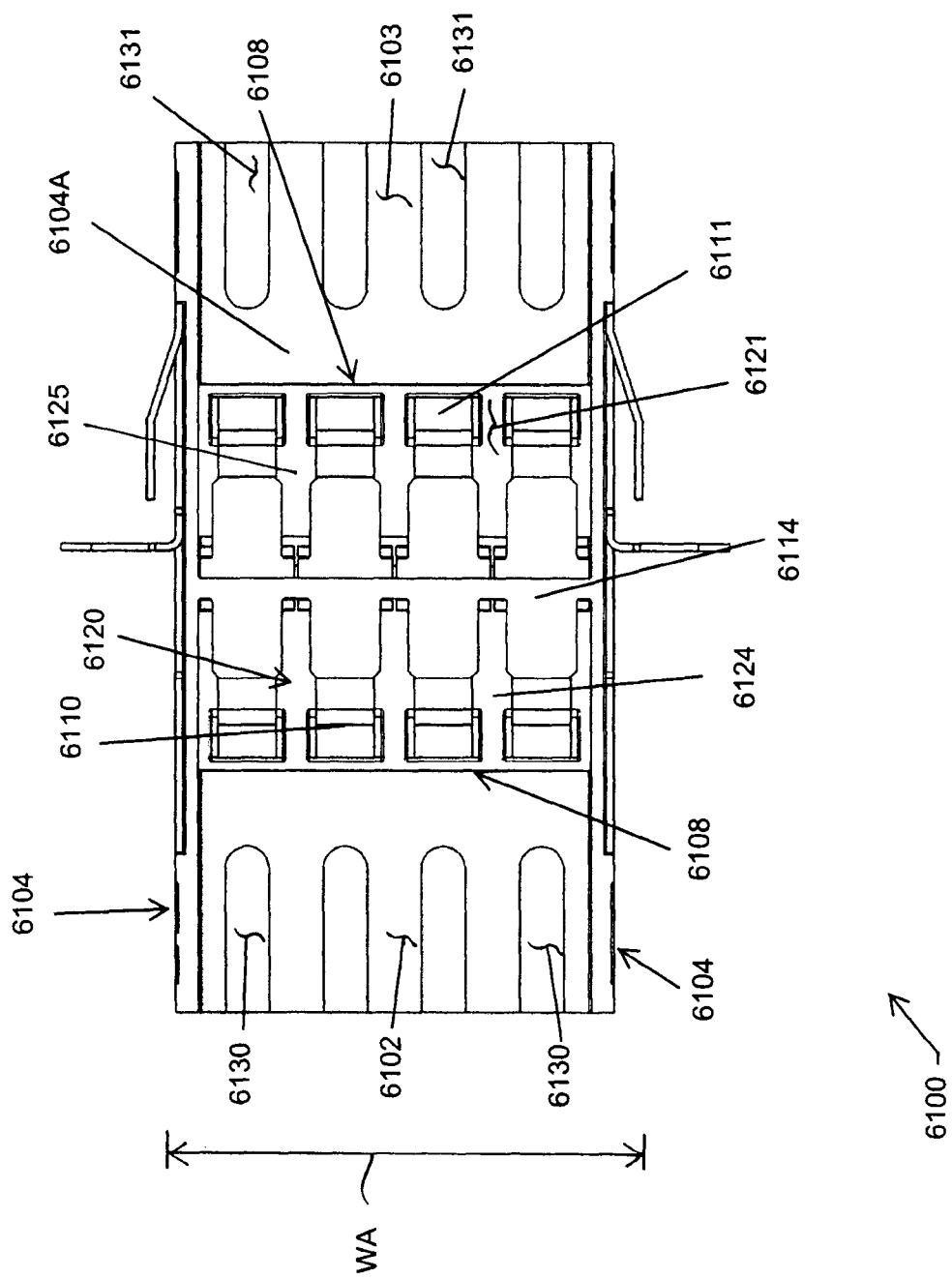
FIG. 61D is a cross section taken in the plane of line 61D-61D of FIG. 61C.

Suitably an outer web portion 6124, 6125 of the top wall 6104A of the adapter housing 6104 covers at least a portion (e.g., more than half or all) of the respective upper recess 6120, 6121, and similarly an outer web portion 6126, 6127 of the adapter housing covers at least a portion (e.g., more than half or all) of the respective lower recess 6122, 6123. In the illustrated embodiment, each recess is defined by a longitudinally extending outer end surface, which is formed by the respective web portion 6124, 6125, 6126, 6127. Each recess 6120, 6121, 6122, 6123 is defined by a longitudinally extending upper or lower surface (formed by the respective web portion 6124, 6125, 6126, 6127). As shown in FIG. 61D, each illustrated recess 6120, 6121, 6122, 6123 spans the four hooks 6108 along the width WA of the adapter 6100. Referring to FIG. 61C, each of the recesses 6120, 6121, 6122, 6123 has a closed outer longitudinal end 6120A, 6121A, 6122A, 6123A that extends inward along the height HA from the respective web 6124, 6125, 6126. Each of the illustrated recesses 6120, 6121, 6122, 6123 has a substantially constant thickness TR.

At each receptacle, 6102, 6103, the illustrated adapter housing 6104 comprises, for each connector that is receivable therein, an upper alignment recess 6130, 6131 formed on an interior surface of the top wall 6104A and a lower alignment recess 6132, 6133 formed on an interior surface of the bottom wall 6104B. In general, the alignment recesses 6130, 6131, 6132, 6133 are configured to receive the upper and lower alignment keys of a connector when the connector is installed in the receptacle 6102, 6103. It will be understood that when connectors having only a single alignment key are used, one of the upper or lower aliment key recesses can be omitted from the adapter housing. As shown in FIG. 61C, each alignment key recesses 6130, 6131, 6132, 6133 is spaced apart outwardly from the respective hook recess 6120, 6121, 6122, 6123 along the length LA of the adapter 6100. Suitably, a middle portion of the respective one of the top and bottom walls 6104A, 6104B is located between the alignment key recess 6132, 6133 and the respective hook recess 6120, 6121, 6122, 6123. The housing wall 6104A, 6104B has its maximum wall thickness TW along this middle portion.

Figure 62:
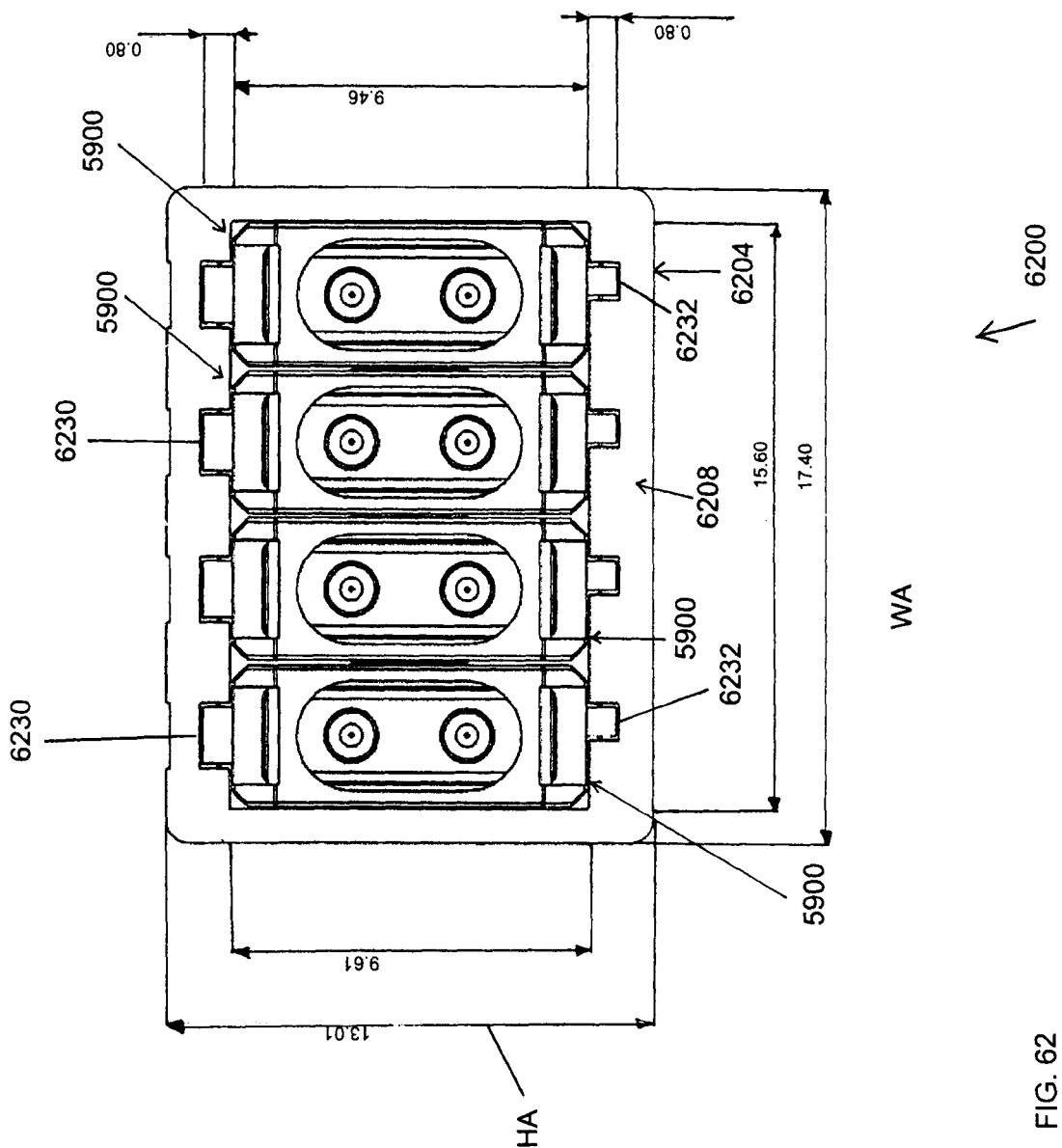
FIG. 62 is an elevation of another embodiment of an adapter with four of the connectors of FIGS. 59A and 59B installed therein.

Suitably each upper alignment recess 6130, 6131 is in line with the respective upper hook arm 6120, 6121 along the width WA (FIG. 61D) of the adapter 6100, and each lower alignment recess 6132, 6133 is generally aligned with the respective lower hook arm 6122, 6123 along the width of the adapter. For purposes of this disclosure, an alignment recess is in line with the respective hook arm when the alignment recess at least partially overlaps the hook arm along the width of the adapter. The alignment recesses 6130, 6131, 6132, 6133 are located adjacent the outboard ends of the adapter housing 6104 and are open-ended so that the alignment keys on a connector slot into the alignment key recesses as the connector is inserted into the respective receptacle 6102, 6103. As shown in FIG. 62, to prevent reverse-polarity installation of the connectors 5900, in one or more embodiments of an adapter 6200, each upper alignment key recess 6230 can be offset from the corresponding lower alignment key recess 6232 along the width WA of the housing 6204. In addition or in the alternative, the upper alignment key recess 6230 can have one or both of a different size and shape than the lower alignment key recess 6232.

Figure 68:
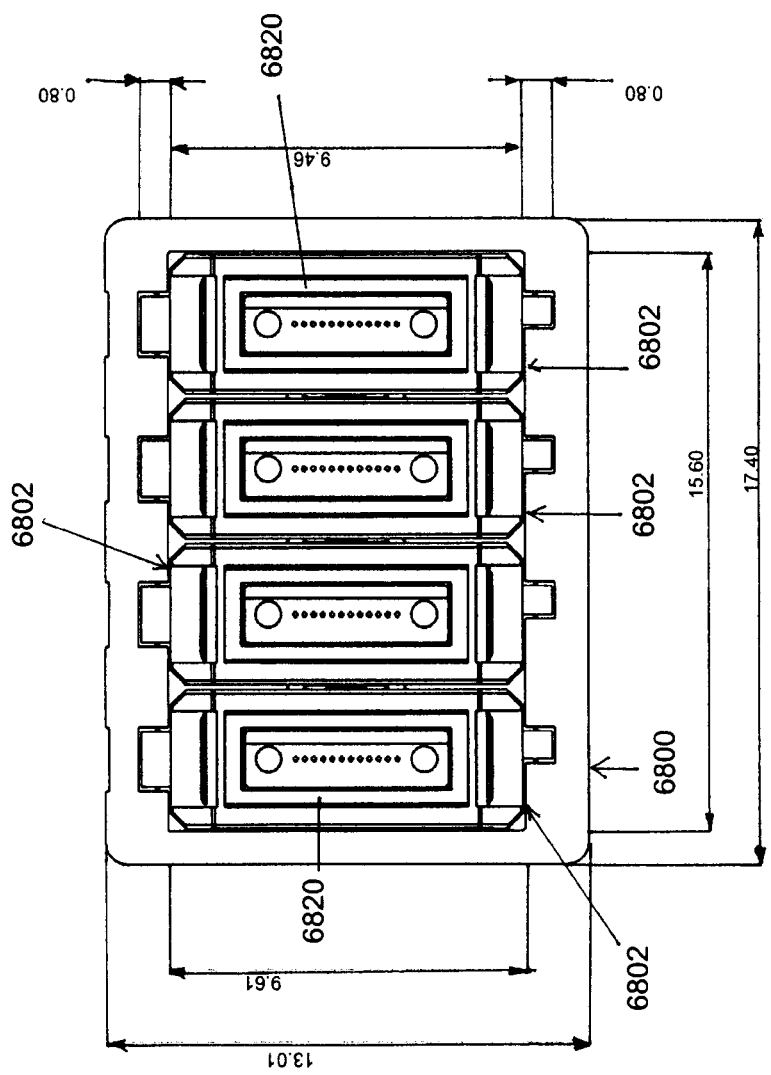
FIG. 68 is an elevation of another embodiment of an adapter with four MT-type-ferrule connectors installed therein.

Referring still to FIG. 62, in one embodiment, the adapter 6200 is configured to receive four connectors 5900 in side-by-side relation in each receptacle 6102, 6103. The adapter 6200 thus includes four hooks (not shown). Suitably, the adapter 6200 is free of any wall located between any of the plurality of hooks along the width WA. Omitting walls between the hooks 6108 minimizes the cross-sectional dimensions of the adapter. As indicated in the dimensions for adapter width WA and adapter height HA in FIG. 62, in one or more embodiments, the housing perimeter of the adapter housing 6204 is generally accommodated in a quad small form-factor pluggable (QSFP) transceiver footprint $F_{QSFP}$ (FIG. 64). For purposes of this disclosure, an adapter is "generally accommodated" in a transceiver footprint when the height and width of the adapter are no more than about 0.5 mm greater than the corresponding dimensions of the standard transceiver footprint. In the illustrated embodiment, the height and width of the adapter 6200 are less than or equal to the corresponding dimensions of the standard QSFP transceiver footprint $F_{QSFP}$. As shown in FIG. 68, the adapter 6800, which is configured to receive four MT-type-connectors 6802 in each receptacle, also has a housing perimeter that is generally accommodated in a quad small form-factor pluggable (QSFP) transceiver footprint $F_{QSFP}$. For example, the height and width of the adapter 6800 are less than the corresponding dimensions of the standard $Q_{SFP}$ transceiver footprint $F_{QSFP}$.

Figure 63:
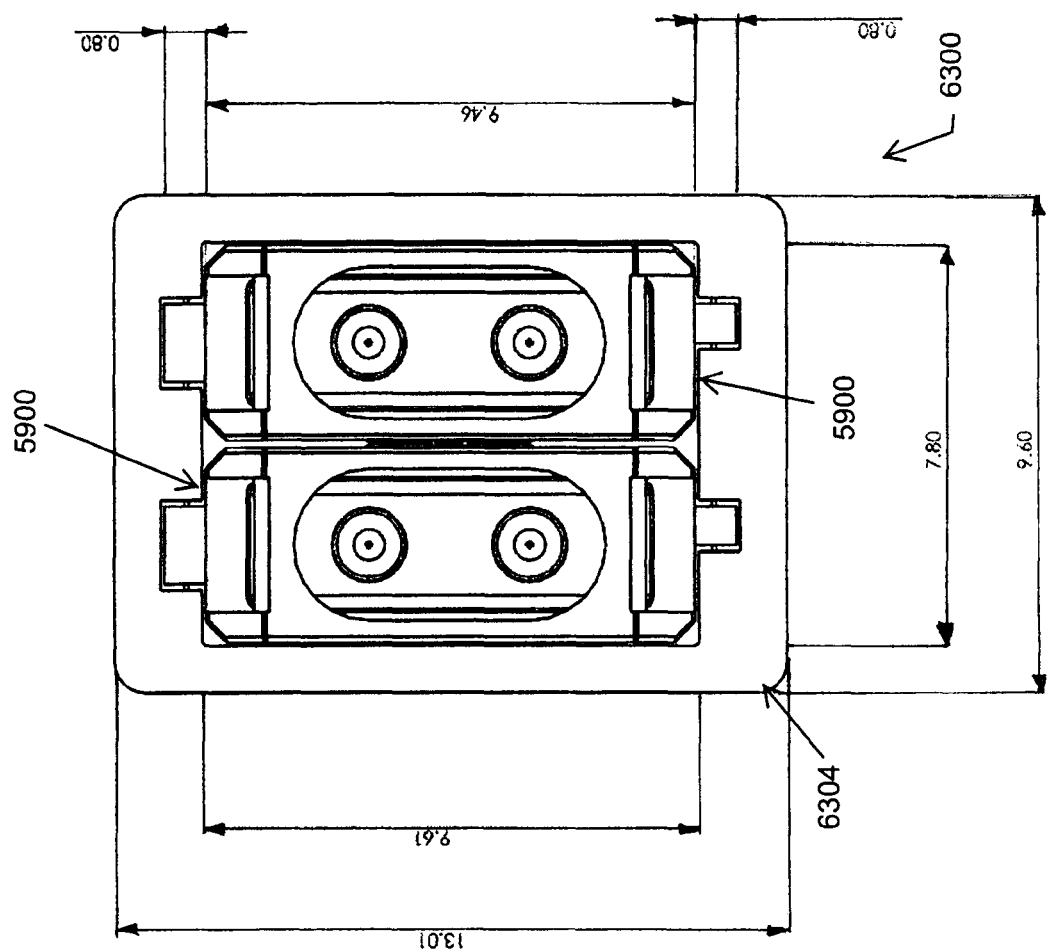
FIG. 63 is an elevation of another embodiment of an adapter with two of the connectors of FIG. 59 installed therein.
Figure 69:
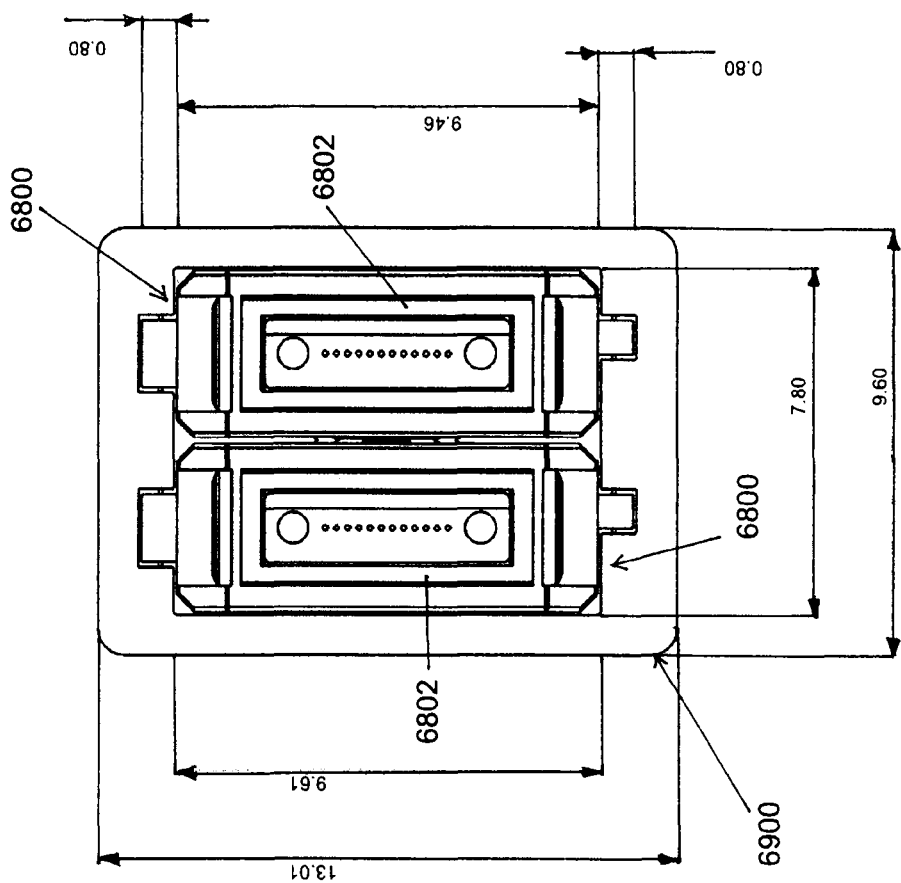
FIG. 69 is an elevation of another embodiment of an adapter with two MT-type-ferrule connectors installed therein.

As indicated in the dimensions in FIG. 63, the housing perimeter of a housing 6304 of an adapter 6300 comprising two-bay receptacles that are free of walls between hook members 6308 is generally accommodated in a small form-factor pluggable transceiver footprint $F_{SFP}$ (FIG. 65). The sum of the height and width of the adapter 6300 is less than or equal to the sum of the corresponding dimensions of the standard SFP transceiver footprint $F_{SFP}$. As shown in FIG. 69, the adapter 6900, which is configured to receive two MT-type connectors 6802 in each receptacle, also has a housing perimeter that is generally accommodated in a small form-factor pluggable (SFP) transceiver footprint $F_{SFP}$. In the illustrated embodiments, the sum of the height and width of the adapter 6900 is less than the sum of the corresponding dimensions of the small form-factor pluggable transceiver footprint $F_{SFP}$.

Figure 70A:
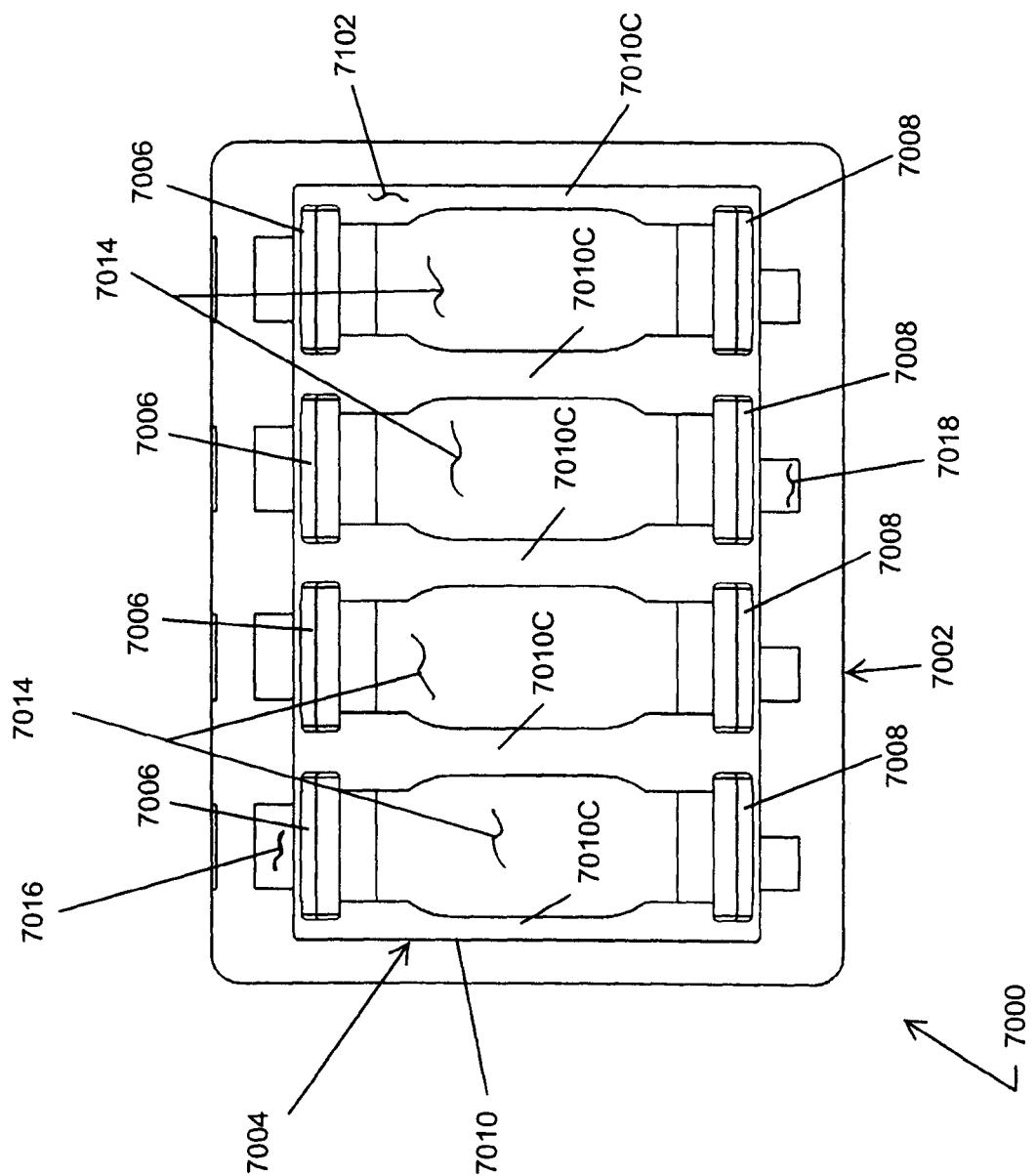
FIG. 70A is an elevation of another embodiment of an adapter.
Figure 70B:
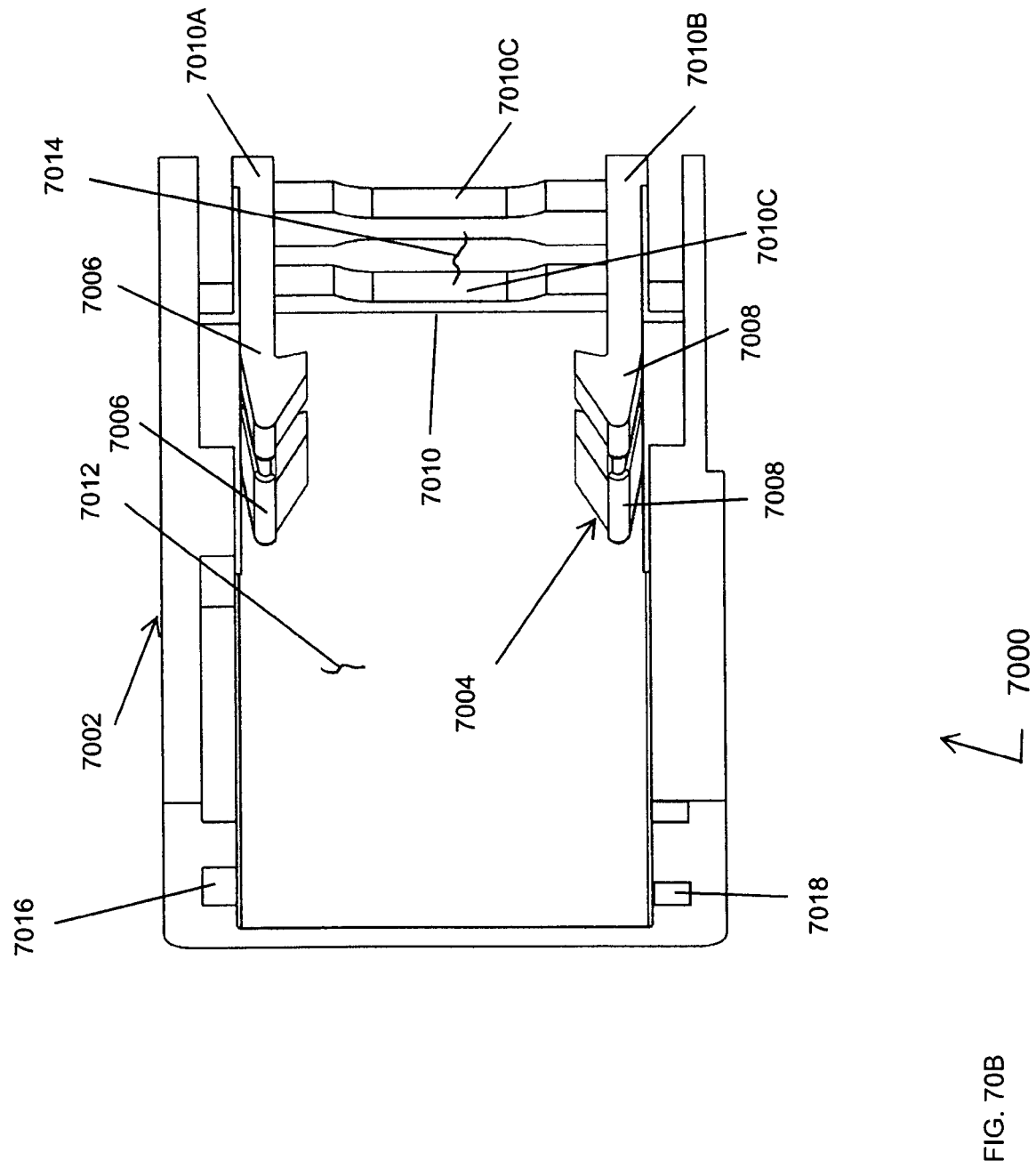
FIG. 70B is perspective of the adapter of FIG. 70A shown in longitudinal cross section.

Referring to FIGS. 70A-70B, in one or more embodiments, an adapter 7000 comprises an adapter housing 7002 and a hook 7004 that is integrally and unitarily formed with the adapter housing, from one piece of molded material. In the illustrated embodiment, the hook 7004 comprises four pairs of opposing hook arms 7006, 7008 that extend from a middle wall 7010 into a receptacle 7012 defined by the adapter housing. As above, each pair of hook arms 7006, 7008 is configured to retain a connector in the receptacle 7012. Further each pair of hook arms 7006, 7008 is configured to resiliently deflect outwardly when the connector is inserted into the receptacle and resiliently rebound inwardly to retain the connector in the receptacle.

The middle wall 7010 includes upper and lower webs 7010A, 7010B that integrally connect the middle wall to the top and bottom of the housing 7002. In the illustrated embodiment, each of the upper and lower webs 7010A, 7010B has a laterally extending middle portion that is spaced apart vertically from the respective one of the top and bottom wall of the housing 7002. Lateral end portions of the upper and lower webs 7010A, 7101B extend vertically outward from the middle portion to the respective one of the top and bottom wall. The upper hook arms 7006 are integrally connected to the upper web 7010A and extend longitudinally from the upper web 7010A into the receptacle 7012. Similarly, the lower hook arms 7008 are integrally connected to the lower web 7010B and extend longitudinally from the lower web into the receptacle 7012.

The middle wall 7010 also includes a plurality of struts 7010C that extend vertically between the upper and lower webs 7010A, 7010B and support the upper and lower webs in spaced apart relationship. The struts 7010C are laterally spaced apart along a width of the adapter housing 7002 and define openings 7014 therebetween. Each opening 7014 is aligned with a respective pair of hook arms 7006, 7008 along the width of the adapter housing 7002. Further, each opening 7014 is configured to receive an alignment sleeve or an alignment sleeve holder therein (not shown). The alignment sleeve or alignment sleeve holder (not shown) is configured to align a ferrule of a connector retained by the respective pair of hook arms 7006, 7008 for making an optical connection.

The housing 7002 of the adapter 7000 comprises an upper alignment key recess 7016 and a lower alignment key recess 7018 for receiving a pair of alignment keys of a connector as described above.

Figure 71A:
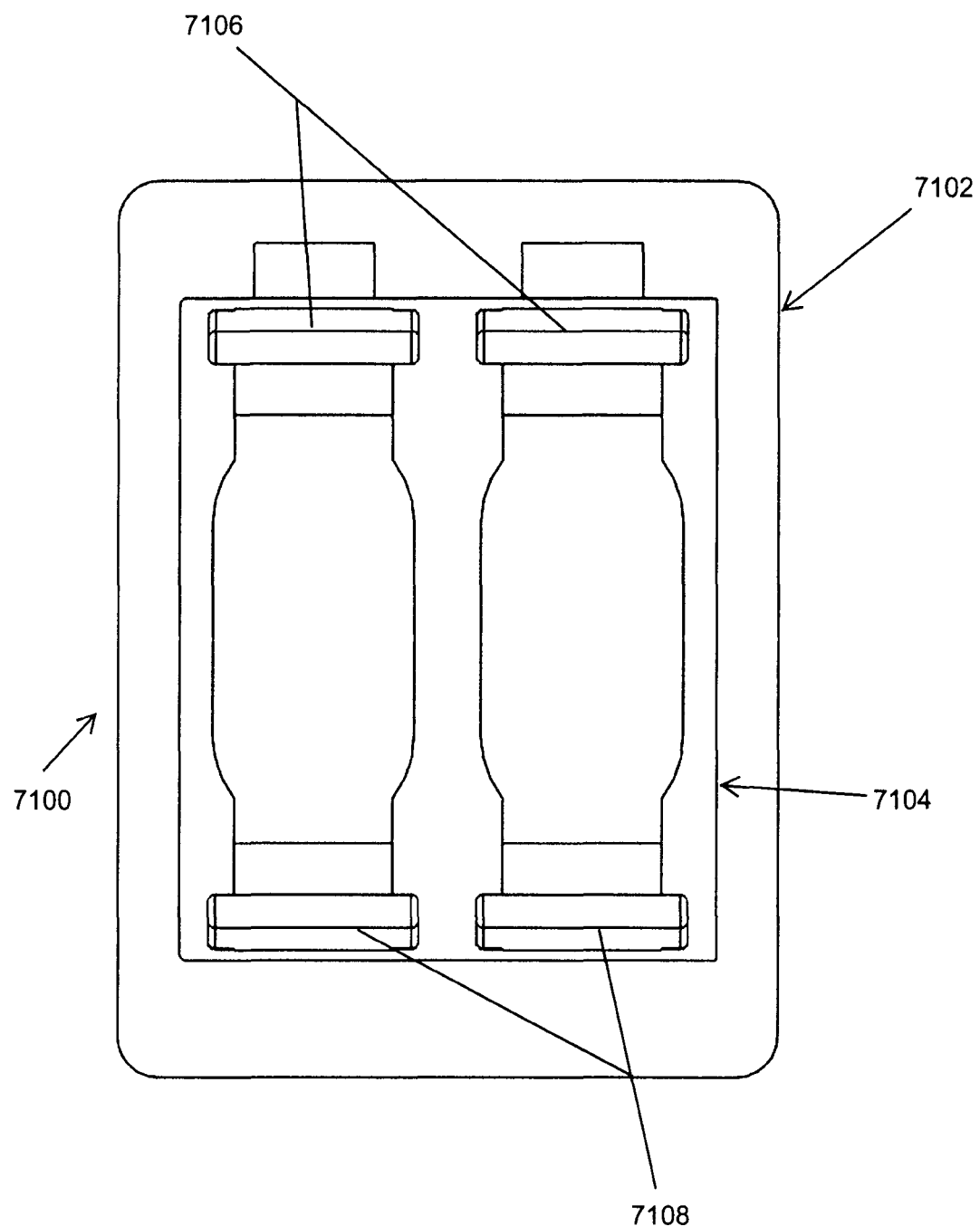
FIG. 71A is an elevation of another embodiment of an adapter.
Figure 71B:
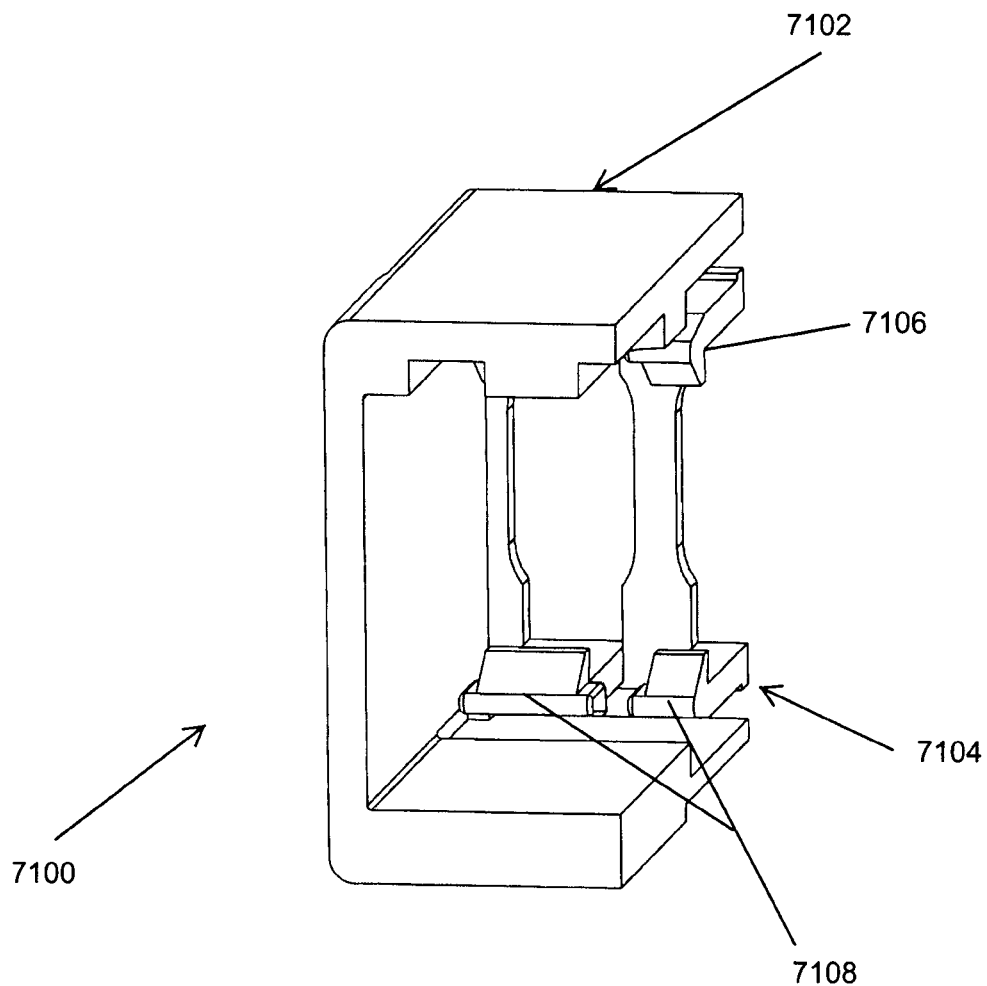
FIG. 71B is perspective of the adapter of FIG. 71A shown in longitudinal cross section.

Although the illustrated adapter 7000 comprises a hook 7004 formed integrally with the housing 7002 that defines four pairs of hook arms 7006, 7008, other adapters with integrally formed hooks can have other numbers of pairs of hook arms. For example, referring to FIGS. 71A-71B, in one or more embodiments, an adapter 7100 comprises a housing 7102 and a hook 7104 having two pairs of opposing hook arms 7106, 7108 that is integrally and unitarily formed with the adapter housing, from one piece of molded material. Except for the difference in number of pairs of opposing hook arms, the hook 7104 has the same basic configuration as the hook 7004. In other embodiments, adapters comprising integrally formed hooks can have still other numbers of opposing pairs of hook arms.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the tell is, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. An adapter having a receptacle configured to receive first and second optical connectors in the receptacle at operative positions for making an optical connection, wherein each of the first and second optical connectors comprises a plurality of optical fibers spaced apart along a first dimension of the respective one of the first and second optical connectors, the adapter comprising:
   a housing defining the receptacle having a housing perimeter; and
   one or more hooks in the receptacle that are configured to releasably retain each of the first and second optical connectors in the operative positions, the one or more hooks being connected to the housing and being resiliently bendable to release the first and second optical connectors from the adapter such that the first and second optical connectors can be removed from the receptacle while the one or more hooks remain in the receptacle, wherein the first and second optical connectors are spaced apart from one another in a direction perpendicular to the first dimension when the one or more hooks retain the first and second optical connectors in the operative positions;
   wherein the housing perimeter is accommodated in a small form-factor pluggable (SFP) transceiver footprint.

2. An adapter having a receptacle configured to receive four optical connectors in the receptacle at operative positions for making an optical connection, wherein each of the four optical connectors comprises a plurality of optical fibers spaced apart along a first dimension of the respective one of the four optical connectors, the adapter comprising:
   a housing defining the receptacle and having a housing perimeter; and
   one or more hooks in the receptacle that are configured to releasably retain each of the four optical connectors in the operative positions, the one or more hooks being connected to the housing and being resiliently bendable to release the four optical connectors from the adapter such that the four optical connectors can be removed from the receptacle while the one or more hooks remain in the receptacle, wherein the four optical connectors are spaced apart from one another in a direction perpendicular to the first dimensions thereof when the one or more hooks retain the four optical connectors in the operative positions;
   wherein the housing perimeter is accommodated in a quad small form-factor pluggable (QSFP) transceiver footprint.

3. An adapter having a receptacle configured to receive a plurality of optical connectors in the receptacle at operative positions for making an optical connection, the adapter comprising:
a housing defining the receptacle, wherein the receptacle has a receptacle perimeter comprising first and second sides and the receptacle has a width extending between the first and second sides of the receptacle perimeter; and
a plurality of hooks including a hook for each of the plurality optical connectors, the plurality of hooks being spaced apart from one another along the width of the receptacle, each of the plurality of hooks being configured to releasably retain a respective one of the plurality of optical connectors at the respective operative position in the receptacle, the plurality of hooks being connected to the housing and being resiliently bendable to release the plurality of optical connectors from the adapter such that the plurality of optical connectors can be removed from the receptacle while the one or more hooks remain in the receptacle;
wherein the adapter is free of any wall located between any of the plurality of hooks along the width of the receptacle.

4. The adapter as set forth in claim 3, wherein the housing comprises first and second side walls defining the first and second sides of the receptacle perimeter and first and second end walls defining first and second ends of the receptacle perimeter, each of the first and second end walls extending widthwise from the first side wall to the second side wall.

5. The adapter as set forth in claim 3, wherein the receptacle has a longitudinal axis and an outer end portion and an inner end portion spaced apart from the outer end portion along the longitudinal axis in a connector insertion direction.

6. The adapter as set forth in claim 5, wherein each hook comprises a wall adjacent the inner longitudinal end portion of the receptacle and at least one hook arm cantilevered from the wall such that the at least one hook arm extends along the longitudinal axis from the wall in a connector removal direction opposite the connector insertion direction to a free end portion.

7. The adapter as set forth in claim 6, wherein each hook arm is resiliently bendable.

8. The adapter as set forth in claim 7, wherein when the plurality of optical connectors is inserted into the receptacle in the connector insertion direction, each of the hook arms is configured to be deflected by one of the optical connectors to resiliently bend so that the free end portion moves transversely outward and then resiliently rebounds to latch with the respective optical connector.

9. The adapter as set forth in claim 7, wherein the at least one hook arm comprises a pair of opposing hook arms.

10. The adapter as set forth in claim 7, wherein the free end portion of the hook arm comprises a hook formation defining a hook surface that faces generally in the connector insertion direction.

11. The adapter as set forth in claim 7, wherein the hook is integrally formed with the housing from a single piece of monolithic material.

12. The adapter as set forth in claim 6, wherein the hook and the housing are formed from separate pieces of material.

13. The adapter as set forth in claim 1, wherein the receptacle has a longitudinal axis and an outer end portion and an inner end portion spaced apart from the outer end portion along the longitudinal axis in a connector insertion direction.

14. The adapter as set forth in claim 13, wherein the one or more hooks comprises a wall adjacent the inner longitudinal end portion of the receptacle and at least one hook arm cantilevered from the wall such that the at least one hook arm extends from the wall along the longitudinal axis in a connector removal direction opposite the connector insertion direction to a free end portion.

15. The adapter as set forth in claim 14, wherein when the first and second optical connectors are inserted into the receptacle in the connector insertion direction, the at least one hook arm is configured to be deflected to resiliently bend so that the free end portion moves transversely outward and then resiliently rebounds transversely inward.

16. The adapter as set forth in claim 14, wherein the at least one hook arm comprises a pair of opposing hook arms.

17. The adapter as set forth in claim 14, wherein the free end portion of the hook arm comprises a hook formation defining a hook surface that faces generally in the connector insertion direction.

18. The adapter as set forth in claim 14, wherein the housing is integrally formed with the one or more hooks from a single piece of monolithic material.

19. The adapter as set forth in claim 14, wherein the one or more hooks and the housing are formed from separate pieces of material.

20. The adapter as set forth in claim 2, wherein the receptacle has a longitudinal axis and an outer end portion and an inner end portion spaced apart from the outer end portion along the longitudinal axis in a connector insertion direction.

21. The adapter as set forth in claim 20, wherein the one or more hooks comprises a wall adjacent the inner longitudinal end portion of the receptacle and at least one hook arm cantilevered from the wall such that the at least one hook arm extends from the wall along the longitudinal axis in a connector removal direction opposite the connector insertion direction to a free end portion.

22. The adapter as set forth in claim 21, wherein when the four optical connectors are inserted into the receptacle in the connector insertion direction, the at least one hook arm is configured to be deflected to resiliently bend so that the free end portion moves transversely outward and then resiliently rebounds transversely inward.

23. The adapter as set forth in claim 21, wherein the at least one hook arm comprises a pair of opposing hook arms.

24. The adapter as set forth in claim 21, wherein the free end portion of the hook arm comprises a hook formation defining a hook surface that faces generally in the connector insertion direction.

25. The adapter as set forth in claim 21, wherein the housing is integrally formed with the one or more hooks from a single piece of monolithic material.

26. The adapter as set forth in claim 21, wherein the one or more hooks and the housing are formed from separate pieces of material.

* * * * *